(12) United States Patent
Liao et al.

(10) Patent No.: US 11,452,001 B2
(45) Date of Patent: Sep. 20, 2022

(54) GROUP BASED CONTEXT AND SECURITY FOR MASSIVE INTERNET OF THINGS DEVICES

(71) Applicant: APPLE INC., Cupertino, CA (US)

(72) Inventors: Ching-Yu Liao, Portland, OR (US); Xiruo Liu, Portland, OR (US); Liuyang Yang, Portland, OR (US); Moreno Ambrosin, Hillsboro, OR (US)

(73) Assignee: APPLE INC., Cupertino, CA (US)

( * ) Notice: Subject to any disclaimer, the term of this patent is extended or adjusted under 35 U.S.C. 154(b) by 550 days.

(21) Appl. No.: 16/480,267

(22) PCT Filed: Apr. 16, 2018

(86) PCT No.: PCT/US2018/027768
§ 371 (c)(1),
(2) Date: Jul. 23, 2019

(87) PCT Pub. No.: WO2018/194971
PCT Pub. Date: Oct. 25, 2018

(65) Prior Publication Data
US 2019/0387401 A1 Dec. 19, 2019

Related U.S. Application Data

(60) Provisional application No. 62/588,033, filed on Nov. 17, 2017, provisional application No. 62/566,731, (Continued)

(51) Int. Cl.
*H04W 12/76* (2021.01)
*H04W 12/06* (2021.01)
(Continued)

(52) U.S. Cl.
CPC ......... *H04W 28/0289* (2013.01); *H04W 8/08* (2013.01); *H04W 12/082* (2021.01);
(Continued)

(58) Field of Classification Search
CPC . H04W 28/0289; H04W 8/08; H04W 12/082; H04W 12/086; H04W 12/088;
(Continued)

(56) References Cited

U.S. PATENT DOCUMENTS

| 11,321,712 | B1 * | 5/2022 | Shahidzadeh | ........... H04L 63/08 |
| 2003/0208677 | A1 * | 11/2003 | Ayyagari | .............. H04L 9/0833 |
| | | | | 713/168 |

(Continued)

OTHER PUBLICATIONS

Ericsson, "Inactive Mode in NG RAN", R3-171149, 3GPP TSG-RAN WG3 Meeting #95bis, Spokane, Washington, USA, Agenda Item 10.8, Apr. 3-7, 2017, 18 pages.
(Continued)

*Primary Examiner* — Andrew Wendell

(57) ABSTRACT

Systems and methods are provided for efficient group-based handling of massive internet of things (M-IoT) devices that are compatible with both current cellular networks, and next generation 5G systems. Examples allow reduced overhead between a (radio) access network (R)AN and a core network (CN) that originates from unnecessary signaling traffic for IoT devices transitioning from IDLE to CONNECTED
(Continued)

Group Keys Mangement mode, especially when sending small data packets. In addition, or in other embodiments, mobility solutions are provided for group based M-IoT.

24 Claims, 28 Drawing Sheets

Related U.S. Application Data filed on Oct. 2, 2017, provisional application No. 62/486,197, filed on Apr. 17, 2017.

(51) Int. Cl.

| | |
|---|---|
| *H04W 28/02* | (2009.01) |
| *H04W 76/12* | (2018.01) |
| *H04W 76/11* | (2018.01) |
| *H04W 76/27* | (2018.01) |
| *H04W 8/08* | (2009.01) |
| *H04W 36/08* | (2009.01) |
| *H04W 80/10* | (2009.01) |
| *H04W 12/082* | (2021.01) |
| *H04W 12/086* | (2021.01) |
| *H04W 12/088* | (2021.01) |

(52) U.S. Cl.
CPC ....... *H04W 12/086* (2021.01); *H04W 12/088* (2021.01); *H04W 12/76* (2021.01); *H04W 36/08* (2013.01); *H04W 76/11* (2018.02); *H04W 76/12* (2018.02); *H04W 76/27* (2018.02); *H04W 80/10* (2013.01)

(58) Field of Classification Search
CPC ..... H04W 12/76; H04W 36/08; H04W 76/11; H04W 76/12; H04W 76/27; H04W 80/10; H04W 12/06; H04W 4/08; H04W 4/70
See application file for complete search history.

(56) References Cited

U.S. PATENT DOCUMENTS

| | | | |
|---|---|---|---|
| 2009/0037736 A1* | 2/2009 | Djordjrvic | H04L 63/065 |
| | | | 713/170 |
| 2013/0046821 A1* | 2/2013 | Alanara | H04W 76/27 |
| | | | 709/204 |
| 2013/0080782 A1 | 3/2013 | Rajadurai | |
| 2015/0341322 A1* | 11/2015 | Levi | G06Q 30/0269 |
| | | | 726/26 |
| 2018/0115539 A1* | 4/2018 | Muhanna | H04W 88/02 |
| 2018/0213575 A1* | 7/2018 | Chen | H04W 76/27 |
| 2019/0174571 A1* | 6/2019 | Deenoo | H04W 76/11 |

OTHER PUBLICATIONS

Huawei, Hisilicon, Catr, "RS23.502 NF services supported by AMF—system procedures", S2-172234, 3GPP TSG SA WG2 Meeting #120, Busan, Korea, Agenda Item 6.5.11, Mar. 27-31, 2017, 16 pages.
PCT/US2018/027768, International Search Report and Written Opinion, dated Aug. 22, 2018, 20 pages.

* cited by examiner

Example data transmission from IoT-UE in CM-IDLE mode

Group Keys Mangement

GROUP BASED CONTEXT AND SECURITY FOR MASSIVE INTERNET OF THINGS DEVICES

RELATED APPLICATIONS

This application is a non-provisional of U.S. Provisional Patent Application No. 62/486,197, filed Apr. 17, 2017, U.S. Provisional Patent Application No. 62/566,731, filed Oct. 2, 2017, and U.S. Provisional Patent Application No. 62/588,033, filed Nov. 17, 2017, each of which is hereby incorporated by reference herein in its entirety.

TECHNICAL FIELD

This application relates generally to wireless communication systems, and more specifically to group communication.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi; and the MulteFire standard developed by MulteFire Alliance. In 3GPP radio access networks (RANs) in LTE systems, the base station can include a RAN node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE) and in MulteFire systems can include a MF-AP. In fifth generation (5G) wireless RANs, RAN Nodes can include a 5G node, new radio (NR) node or g Node B (gNB). Additional details of 5G systems are discussed below.

DETAILED DESCRIPTION OF PREFERRED EMBODIMENTS

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

In legacy 3GPP Evolved Packet System (EPS) and 3GPP 5G System (5GS), user equipment (UE) user plane data transmission from the (radio) access network ((R)AN) and the user plane function at the core network (CN) is typically carried out over a general packet radio service (GPRS) tunneling protocol (GTP) tunnel. Such a connection is also generically referred to as packet data network (PDN) connection. In EPS, this tunnel is established between an eNB, serving gateway (S-GW), and PDN gateway (P-GW). Similarly, in 5G systems, a GTP tunnel is established between a gNB serving the UE, and the selected user plane function (UPF).

Such a tunnel is established per UE, and is a mechanism tailored for regular UEs, e.g. smartphones, requesting services without specific Quality of Service (QoS) parameters. One of the goals of both 4G and 5G systems is the support for Massive Internet of Thing (M-IoT), e.g., large smart electricity metering deployments served by the cellular network. IoT device generated traffic is typically infrequent, has small data, and is upstream. As an example, consider an electricity smart meter periodically sending measurement reports. Furthermore, during inactivity periods, IoT devices switch into IDLE modes, for energy preservation.

Adding M-IoT support in cellular networks bring new scalability issues, which in turn pose threats to network availability. When serving large populations of IoT devices (also referred to herein as IoT UEs), the context allocated to maintain user plane connectivity, as well as the control plane signaling to establish such context, generates scalability limitations and so called "signaling storms" (the latter due to extensive signaling exchanges). In the context of M-IoT, for example, signaling storms can be caused by IoT UEs trying to establish PDN connections for user plane transmissions. Signaling storms can also be caused by service request or tracking area update procedures, when the IoT UE device returns from IDLE/INACTIVE mode, into CONNECTED mode.

Figure 1:
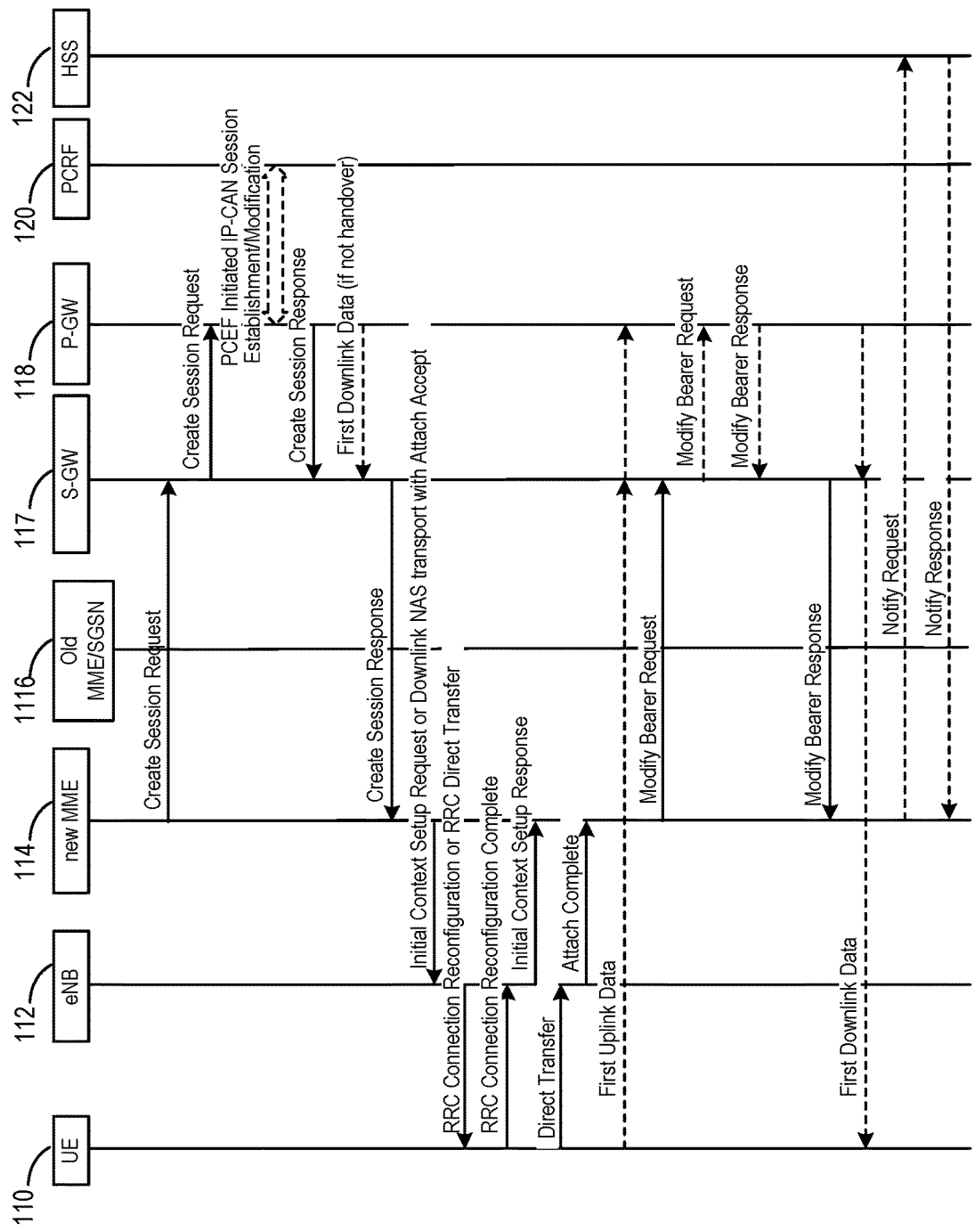
FIG. 1 is a signal flow diagram showing an attach procedure.
Figure 2:
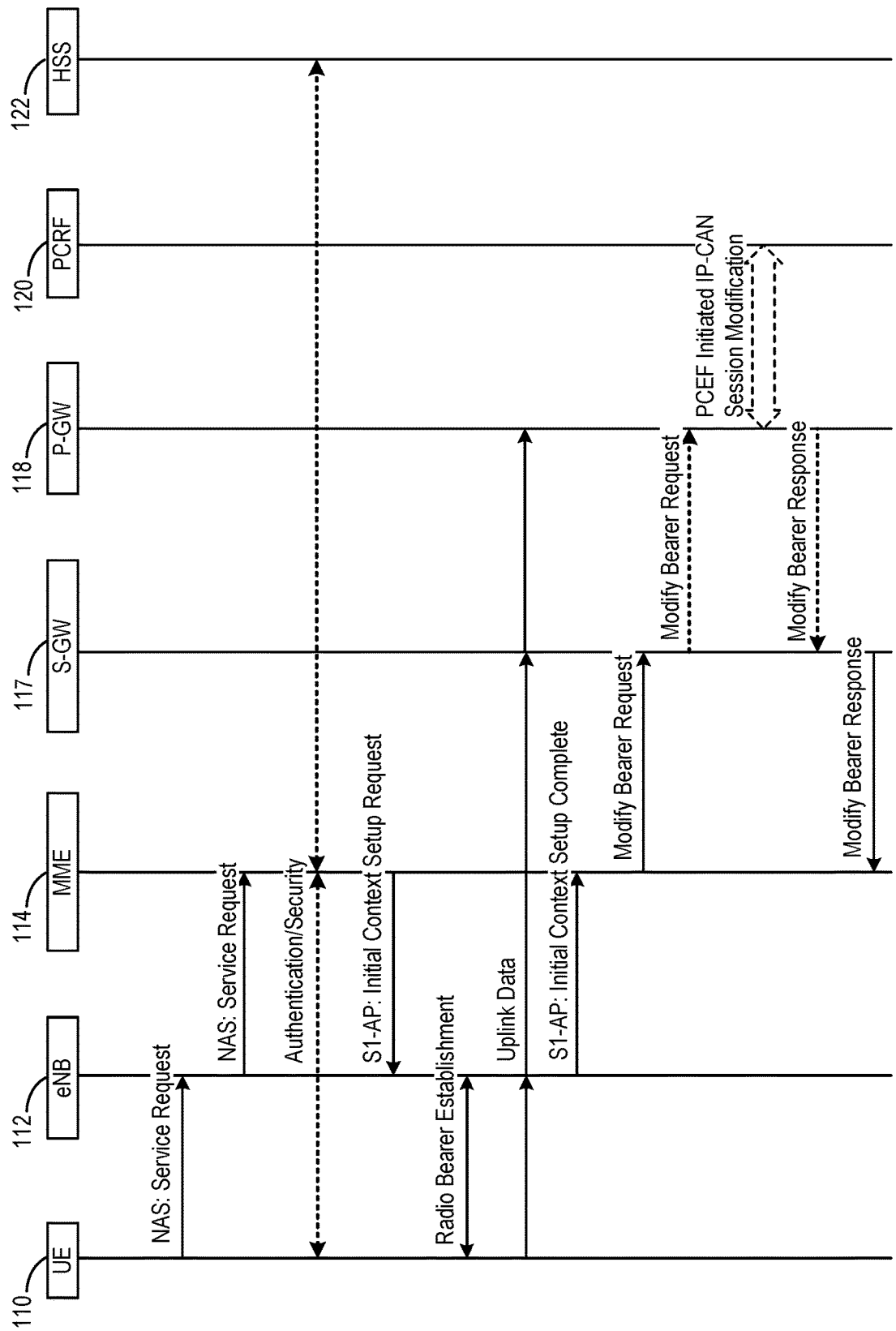
FIG. 2 is a signal flow diagram showing a service request procedure.

As an example, the problem is shown with respect to FIG. 1 and FIG. 2 for an EPS system (note that 5G systems share the same design problem). FIG. 1 is a signal flow diagram showing an attach procedure. See, e.g., 3GPP technical specification (TS) 23.401, section 5.3.2 (with processes 1-11 removed for brevity). FIG. 1 shows signaling between a UE 110, an eNB 112, an MME 114 (shown as new MME) or a co-located MME/serving GPRS support node (SGSN) 116 (shown as Old MME/SGSN), an S-GW 117, a P-GW 118, policy and charging rules function (PCRF) 120, and home subscriber server (HSS) 122. In particular, several create session request/response messages are exchanged among the MME 114, the S-GW 117, and the P-GW 118, to establish a GTP tunnel for each UE's user plane data transmission, during the initial attach request.

The UE's PDN context is retained at the (R)AN level as long as the UE is in CONNECTED mode. That is, when a UE transitions to IDLE mode, the (R)AN (e.g., the serving eNB 112) evicts UE's context. In order to re-establish a PDN connection, the UE 110 (e.g., IoT UE) uses a service request procedure. For example, FIG. 2 is a signal flow diagram showing a service request procedure. See, e.g., 3GPP TS 23.401, section 5.3.4. As part of the illustrated process, the serving eNB 112 creates an S1 connection with the MME 114 so as to retrieve the UE's context, which stores GTP tunnel information and the security parameters.

Such signaling overheads may be largely unnecessary, and may result in network resources consumption in case of IoT services that require only infrequent packets transmission (e.g., water/electric meter, or body health meter). This issue may be exacerbated by the forecasted widespread adoption of cellular connectivity in large scale IoT deployments. Furthermore, allowing a UE's PDN context retention at the (R)AN level even when the device is in IDLE mode (adding a new INACTIVE state for a device) would only partially solve the above issues. While keeping an inactive UE's context at (R)AN has the potential to mitigate the signaling storm when IoT devices enter CONNECTED mode, the signaling storm potentially generated by individual GTP tunnel establishment remains unsolved.

Most of the legacy approaches to these issues have a different goal, i.e., to protect a different link compared to the embodiments disclosed herein (e.g., MME-to-HSS in EPS, or AMF-to-AUSF/UDM in 5GS). Further, many prior approaches are unpractical because they are not backward-compatible with EPS authentication and key agreement (AKA) protocol, may use non-standard and/or heavyweight crypto (e.g., identity-based cryptography, pairing-based cryptography), and/or attempt to aggregate authentication responses from UEs (work only on very static and synchronized groups and/or trade-off with latency).

Thus, certain embodiments herein may efficiently serve massive IoT devices in a group basis without generating overwhelmed signaling overheads and without compromising the security of the IoT devices. Some embodiments disclosed herein are applicable for both of 5GS and EPS.

The remainder of this disclosure is organized into three main sections: A. Example Embodiments for Group Based Context and Security for M-IoT Devices; B. Additional or Alternative Embodiments for Group Based Context and Security for M-IoT Devices; and C. Mobility Support for Group Based Security for M-IoT.

A. Example Embodiments for Group Based Context and Security for M-IoT Devices

According to certain embodiments, the core network (CN) and the RAN node manage a shared group context for a particular IoT service group. The shared group context includes both the user plane routing profile and group security context. The user plane routing profile is shared among IoT devices that are allocated with an internet protocol version 4 (IPv4) address within an IPv4 address pool, an internet protocol version 6 (IPv6)-prefix, or a common network slice. That is, the network transmits the IP/Non-IP packets via common user plane routing policies. The group security context stores group key and relevant security parameters. The individual IoT device conducts a group enrollment procedure, stores the corresponding security parameters, and applies the security parameters when starting transmission of IP packets and/or non-IP packets.

The core network slice and RAN slice can be associated via IP address allocation policies, e.g., an allocated IPv6 prefix or an IPv4 addresses pool, or via network slice allocation.

When an IoT device returns from idle/inactive mode to connected mode for user plane packets transmission, the RAN node uses the shared group context to authenticate the IoT device and enforce the stored routing polices to forward the user plane packets. No signaling messages are exchanged between the RAN node and the core network.

The designated group security mechanism uses symmetric key approach which is compatible with legacy EPS key hierarchy.

Some embodiments may have one or more of the following advantages: the core network slice and RAN slice can be associated via IP address allocation policies, e.g., an allocated IPv6 prefix or an IPv4 addresses pool, or via network slice allocation, which provides a unified mechanism at the core network and the RAN, and still leaves flexibility on each slice to configure independent policies on the core network and the RAN; the RAN node stores only the shared group context including group security parameters and routing policies for the IoT devices; the RAN node and one or more data gateways in a control plane—user plane function (CP-UPF) do not need to maintain individual device context for a storing routing policy of the infrequent packets transmission (e.g., this may be beneficial in the case when receiving a mobile terminated acknowledgement message from the application server for the delivered IP packets); the group context mechanism reduces the storage space of the security parameters for each individual IoT device and also signaling overheads for retrieving the security parameters for each individual IoT device when the IoT devices return from idle to connected mode; the designated group security mechanism uses symmetric key approach, which is compatible with legacy EPS key hierarchy, a lightweight embodiment, and suitable for low-end IoT devices (e.g., the symmetric key approach may avoid the drawbacks of the asymmetric key approach, which is heavy, and might rely on public key infrastructure (PKI)); the light weight security control mechanism is suitable for a constraint IoT device with limited computation power; and/or the shared group context can avoid generating overwhelmed signaling overheads and at the same time it does not compromise the security of the IoT devices.

Figure 3:
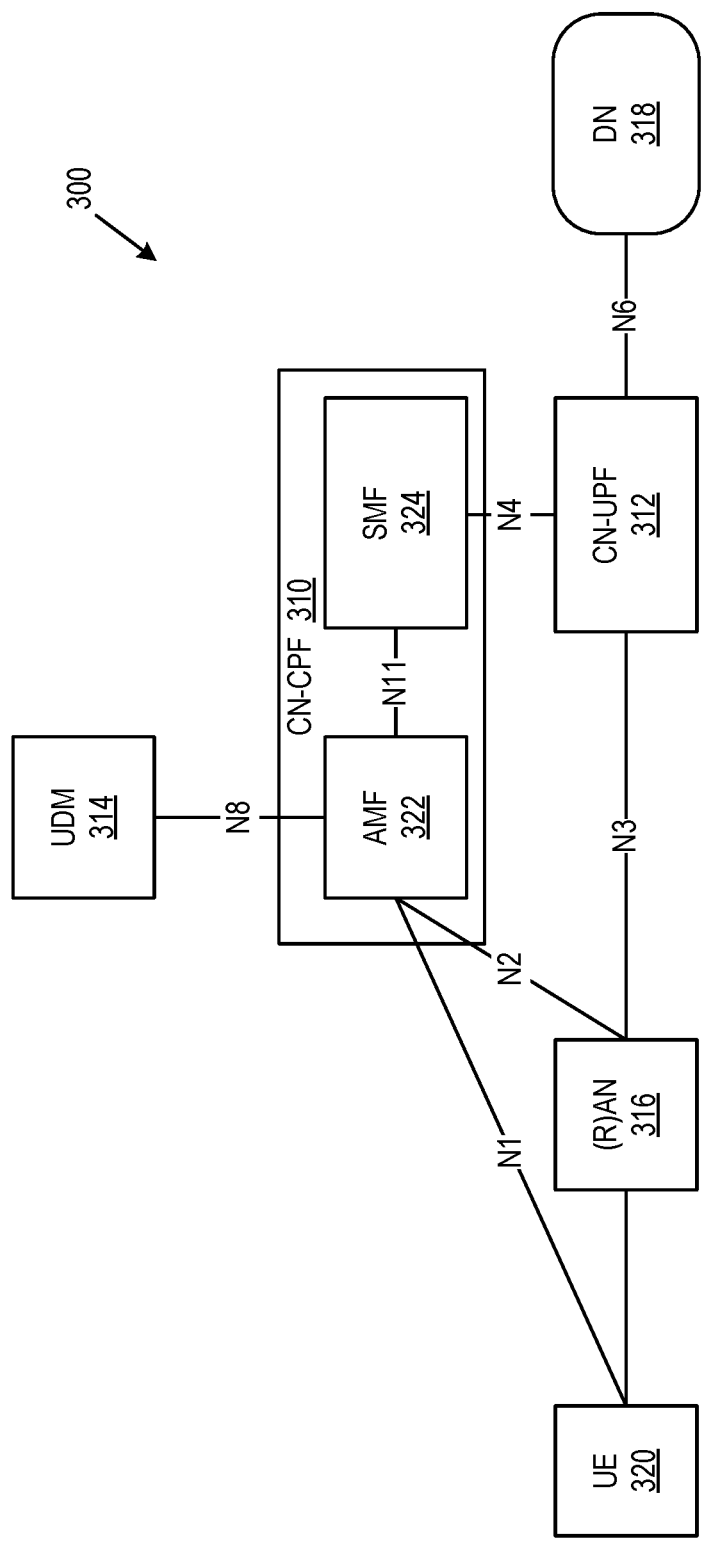
FIG. 3 is a block diagram of a reference system architecture for a next generation system or 5G system according to certain embodiments described herein.

FIG. 3 is a block diagram of a reference system architecture 300 for a next generation system (NGS) or 5G system according to certain embodiments described herein. See, e.g., 3GPP TS 23.501. As mentioned, however, embodiments described herein may be applicable for both NGS (5GS) and EPS. The illustrated architecture 300 includes a core network control plane function (CN-CPF) 310, a core network user plane function (CN-UPF) 312, a universal data management (UDM) 314 function, a (R)AN node 316, a data network (DN) 318, and a UE 320 (which may be an IoT device, or UE IoT). Corresponding interfaces N1, N2, N3, N4, N6, N8, and N11 are also shown.

The CN-UPF 310 includes an access and mobility management function (AMF) 322 and a session management function (SMF) 324. The AMF 322 is for registration/connection/security context management, etc., and to provide routing policies to the (R)AN node 316. The SMF 324 is for determining routing policies for a service requested by the UE 320 (e.g., IoT device), and for configuring/reconfiguring routing policies on one or more impacted data gateways (DGWs).

The CN-UPF 312 may include one or more DGWs (not shown). The CN-UPF 312 is to provide network load information to the SMF 324, configure the routing policies at the impacted DGWs, and forward the traffic packets to the next DGW or the DN 318 as configured in the routing policies.

The UDM 314 functions as a subscription repository and stores device/service subscription information.

The (R)AN node 316 establishes and maintains a group context, identifies the user plane traffic sending from the UE 320, enforces the routing policies provided by the AMF 322 and/or the SMF 324 in CN-CPF 310, and allocates radio resources for the UE 320 in Layer 2 messages.

The UE 320, as an IoT device, sends control plane signaling messages/user plane packets traffic towards a (R)AN node, if authorized.

Figure 4:
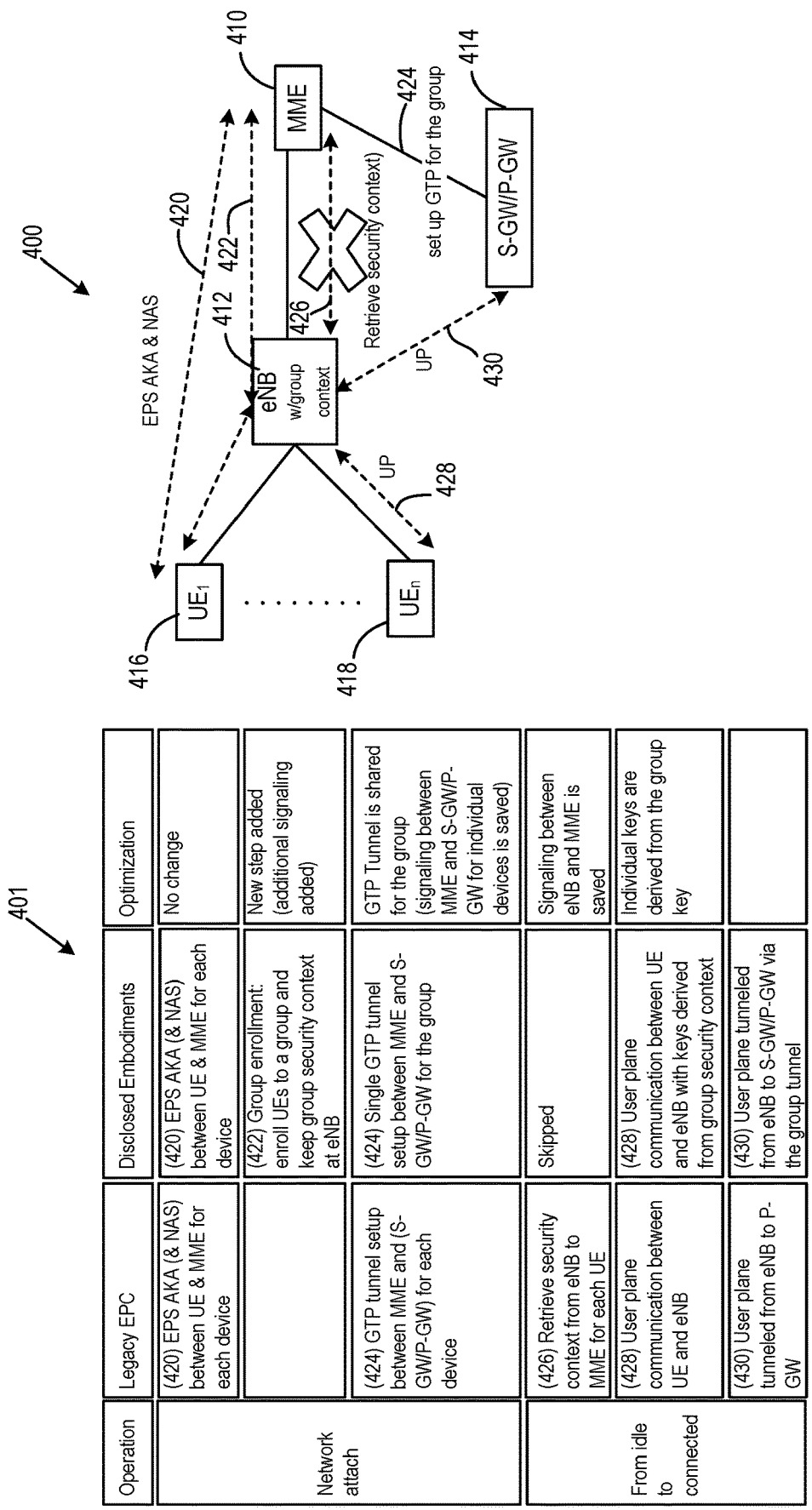
FIG. 4 is a block diagram of an example system architecture and table illustrating some differences between legacy EPC and certain disclosed embodiments.

FIG. 4 is a block diagram of an example system architecture 400 and table 401 illustrating some differences between legacy EPC and certain disclosed embodiments. In the illustrated example, an EPS based architecture is used, wherein as compared to the NGS/5GS architecture 300 shown in FIG. 3, an MME 410 corresponds to the AMF 322 in the CN-CPF 310, an eNB 412 corresponds to the (R)AN node 316, and an S-GW/P-GW 414 corresponds to the CN-UPF 312. UE(1) 416 to UE(n) 418 are also shown. In a network attach operation, a first process 420 includes EPS AKA and non-access stratum (NAS) between UE and the MME 410 for each device (e.g., UE(1) . . . UE(n)). The disclosed embodiments add an additional group enrollment process 422 that enrolls UEs to a group and keeps group context at the eNB 412.

In legacy EPC systems, the network attach operation further includes GTP tunnel setup process 424 between the MME 410 and the S-GW/P-GW 414 for each device (e.g., UE(1) . . . UE(n)). In certain embodiments disclosed herein, however, the GTP tunnel setup process 424 includes a single GTP tunnel setup between the MME 410 and the S-GW/P-GW 414 for the group. Thus, in the disclosed embodiments, the GTP tunnel is shared for the group (signaling between the MME 410 and the S-GW/P-GW 414 for individual devices is saved or eliminated to reduce overhead).

In a transition from idle to connected mode, the legacy EPC system includes a retrieve security context process 426 between the eNB and the MME 410, which is skipped in certain embodiments disclosed herein. Thus, in certain embodiments, signaling between the eNB 412 an the MME 410 to retrieve security context is saved or eliminated.

Also, when transitioning from idle to connected mode in the legacy EPC system, user plane (UP) communication 428 occurs between the UE (e.g., UE(1) . . . UE(n)) and the eNB 412. In certain embodiments described herein, the user plane communication 428 between the UE (e.g., UE(1) . . . UE(n)) and the eNB 412 is performed with keys derived from a group security context. Individual keys are derived from the group key.

Further, when transitioning from idle to connected mode in the legacy EPC system, the user plane is tunneled 430 from the eNB 412 to the P-GW. In certain embodiments disclosed herein, however, the user plane is tunneled 430 from the eNB 412 to the S-GW/P-GW 414 via a group tunnel.

As discussed below, certain embodiments provide three solutions for provisioning efficient and secure IoT services. A first solution creates a group for the relevant M-IoT service, a second solution provides connectionless user plane transmission, and a third solution provides group security control. In such embodiments, a group context may include one or more of: 1) a connectionless user plane routing context that enables all user traffic to be routed within a shared tunnel and hence reduce signaling overhead for the user plane; and/or 2) a group security context that establishes keys used to protect over the air transmission for members within the group and retain such security context at the RAN to reduce signaling overhead for the control plane. The solutions can be applied in different use cases of IoT services or UE/RAN/CN capabilities. For example, connectionless user plane routing context and group security context could be used separately or together to achieve maximum reduction for signaling overhead.

In an example embodiment, a group context includes both connectionless user plane routing context and group security context. That is, the three solutions may be applied for the IoT service which requires an IoT device entering idle/inactive mode after user plane traffic transmission, and the RAN/CN slice is capable of both user plane and control plane signaling optimization.

In another example embodiment, a group context contains only connectionless user plane transmission context. The second solution may be applied for the IoT service that requires an IoT device performing a detach procedure after user plane traffic transmission or both CN/RAN slices are only capable of user plane signaling optimization mechanisms. In this case, the RAN node may store individual security context and connectionless user plane transmission context for all IoT devices. In this case, only CN signaling optimization is accomplished.

In another example embodiment, a group context contains only group shared context. That is, the third solution may be applied for the IoT service that requires an IoT device entering inactive state after user plane traffic transmission or the RAN/CN slice are only capable of group shared security mechanism. In this case, the RAN node may store individual user plane transmission context for each IoT device and a group shared context for authenticating group membership of the IoT service.

A(1) Group Context Creation

The first solution introduces a group context for a group of IoT devices authorized for an IoT service, wherein the group context includes a user plane routing profile and a group security context. The user plane routing profile includes a packet forwarding/receiving path between the RAN node and the DGW in UPF, e.g., the IP address/port of the DGW in UPF or serving gateway (SGW) address and tunnel end-point identifier (TEID), are determined by the SMF and configured at one or more DGWs in UPF. The details are described in solution 2. In certain embodiments, an identifier is used to identify a user plane routing path indicated in the group context. The group security context includes pair-wised symmetric keys and relevant security parameters. The details are described in solution 3.

In certain embodiments, the network generates a group context for an IoT service in the following two options:

A(1)(a) Option1

When an application server sends a group service request to the network, the network authorizes and authenticates the application server for the group service. The network creates a group context for a group of IoT devices for the authorized IoT service. More details of Option1 are provided herein in "Section B. Additional or Alternative Embodiments for Group Based Context and Security for M-IoT Devices."

A(1)(b) Option2

When the first IoT device registers to the network and there is no group context stored, the network creates a group context for a group of IoT devices for the authorized IoT service.

The network transmits the group context to the RAN node and the RAN node stores the group context for authenticating the IoT devices returning from idle/inactive mode to connected mode for packets transmission. In the meantime, the RAN node forwards the received packets from the IoT devices based on the stored user plane routing profile in the group context. That is, the packets sent by the IoT devices within the same group are routed via the same routing policies towards the application server.

A(2) Connectionless User Plane Transmission

Based on the service subscription of the IoT devices, the network determines a network slice accommodating a group of IoT devices for the subscribed IoT service. The service subscription may include a default application server address, service location information, etc. For example, the network may determine an IoT group in which IoT devices are located in the same service area (e.g., a RAN node coverage) and have a common serving application server.

In addition, the network slice may be identified by a network slice identifier (ID), an IPv6 prefix, or an ID associated with an IPv4 address pool. Depending on the IoT devices' capability, the network can allocate an IPv4 address within the IPv4 address pool, an IPv6 prefix, or a network slice ID to the IOT device.

For an IoT device capable of IP based service, no changes at the IoT device is needed. If IPv4 address is allocated, the IoT device uses the allocated IPv4 address as the source IP address in the IP packets to be transmitted. If IPv6-prefix address is allocated, the IoT device auto-configures its IPv6 address accordingly and use the IPv6 address as the source IP address in the IP packets to be transmitted.

For an IoT device capable of non-IP packets transmission over the user plane, the IoT device is configured to mark the non-IP packets with the network slice ID or group identifier.

The IoT device sends IP packets or non-IP packets towards the RAN node, and the RAN node identifies the IP packets based on the source IP address or non-IP packets based on marked network slice ID or group identifier. Accordingly, the IP packets or non-IP packets may be forwarded based on the stored routing profile in the group context. That is, the RAN node applies the same user plane packets forwarding path, either GTP tunnel based or non-GTP tunnel based, to forward the received IP packets or non-IP packets sent by the group of the IoT devices to the application server.

Figure 5:
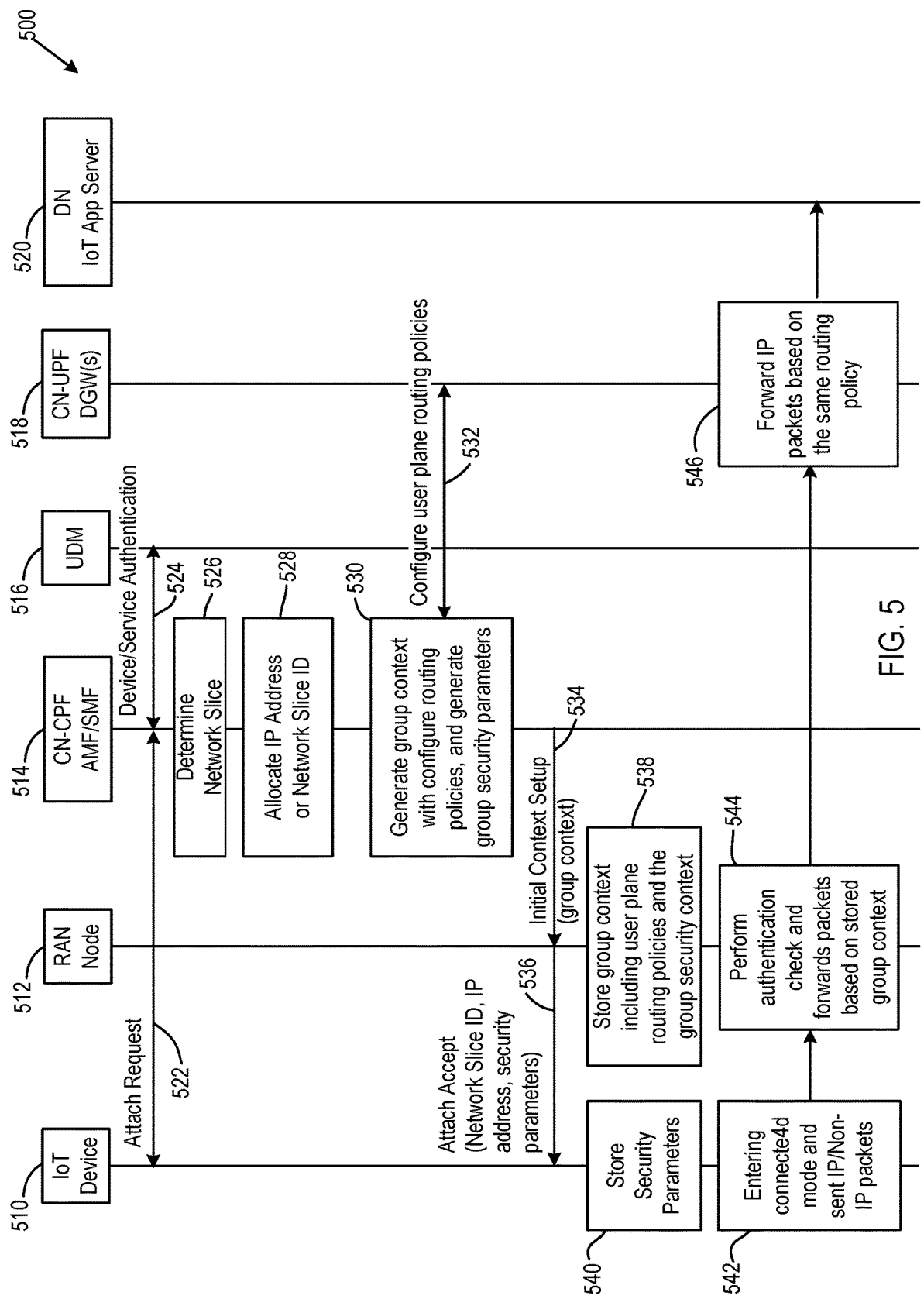
FIG. 5 is a signal flow diagram illustrating group context creation and connectionless user plane transmission according to certain embodiments.

FIG. 5 is a signal flow diagram illustrating group context creation and connectionless user plane transmission according to certain embodiments. The illustrated embodiment shows interactions between an IoT device 510, a RAN node 512, a CN-CPF AMF/SMF 514, a UDM 516, CN-DGW(s) 518, and a DN IoT application (App) server 520. The process includes the IoT device 510 sending an attach request 522 to the CN-CPF AMF/SMF 514, which responds by performing device/service authentication 524 with the UDM 516. After authenticating the device and/or service, the CN-CPF AMF/SMF 514 determines 526 a network slice for the service based on the service subscription of the device, allocate 528 an IP address and/or network slice ID, and generate 530 a group context for the group of devices with routing policies and group security parameters. The CN-CPF AMF/SMF 514 communicates with the CN-UPF DGW(s) 518 to configure 532 the user plane routing policies for the group context. The CN-CPF AMF/SMF 514 sends an initial context setup (group context) to the RAN node 512, which in turn sends an attach accept message 536 to the IoT device 510. The attach accept message 536 may include a network slice ID, an IP address, and/or security parameters).

The RAN node 512 stores 538 the group context including the user plane routing policies and the group security context. The IoT device 510 stores 540 the security parameters. Upon the IoT device 510 entering 542 connected mode and sending IP or non-IP packets to the RAN node 512, the RAN node 512 performs 544 an authentication check and forwards the packets based on the stored group context to the CN-UPF DGW(s) 518. The CN-UPF DGW(s) 518 forwards 546 the IP packets based on the same routing policy to the DN IoT application server 520.

A(3) Group Security Control

Figure 6:
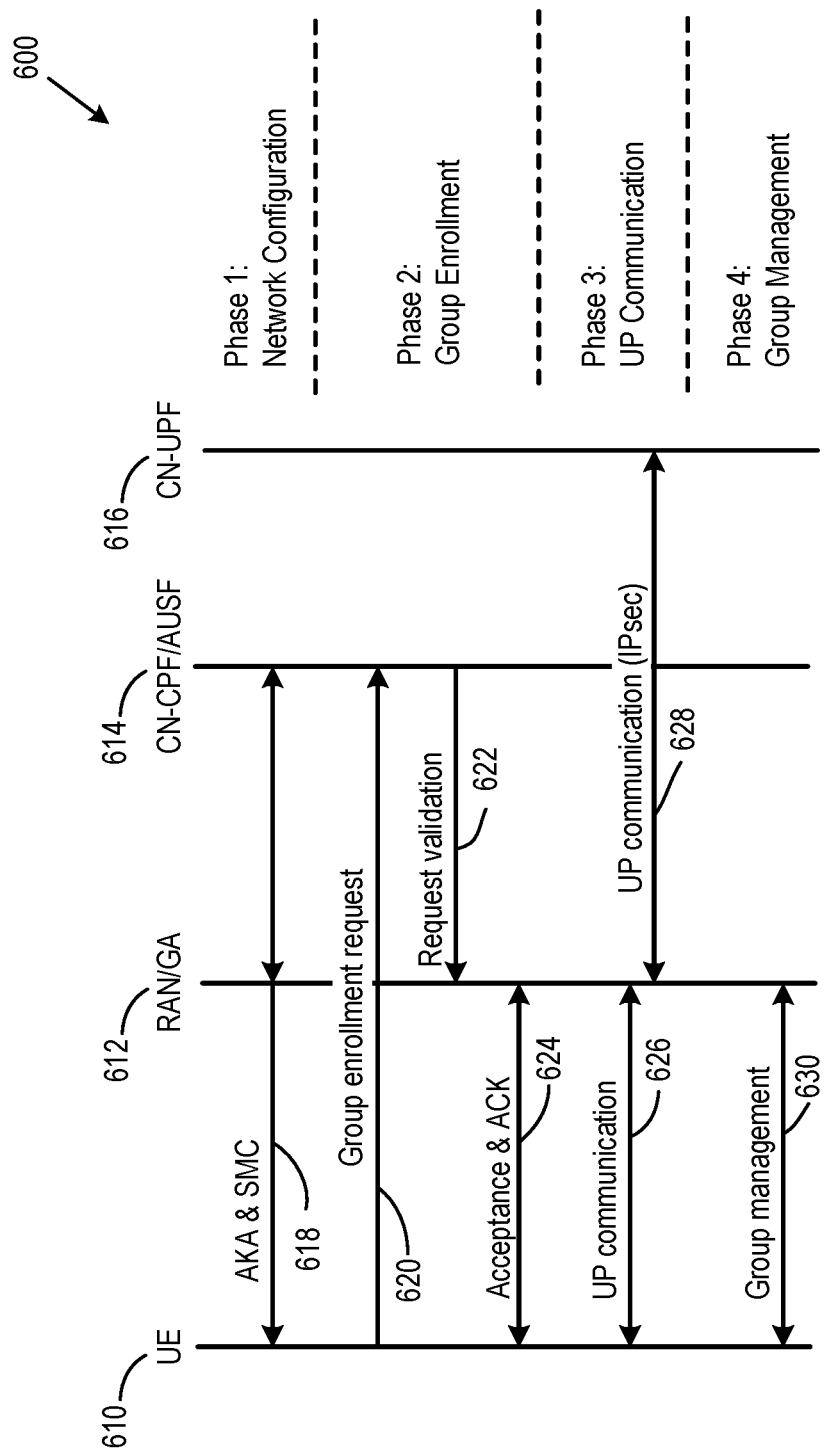
FIG. 6 is a signal flow diagram illustrating high-level security control procedures for securing massive IOT services according to certain embodiments.

FIG. 6 is a signal flow diagram illustrating high-level security control procedures 600 for securing massive IOT services according to certain embodiments. The illustrated high-level security control procedures 600 include four phases for handling IoT devices (represented by UE 610) as a group. In FIG. 6, an authentication server function (AUSF) is a trust anchor for building a trust relationship between an IoT device and a group authority (GA), wherein the AUSF can reside in the core network with the CN-CPF (shown together as CN-CPF/AUSF 614) and the GA manages a group of IoT devices and can reside in a RAN node (shown together as RAN/GA 612). A CN-UPF 616 is also shown.

Phase 1 comprises network configuration including trust building via AKA and security mode control (SMC) 618. In particular, phase 1 includes performing mutual-authentication between the IoT device and the AUSF, as well as the GA and the CN-CPF/AUSF on the control plane by running EPS-AKA (AKA in EPS) and NAS-SMC (SMC via NAS signaling). This phase prepares trust assumptions for the following phases as it enables the AUSF as the trust anchor with respect to the IoT device and the GA.

Phase 2 comprises group enrollment wherein an IoT device is enrolled into a group managed by the GA with the assistance from the CN-CPF/AUSF. Phase 2 provides for signaling optimization without sacrificing security protections. In this phase, the AUSF is assumed to be the anchor, but certain embodiments are not limited to this condition. If the AUSF is assumed, the CN-CPF contacts the AUSF for proper handling of security control. The CN-CPF may perform the group enrollment procedure directly. The details are described below.

Phase 3 comprises user plane (UP) communication. The UP communication between the UE and the RAN node may be protected based on the group security context (enabled in Phase 2), while the UP communication between GA and CN-UPF is protected by internet protocol security (IPsec).

Phase 4 comprises group management wherein local group maintenance is managed by the GA, e.g., key refreshing, membership revocation, etc.

Each of the phases is described in detail below.

A(3)(a) Phase 1—Trust Building

The IoT device, GA, and the CN-CPF/AUSF have respective identifiers for uniquely identifying each other. In order to be compatible with the current EPS key hierarchy for constraint IoT devices and provide signaling optimization without compromising security protections, the trust building in certain embodiments is through the EPS-AKA and NAS-SMC procedures.

The CN-CPF/AUSF uses group identity information to trigger the trust building procedures with the IoT device and the GA. Phase 1 may be performed during an IoT device attach procedure with the following three options for identifying the group member. In a first option, the IoT device indicates its group identity in the attach request message to the AMF in CN-CPF. In a second option, based on the IoT device identity, the AMF in CN-CPF may check the service subscription from the UDM. The service subscription indicates the group identity for the IoT device to the AMF. In a third option, based on the IoT device identity, the CN-CPF/AUSF may be able to refer to the corresponding group of the IoT device. For example, the IoT device identity has embedded the group identity information. For the first and second options, the AMF in CN-CPF indicates the group identity to the AUSF. Then, the AUSF generates a security key for integrity (KNASint) and a security key for confidentiality (KNASenc) for the IoT device, as well as security key for integrity (KGAint) and a security key for confidentiality (KGAenc) for the GA.

After trust building, the IoT device may obtain the KNASint and KNASenc, from an attach accept message and the GA may receive the security keys, KGAint and KGAenc, from an initial context setup request message. Both the IoT device and the GA store both keys.

A(3)(b) Phase 2—Group Enrollment

To allow a group of IoT devices sharing the same security group context, the group enrollment procedure enables the enrollment with authenticity and confidentiality guarantee by using symmetric keys and symmetric crypto operations.

The group enrollment procedure includes four message exchanges as shown in FIG. 6: the IoT device (UE 610) sends an enrollment request 620 to the CN-CPF/AUSF 614, indicating its intention to join the group managed by the GA (RAN/GA 612); the CN-CPF/AUSF 614 validates this request and then sends a request validation 622 to the GA (RAN/GA 612; the GA (RAN/GA 612) grants the group membership to the IoT device (UE 610) by sending an enrollment acceptance and receiving in return an enrollment acknowledgement (shown as acceptance and ACK 624).

In certain embodiments, three layers of mutual-trust relationships are provided for the group enrollment, including: corresponding to the group enrollment request 620, the first layers are between the IoT device and the CN-CPF/AUSF with a symmetric encryption key KNASenc and a symmetric integrity key KNASint; corresponding to the request validation 622, the second layer is between the GA and the CN-CPF/AUSF with a symmetric encryption key KGASenc and a symmetric integrity key KGASint; and correspond to the acceptance and ACK 624, the third layer is between the IoT device and the GA.

For example, the group enrollment procedure may be a new NAS procedure or a service request/extended service request procedure. The IoT device initiates the group enrollment procedure when it activates the IoT service after completing attachment procedure successfully in Phase 1.

For another example, the group enrollment procedure may be incorporated with an attach procedure. The first message (the group enrollment request 620 message) between the UE and the AUSF may be an attach request message with information elements without an authentication code "tag1" discussed below. The second message (the request validation 622 message) between the GA and the AUSF may be an initial context setup request message or downlink NAS transport with attach accept message, in which the message includes token TK1 and token TK2. The third message (the group enrollment accept message part of the acceptance and acknowledgement 624) between the GA and the UE may be an RRC connection reconfiguration message or RRC direct transfer, in which the message includes token TK1 and token TK3. The fourth message (the group enrollment acknowledgement message part of the acceptance and ACK 624) between the UE and the GA may be an RRC connection reconfiguration complete message or direct transfer message with attach complete message, in which the information elements includes tag4 or (N1, N2, $C_{UE}$, $id_{UE}$, $id_{GA}$).

Figure 7:
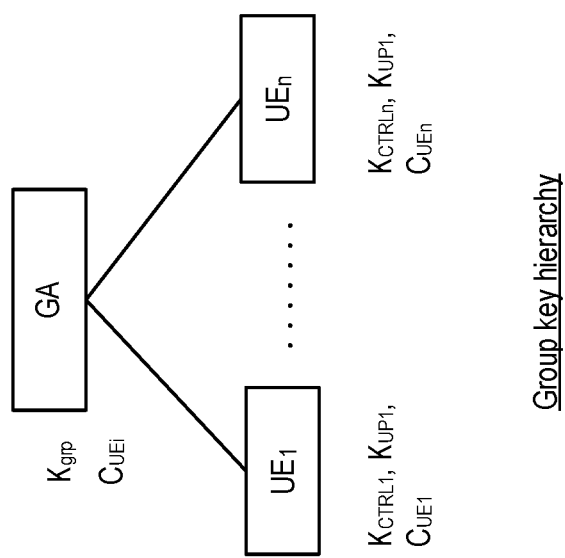
FIG. 7 is a block diagram illustrating an example key hierarchy according to one embodiment.

FIG. 7 is a block diagram illustrating an example key hierarchy, in which the GA manages the $K_{grp}$ and $C_{UEi}$, according to one embodiment.

Figure 8:
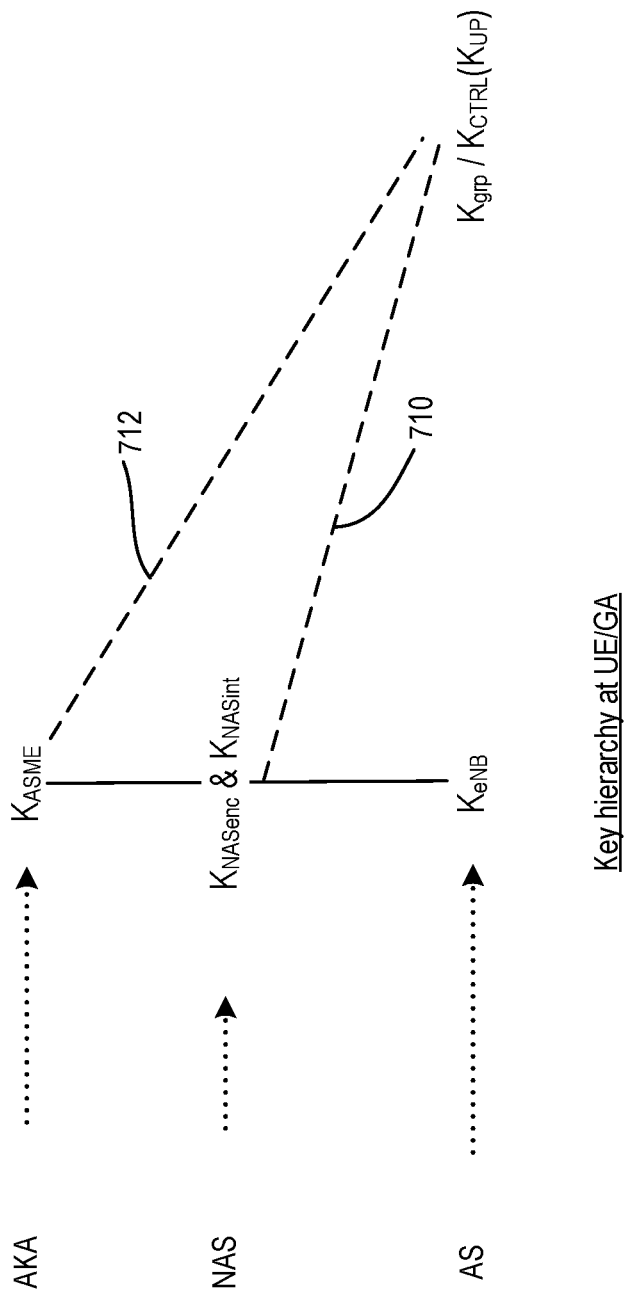
FIG. 8 is a block diagram illustrating an example key hierarchy according to one embodiment.

FIG. 8 is a block diagram illustrating an example key hierarchy stored at the UE and GA according to one embodiment. The dashed lines show the security protection mechanisms for the generated keys (K) including $K_{grp}$, $K_{CTRL}$ ($K_{UP}$). There are two options for the security protection mechanisms. As shown at dashed line 710, the first option uses the $K_{NASenc}$ and $K_{NASint}$ from the NAS to protect the delivery of $K_{grp}/K_{CTRL}$ ($K_{UP}$). As shown at dashed line 712, the second option uses the $K_{ASME}$ from AKA to protect the delivery of delivery of $K_{grp}/K_{CTRL}$ ($K_{UP}$). The access stratum (AS) provides the eNB key $K_{eNB}$.

Figure 9:
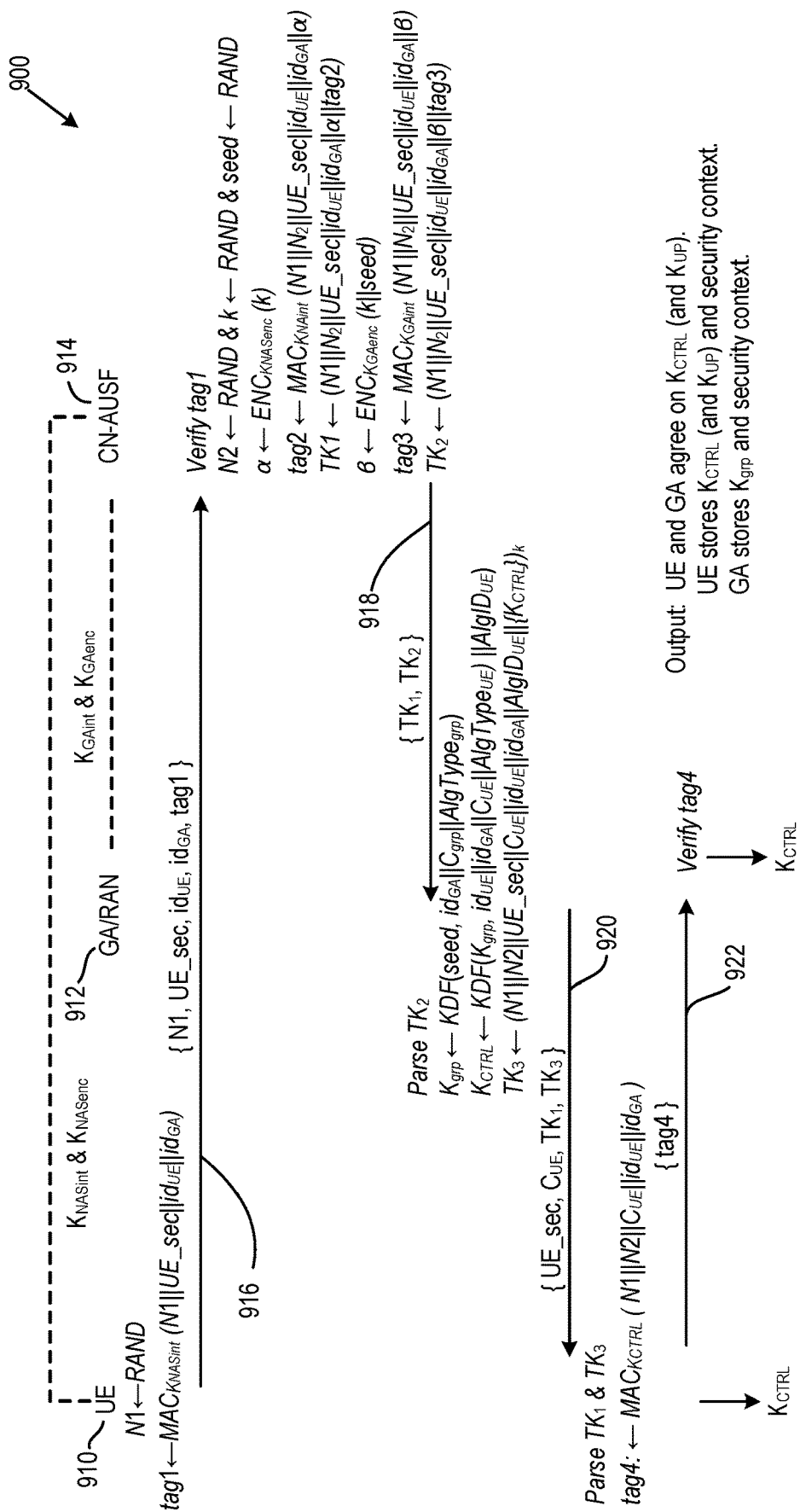
FIG. 9 is a diagram illustrating protocol message details and certain operations of a group enrollment procedure according to one embodiment.

The group enrollment procedure includes four message exchanges among the UE, the GA and the CN-CPF/AUSF. FIG. 9 is a diagram illustrating protocol message details and certain operations of a group enrollment procedure 900 according to one embodiment. The group enrollment procedure 900 is between a UE 910 (e.g., an IoT UE), a GA/RAN 912, and a CN-AUSF 914 (e.g., a CN-CPF/AUSF). Table 1 lists notations and corresponding descriptions used in the group enrollment procedure shown in FIG. 9.

GA/RAN 920 to the UE 910, and a fourth message 922 from the UE 910 to the GA/RAN 922. The message details are discussed below:

A(3)(b)(i) First Message: UE to CN/AUSF {N1 ∥ UE sec ∥ $id_{UE}$ ∥ $id_{GA}$ ∥ tag1}

The first message 916 is a group enrollment request from the UE 910 to the CN-AUSF 914. The first message 916 initiates a fresh group enrollment session. To generate parameters in the first message 916, the UE 910 conducts the following operations (where RAND is a pseudorandom number or random string):

UE: N1←RAND

UE: tag1←$MAC_{KNASint}$(N1 ∥ UE_sec ∥ $id_{UE}$ ∥ $id_{GA}$)

To initiate a new protocol session, the UE 910 generates a fresh random nonce N1 to prevent a replay attack and uniquely identify the new protocol session. The UE 910 includes its security capabilities UE_sec in the first message 916 to facilitate the crypto algorithm negotiation in the

TABLE 1

| Notation | Description | Notation | Description |
| --- | --- | --- | --- |
| $K_{NASenc}$, $K_{NASint}$ | Encryption key and integrity key between UE and AUSF | $(A\|\|[B])_k$ | Authenticated encryption with key k (B - plaintext to be encrypted, A - header to be authenticated) |
| $K_{GAenc}$, $K_{GAint}$ | Encryption key and integrity key between GA and AUSF | $K_{grp}$ | Group key |
| N1, N2 | Nonce | $C_{grp}$ | Group counter |
| tag1, tag2, tag3, tag4 | Message authentication tag | $C_{UE}$ | UE counter |
| UE_sec | UE security capabilities | $K_{CTRL}$ | UE's group membership key (control plane) |
| $id_{UE}$, $id_{GA}$ | Identifier of UE and GA | KDF | Key derivation function |
| k | Random key generated by AUSF | ∥ | Concatenation |
| TK1, TK2, TK3 | Token | α, β | Ciphertext |
| $AlgID_{UE}$ | Identifier of the crypto algorithm used between UE and GA | $ENC_k$(M) | Encrypt M with key k |
| $AlgType_{grp}$, $AlgType_{UE}$ | Identifier of the key usage for the group master key and UE's membership key | $MAC_k$(M) | Message authentication code on M with key k |
| Seed | Random seed generated by AUSF | | |

In the group enrollment procedure 900 shown in FIG. 9, the $K_{grp}$, $K_{CTRL}$ ($K_{UP}$) is generated at the GA/RAN 912 with q seed provided by the CN-AUSF 914. Alternatively, the $K_{grp}$, $K_{CTRL}$ ($K_{UP}$) can be generated at the CN-AUSF 914 and passed to the GA/RAN 912. A corresponding key refreshment mechanism can be used, e.g., based on a refresh timer at the GA/RAN 912 or the CN-AUSF 914, wherein the refresh timer can be provided by the GA/RAN 912 and/or the CN-AUSF 914, accordingly.

The group enrollment procedure 900 shown in FIG. 9 includes a first message 916 from the UE 910 to the CN-AUSF 914, a second message 918 from the CN-AUSF 914 to the GA/RAN 912, a third message 920 from the following message exchanges. The UE 910 also specifies which group it wants to join by providing the identifier of the intended GA/RAN 912, $id_{GA}$. The UE's identifier $id_{UE}$ is also explicitly included to prevent misbinding attacks. Lastly, to guarantee the integrity of the first message 916 and prevent message modification, a message authentication code tag1 is calculated with the symmetric integrity key $K_{NASint}$ shared between the UE 910 and the CN-AUSF 914.

In certain embodiments, the group enrollment procedure 900 may be initiated whenever necessary. Optionally, group enrollment procedure 900 can be scheduled together with a NAS procedure. In that case, the first message 916 may be piggybacked with the NAS service request message by adding N1 and $id_{GA}$.

A(3)(b)(ii) Second Message: CN/AUSF to GA/RAN {TK1 II TK2}

The second message 918 is a request validation message from the CN-AUSF 914 to the GA/RAN 912. As the UE 910 and the GA/RAN 912 do not trust each other at this point, the CN-AUSF 914 verifies the UE's request and facilitates the mutual-authentication between the UE 910 and the GA/RAN 912.

Upon receiving the first message 916, the CN-AUSF 914 performs the following operations to construct the second message 918:

CN-AUSF: verify tag1 with $K_{NASint}$
CN-AUSF: N2←RAND
CN-AUSF: k←RAND
CN-AUSF: seed←RAND
CN-AUSF: α←$ENC_{KNASenc}$(k)
CN-AUSF: tag2←$MAC_{KNASint}$(N1 II N2 II UE_sec II $id_{UE}$ II $id_{GA}$ II α)
CN-AUSF: TK1←(N1 II N2 II UE_sec II $id_{UE}$ II $id_{GA}$ II α II tag2)
CN-AUSF: 13←$ENC_{GAenc}$(k II seed)
CN-AUSF: tag3←$MAC_{KGAint}$(N1 II N2 II UE_sec II $id_{UE}$ II $id_{GA}$ II β)
CN-AUSF: TK2←(N1 II N2 II UE_sec II $id_{UE}$ II $id_{GA}$ II β II tag3)

Upon receiving the first message 916 from the UE 910, the CN-AUSF 914 validates the first message 916 with $K_{NASint}$. If tag1 is correct, the CN-AUSF 914 continues to generate a fresh nonce N2 that contributes to the protocol session, a random number seed that will be used to derive the group master key, and a random ephemeral key k that enables mutual trust between the UE 910 and the GA/RAN 912. A token TK1 is generated for the UE 910 to deliver secret key k together with the session information (i.e., nonce, UE security capabilities, identifiers). Within TK1, k is encrypted by $K_{NASenc}$ to protect confidentiality. The integrity of the session information is protected by $K_{NASint}$. Another token TK2 is generated for the GA/RAN 912 to deliver the secret key k and seed together with the session information. Within TK2, k and seed are encrypted by $K_{GAenc}$ to protect confidentiality and the integrity of the session information is protected by $K_{GAint}$. The CN-AUSF 914 sends both tokens to the GA/RAN 912 in the second message 918, which then will forward TK1 to the UE 910.

A(3)(b)(iii) Third Message: GA/RAN to UE {TK1 II TK3}

The third message 920 is an enrollment acceptance from the GA/RAN 912 to the UE 910. After checking the second message 918, the GA/RAN 912 sends the third message 920 to the UE 910 to deliver the group context, including the membership key for the UE 910 and the relevant security parameters.

Upon receiving the second message 918, the GA/RAN 912 performs the following operations to construct the third message 920:

GA/RAN: parse TK2 with $K_{GAenc}$ and $K_{GAint}$
GA/RAN: Kgrp←KDF(seed, $id_{GA}$ II $C_{grp}$ II $AlgType_{grp}$)
GA/RAN: $K_{CTRL}$←KDF($K_{grp}$, $id_{UE}$ II $id_{GA}$ II $C_{UE}$ II $AlgType_{UE}$ II $AlgID_{UE}$)
GA/RAN: TK3←(N1 II N2 II UE_sec II $C_{UE}$ II $id_{UE}$ II $id_{GA}$ II $AlgID_{UE}$ II {$K_{CTRL}$})$_k$ Upon receiving the second message 918 from the CN-AUSF 914, the GA/RAN 912 parses TK2 with $K_{GAenc}$ and $K_{GAint}$, and extracts k and seed. The seed is used to derive the group master key $K_{grp}$, from which the membership keys will be derived. $AlgType_{grp}$ is the identifier that indicates $K_{grp}$ is the group master key. By tuning parameters of the $AlgType_{grp}$, different keys may be generated for different usage, e.g., $K_{CTRL\_INC}$ for control plane integrity protection, $K_{CTRL\_ENC}$ for control plane encryption protection and $K_{UP}$ for user plane encryption protection. Herein, the details are abstracted and an example is provided for generating $K_{CTRL}$. The GA/RAN 912 uses $K_{grp}$ together with context information to derive the membership key $K_{CTRL}$ for the UE 910. At this point, the GA/RAN 912 may also derive the user plane key $K_{UP}$, following the same method as deriving $K_{CTRL}$ with $AlgType_{UP}$ (instead of $AlgType_{UE}$) indicating that the key is for user plane usage. Token TK3 is generated to protect $K_{CTRL}$ (and $K_{UP}$) together with the security context by authenticated encryption with key k. The GA/RAN 912 sends TK1 and TK3 in the third message 920 to the UE 910.

A(3)(b)(iv) Fourth Message: UE to GA/RAN {tag4}

The fourth message 922 is an enrollment acknowledgement from the UE 910 to the GA/RAN 912 to confirm the success of the group enrollment process.

Upon receiving the third message 920, the UE 910 performs the following operations to construct the fourth message 922:

UE: parse TK1 with $KN_{ASenc}$ and $K_{NASint}$ and extract secret key k
UE: parse TK3 with k and extract $K_{CTRL}$
UE: tag4←$MAC_{KCTRL}$(N1 II N2 II $C_{UE}$ II $id_{UE}$ II $id_{GA}$)

Upon receiving the third message 920, the UE 910 parses TK1 with $K_{NASenc}$ and $K_{NASenc}$ and extract secret key k, which then is used to parse TK3 to extract membership key $K_{CTRL}$. To inform the GA/RAN 912 that the UE 910 has been successfully received $K_{CTRL}$ and confirmed the correctness of the session context, the UE 910 uses $K_{CTRL}$ to compute a message authentication code, tag4, on its security context (i.e., nonce, identifiers and the counter). The tag4 is sent to the GA/RAN 912 as the fourth message 922.

A(3)(b)(v) Operations at GA/RAN: verify tag4 with Key $K_{CTRL}$

The group enrollment procedure 900 is successfully concluded with the following output: agreement between the UE 910 and the GA/RAN 912 on key $K_{CTRL}$ (and $K_{UP}$); the GA/RAN912 stores $K_{grp}$ per group and the security context ($C_{grp}$, $C_{UE}$, $id_{GA}$, $id_{UE}$, $AlgType_{UE}$, $AlgID_{UE}$); and the UE 910 stores key $K_{CTRL}$ and the security context ($C_{UE}$, $id_{GA}$, $id_{UE}$, $AlgID_{UE}$).

A(3)(c) Phase 3—UP Communication

When the IoT device (e.g., UE, or IoT UE) enters connected mode for user plane data transmission, the IoT device uses the $K_{CTRL}$ for control plane signaling integrity protection and optionally $K_{UP}$ for user plane data packets encryption. For example, the user plane communication can be performed as follows: the IoT device may send an L2 signaling message which applies $K_{CTRL}$ (e.g., RRC request message) to the RAN node for authenticating the signaling integrity before starting the transmission of the user plane traffic; when the RAN node receives the L2 signaling message, based on stored group security context, the RAN node checks the signaling message integrity by $K_{CTRL}$; if user plane encryption key, $K_{UP}$, is provided during the group enrollment procedure, the IoT device may piggyback the user plane traffic encrypted by $K_{UP}$ in the L2 signaling message or transmit the user plane traffic in the following user plane message; and if the group security check is passed, the RAN node forwards the received user plane packets according to the routing policies context in the stored group context.

In another embodiment, the IoT device may send an L3 signaling message which applies $K_{CTRL}$. For example, the IoT device may send a NAS message comprising a service request to the AMF. In such embodiments, the RAN node may not forward the NAS message. Rather, the RAN node authenticates the signaling integrity before starting the transmission of the user plane traffic.

In another embodiment, the IoT device may directly send a user plane traffic encrypted by $K_{UP}$. If the group security check is passed, the RAN node forwards the received user plane packets according to the routing policies context in the stored group context.

A(3)(d) Phase 4—Group Management

In certain embodiments, the GA (e.g., GA/RAN) is responsible for maintaining the group security context as well as handling events such as new member enrollment, membership revocation, and key refreshing. Based on IoT service characteristics, different group security update policies may apply. For example, the group security update policy may be a validity/update timer, a valid number of IOT devices, and/or a valid number of IP packets. When the criteria of the update policy are met, the GA may refresh the master key of the group as well as each member's control/user plane keys.

In one embodiment, when the GA refreshes the master key of the group, it may gradually refresh each member's control/user plane keys when the IoT device contacts the GA. Therefore, the GA may maintain multiple master keys of the group before all the group members get the refreshed master key of the group.

In another embodiment, the GA may broadcast the system information for the group management of the master key of the group. The IoT device may contact the GA within a period of time, otherwise it may have to perform group enrollment procedure again (e.g., send a service request indicating for group enrollment of the IoT service).

If a group member UE leaves the group or is detected to be compromised, the GA may immediately revoke the UE's membership and its corresponding keys.

A(4) High Level Processes

Figure 10A:
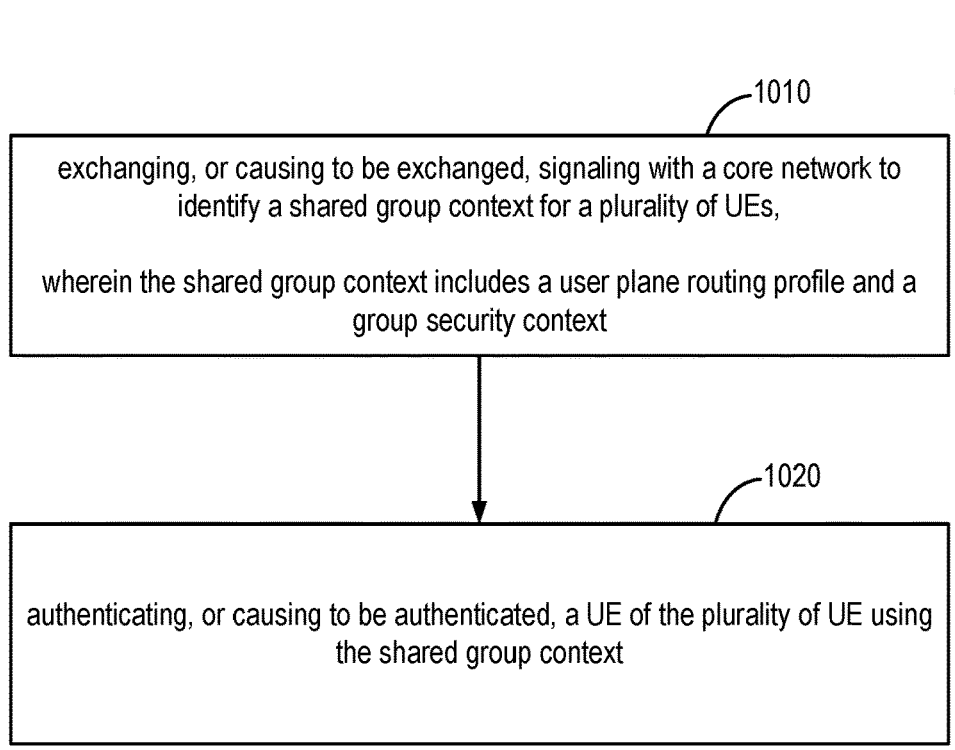
FIG. 10A is a flow diagram illustrating a high level process for group based context and security according to one embodiment.

FIG. 10A is a flow diagram illustrating a high level process 1000 for group based context and security according to one embodiment. The process 1000 includes exchanging 1010, or causing to be exchanged, signaling with a core network to identify a shared group context for a plurality of UEs, wherein the shared group context includes a user plane routing profile and a group security context. The process 1000 also includes authenticating 1020, or causing to be authenticated, a UE of the plurality of UEs using the shared group context.

Figure 10B:
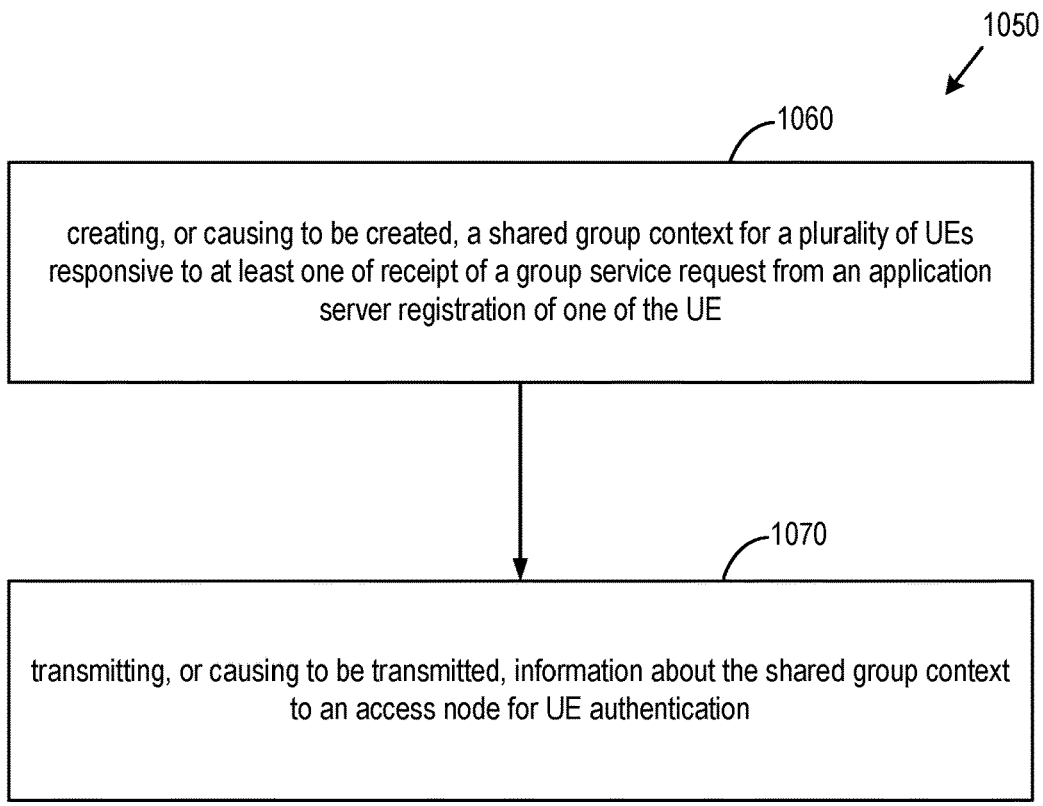
FIG. 10B is a flow diagram illustrating a high level process for group based context and security according to another embodiment.

FIG. 10B is a flow diagram illustrating a high level process 1050 for group based context and security according to another embodiment. The process 1050 includes creating 1060, or causing to be created, a shared group context for a plurality of UEs (user equipment) responsive to at least one of receipt of a group service request from an application server registration of one of the UE. The process 1050 also includes transmitting 1070, or causing to be transmitted, information about the shared group context to an access node for UE authentication.

A(5) Additional Examples

Example 1A may include the method and apparatus of group security control in a mobile network for a first network entity (AUSF) to validate a first device with a first security key for integrity ($K_{NASint}$) and a second security key for confidentiality ($K_{NASenc}$), and send a first message to a second network entity (GA) for managing group enrollment for the first device in respond to a second message received from the first device; the first message may include a first token (TK1) for the first device to deliver a third secret key (k) together with the session information including all nonce, UE security capabilities, identifiers; a second token (TK2) for the second network entity (GA) to deliver the third secret key (k) and a seed number together with the session information.

Example 2A may include the method of example 1A or some other example herein, for the first token, the third security key (k) is encrypted by the first security key ($K_{NASenc}$) to protect confidentiality and the integrity of the session information is protected by $K_{NASint}$.

Example 3A may include the method of example 1A or some other example herein, for the second token, the third security key (k) and the seed number are encrypted by a fourth security key ($K_{GAenc}$) to protect confidentiality and the integrity of the session information is protected by a fifth security key ($K_{GAint}$), wherein the fourth security key and the fifth security key are generated by the first network entity (AUSF) as a trust anchor between the first device and the second network entity (GA).

Example 4A may include the method of example 1A or some other example herein, wherein when the first message is received by the first network entity (AUSF), the first network entity (AUSF) conducts the following steps: firstly validates the second message with the first security key ($K_{NASint}$). If the validation is passed, the first network entity continues to generate a second fresh nonce (N2), the random seed number, and a random ephemeral key (k) as the first security key that enables mutual trust between the first device (IoT device) and the second network entity (GA).

Example 5A may include the method of example 1A (UE-AUSF) or some other example herein, wherein the first message is in response to the second message sent by the first device if the first network entity validates the first device successfully, wherein the second message may include the following information: a first tag value (TAG1) for the second message authentication, a first fresh random nonce (N1) to prevent replay attack and uniquely identify this new protocol session, security capabilities of the first device (UE_sec) used for facilitating the crypto algorithm negotiation for messages exchanges, a group identifier ($id_{GA}$), and its identity for preventing misbinding attacks.

Example 6A may include the method of example 5A or some other example herein, wherein to guarantee the integrity of the second message and prevent message modification, the first tag value is calculated with the first security key ($K_{NASint}$), which is a symmetric integrity key shared between the devices and the first network entity (AUSF). UE: tag 1←$MAC_{KNASint}$(N1 II UE_sec II $id_{UE}$ II $id_{GA}$).

Example 7A may include the method of example 6A or some other example herein, wherein the second network entity evaluates the group membership of the first device and sends a third message for accepting the group enrollment of the first device if the first device's membership is confirmed, wherein the third message includes the first token (TK1), a third token (TK3), wherein the third token is encrypted by the first security key (k).

Example 8A may include the method of example 7A or some other example herein, wherein the third token includes the following information: the fresh random nonce (N1), the fresh random nonce (N2), security capabilities of the first device (UE_sec), a group identifier ($id_{GA}$), a device identifier ($id_{UE}$), a counting number of the first device ($C_{UE}$), algorithm type of the device ($AlgID_{UE}$), and a control plane key ($K_{CTRL}$). That is, TK3←(N1 II N2 II UE_sec II $C_{UE}$ II $id_{UE}$ II $id_{GA}$ II $AlgID_{UE}$ II {$K_{CTRL}$})k.

Example 9A may include the method of example 8A or some other example herein, wherein the third token may additionally include the following informaiton: a user plane key ($K_{UP}$). That is, TK3←(N1 ∥ N2 ∥ UE_sec ∥ $C_{UE}$ ∥ $id_{UE}$ ∥ $id_{GA}$ ∥ $AlgiD_{UE}$ ∥ {$K_{CTRL}$} ∥{$K_{UP}$})k.

Example 10A may include the method of example 8A or some other example herein, wherein the control plane membership key ($K_{CTRL}$) is generated by the second network entity (GA) for the first device by a group master key ($K_{grp}$), wherein the group master key is calculated from KDF(seed value 1, $id_{GA}$ ∥ $C_{grp}$ ∥ $AlgType_{grp}$), in which $AlgType_{grp}$ is the algorithm type used for the group and $C_{grp}$ is the messages counts for the group. That is, $K_{grp}$←KDF(seed, $id_{GA}$ ∥ $C_{grp}$ ∥ $AlgType_{grp}$).

Example 11A may include the method of example 9A or some other example herein, wherein the control plane key ($K_{UP}$) is generated by the second network entity (GA) for the first device by a group master key ($K_{grp}$), wherein the group master key is calculated from KDF(seed value 2, $id_{GA}$ ∥ $C_{grp}$ ∥ $AlgType_{grp}$), in which $id_{GA}$ is a group identifier, $AlgType_{grp}$ is the algorithm type used for the group and $C_{grp}$ is the messages count for the group. That is, $K_{grp}$←KDF (seed, $id_{GA}$ ∥ $C_{grp}$ ∥ $AlgType_{grp}$).

Example 12A may include the method of example 3A or some other example herein, wherein the first device sends a fourth message including a fifth token to acknowledge the second network entity for receiving the third message if it authenticates the second network entity successfully, wherein the fifth token includes the following information: $MAC_{KCTRL}$(N1 ∥ N2 ∥ $C_{UE}$ ∥ $id_{UE}$ ∥ $id_{GA}$), the fresh random nonce (N1), the fresh random nonce (N2), the message count of the first device ($C_{UE}$), a group identifier ($id_{GA}$), a device identifier ($id_{UE}$).

Example 13A may include the method of example 12A or some other example herein, when receiving the third message, the first device parses the first token (TK1) with the first security key and the second security key (KNASenc and KNASint), and extracts the third secret key (k), which then is used to parse the third token to extract control plane membership key ($K_{CTRL}$).

Example 14A may include the method and apparatus of handling a group of devices in a mobile network is for a first network entity (AMF) to create a group context for the group of devices, in which the group context includes a user plane routing profile and a group security context.

Example 15A may include the method of example 14A or some other example herein, wherein the user plane routing profile contains at least one of the following information packet forwarding/receiving path between the RAN node and the DGW in UPF, wherein the IP address/port of the DGW in UPF or SGW address and TEID (tunnel end-point ID) are determined by the SMF and configured at one or more DGWs in UPF.

Example 16A may include the method of example 14A or some other example herein, wherein the group security context contains pair-wised symmetric keys and relevant security parameters.

Example 17A may include the method of example 14A or some other example herein, wherein the first network entity may generate the group context for a service when an Application Server sends a group service request to the network, the network authorizes and authenticates the application server for the group service.

Example 18A may include the method of example 14A or some other example herein, wherein the first network entity may generate the group context for a service when the first device registers to the network and there is no group context stored, the network creates a group context for a group of devices for the authorized service.

Example 19A may include the method of example 14A or some other example herein, wherein the first network entity transmits the group context to a second network entity (RAN node) and the second network entity stores the group context for authenticating the first device returning from idle/inactive mode to connected mode for packets transmission, and forwards the received packets from the first device based on the stored user plane routing profile in the group context.

Example 20A may include the method and apparatus of managing a network slice for a group of devices of a service in a mobile network is for a first network entity (AMF) to determine the network slice for the service based on the service subscription of the device and send a first message to a second network entity (RAN node), wherein the service subscription may contain at least one of the following information—the default application server address, service location information; the first message includes the group context for the group of devices.

Example 21A may include the method of example 20A or some other example herein, wherein the network slice may be identified by an network slice ID, an IPv6 prefix, or an ID associated with an IPv4 address pool, wherein depending on the devices' capability, the first network entity can allocate an IPv4 address within the IPv4 address pool, an IPv6 prefix, or a network slice ID to the IoT device.

Example 22A may include the method of example 21A or some other example herein, wherein if an IPv4 address is allocated to the first device, the first device uses the allocated IPv4 address as the source IP address in the IP packets to be transmitted. If an IPv6-prefix address is allocated, the first device auto-configures its IPv6 address accordingly and uses the IPv6 address as the source IP address in the IP packets to be transmitted.

Example 23A may include the method of example 21A or some other example herein, wherein for the IoT device capable of Non-IP packets transmission over user plane, the first device needs to mark the Non-IP packets with the network slice ID or group identifier when transmitting the user plane packets.

Example 24A may include the methods of examples 22A or 23A or some other example herein, wherein the device sends IP packets or Non-IP packets towards the second network entity, and the second network entity can identify the IP packets based on the source IP address or Non-IP packets based on marked network slice ID or group identifier, and forward the IP packets or Non-IP packets based on the stored routing profile in the group context accordingly.

Example 25A may include the method of example 24A or some other example herein, wherein the user plane routing profile contains at least one of the following information packet forwarding/receiving path between the RAN node and the DGW in UPF, wherein the IP address/port of the DGW in UPF or SGW address and TEID (tunnel end-point ID) are determined by the SMF and configured at one or more DGWs in UPF.

Example 26A may include the method of example 24A or some other example herein, wherein the group security context contains pair-wised symmetric keys and relevant security parameters.

Example 27A may include the method of example 24A or some other example herein, wherein the first network entity may generate the group context for a service when an Application Server sends a group service request to the network, the network authorizes and authenticates the application server for the group service.

Example 28A may include the method of example 24A or some other example herein, wherein the first network entity may generate the group context for a service when the first device registers to the network and there is no group context stored, the network creates a group context for a group of devices for the authorized service.

Example 29A may include the method of example 24A or some other example herein, wherein the first network entity transmits the group context to a second network entity (RAN node) and the second network entity stores the group context for authenticating the first device returning from idle/inactive mode to connected mode for packets transmission, and forwards the received packets from the first device based on the stored user plane routing profile in the group context.

Example 30A may include a method and apparatus of managing a network slice for a group of devices of a service in a mobile network is for a first network entity (AMF) to determine the network slice for the service based on the service subscription of the device and send a first message to a second network entity (RAN node), wherein the service subscription may contain at least one of the following information—the default application server address, service location information; the first message includes the group context for the group of devices.

Example 31A may include the method of example 30A or some other example herein, wherein the network slice may be identified by an network slice ID, an IPv6 prefix, or an ID associated with an IPv4 address pool, wherein depending on the devices' capability, the first network entity can allocate an IPv4 address within the IPv4 address pool, an IPv6 prefix, or a network slice ID to the IoT device.

Example 32A may include the method of example 31A or some other example herein, wherein if an IPv4 address is allocated to the first device, the first device uses the allocated IPv4 address as the source IP address in the IP packets to be transmitted. If an IPv6-prefix address is allocated, the first device auto configures its IPv6 address accordingly and uses the IPv6 address as the source IP address in the IP packets to be transmitted.

Example 33A may include the method of example 31A or some other example herein, wherein for the IoT device capable of Non-IP packets transmission over user plane, the first device needs to mark the Non-IP packets with the network slice ID or group identifier when transmitting the user plane packets.

Example 34A may include the method of example 32A or some other example herein, wherein the device sends IP packets or Non-IP packets towards the second network entity, and the second network entity can identify the IP packets based on the source IP address or Non-IP packets based on marked network slice ID or group identifier, and forward the IP packets or Non-IP packets based on the stored routing profile in the group context accordingly.

Example 35A may include the method of example 33A or some other example herein, wherein the device sends IP packets or Non-IP packets towards the second network entity, and the second network entity can identify the IP packets based on the source IP address or Non-IP packets based on marked network slice ID or group identifier, and forward the IP packets or Non-IP packets based on the stored routing profile in the group context accordingly.

Example 36A is a method, comprising: exchanging, or causing to be exchanged, signaling with a core network to identify a shared group context for a plurality of UE (user equipment); wherein the shared group context includes a user plane routing profile and a group security context; and authenticating, or causing to be authenticated, a UE of the plurality of UE using the shared group context to authenticate a UE of the plurality of UE.

Example 37A may include the subject matter of example 36A and/or some other example herein, wherein the UE is authenticated responsive to receipt of an indication of termination of an idle/inactive mode by the UE.

Example 38A may include the subject matter of any of examples 36A-37A and/or some other example herein, wherein the UE is authenticated using the shared group context without exchanging signaling messages with a core network.

Example 39A may include the subject matter of any of examples 36A-38A and/or some other example herein, wherein the group security context stores a group key and one or more security parameters.

Example 40A may include the subject matter of any of examples 36A-39A and/or some other example herein, wherein the method is performed, in whole or in part, by an access node or a portion thereof.

Example 41A is a method, comprising: creating, or causing to be created, a shared group context for a plurality of UE (user equipment) responsive to at least one of receipt of a group service request from an application server registration of one of the UE; transmitting, or causing to be transmitted, information about the shared group context to an access node for UE authentication.

Example 42A may include the subject matter of example 41A and/or some other example herein, authorizing and authenticating, or causing to be authorized and authenticated, the application server for the group service.

Example 43A may include the subject matter of any of examples 41A-42A and/or some other example herein, wherein the shared group context includes a user plane routing profile and a group security context.

Example 44A may include the subject matter of any of examples 41A-43A and/or some other example herein, transmitting, or causing to be transmitted, packets destined for the plurality of UE via a common user plan routing policy.

Example 45A may include the subject matter of any of examples 41A-44A and/or some other example herein, wherein the method is performed, in whole or in part, by a core network component or a portion thereof.

Example 46A is an apparatus to: receive information about a shared group context for a plurality of UE (user equipment) from a core network; and authenticate a UE of the plurality of UE using the information responsive to receipt of an indication of the UE changing a power state.

Example 47A may include the subject matter of example 46A and/or some other example herein, wherein the shared group context includes a user plane routing profile and a group security context.

Example 48A may include the subject matter of any of examples 46A-47A and/or some other example herein, wherein the indication of the UE changing the power state comprises an indication of termination by the UE of an idle or inactive state.

Example 49A may include the subject matter of any of examples 46A-48A and/or some other example herein, wherein the group security context stores a group key and one or more security parameters.

Example 50A may include the subject matter of any of examples 46A-49A and/or some other example herein, wherein the apparatus is an access node or a portion thereof.

Example 51A is an apparatus to: identify a shared group context for a plurality of UE (user equipment); and provide an access node for the plurality of UE with information about the shared group context to enable the access node to perform UE authentication.

Example 52A may include the subject matter of example 51A and/or some other example herein, wherein the shared group context is created responsive to at least one of receipt of a group service request from an application server or registration of one of the UE.

Example 53A may include the subject matter of any of examples 51A-52A and/or some other example herein, the apparatus to authorize and authentication the application server for the group service.

Example 54A may include the subject matter of any of examples 51A-53A and/or some other example herein, wherein the shared group context includes a user plane routing profile and a group security context.

Example 55A may include the subject matter of any of examples 51A-54A and/or some other example herein, wherein the apparatus is a core network component or a portion thereof.

Example 56A may include a signal to be received by an access node, wherein the signal comprises information about a shared group context for a plurality of UE (user equipment).

Example 57A may include a signal to be received by a core network, wherein the signal comprises a group service request to initiate creation of a shared group context for a plurality of UE (user equipment).

Example 58A may include an apparatus comprising means to perform one or more elements of a method described in or related to any of examples 1A-57A, or any other method or process described herein.

Example 59A may include one or more non-transitory computer-readable media comprising instructions to cause an electronic device, upon execution of the instructions by one or more processors of the electronic device, to perform one or more elements of a method described in or related to any of examples 1A-57A, or any other method or process described herein.

Example 60A may include an apparatus comprising logic, modules, or circuitry to perform one or more elements of a method described in or related to any of examples 1A-57A or any other method or process described herein.

Example 61A may include a method, technique, or process as described in or related to any of examples 1A-57A, or portions or parts thereof.

Example 62A may include an apparatus comprising: one or more processors and one or more computer readable media comprising instructions that, when executed by the one or more processors, cause the one or more processors to perform the method, techniques, or process as described in or related to any of examples 1A-57A, or portions thereof.

Example 63A may include a signal as described in or related to any of examples 1A-57A, or portions or parts thereof.

Example 64A may include a signal in a wireless network as shown and described herein.

Example 65A may include a method of communicating in a wireless network as shown and described herein.

Example 66A may include a system for providing wireless communication as shown and described herein.

Example 67A may include a device for providing wireless communication as shown and described herein. B. Additional or Alternative Embodiments for Group Based Context and Security for M-IoT Devices In addition to the embodiments described above, or in other embodiments, provide scalability and support dynamic group service negotiation between an application server and a AUSF/UDM. IoT-UEs may be grouped based on a certain service. The CN and (R)AN manage a shared group context for a particular IoT-UE service group. Such context comprises a user plane data/routing context, and a security context. A trust association between the CN and the RAN is assumed, which translates into a confidentiality and integrity protected communication channel between them.

The user plane routing context is allocated at (R)AN and CN's Data Plane (S-GW/P-GW in EPS, or UPF in 5GS). The network transmits packets using common user plane routing policies.

In certain embodiments, each group has a unique security context at the CN, at the AUSF/UDM (responsible (resp.) HSS in EPS). This context has at least an ID, a unique symmetric master key, and a group security policy. Group security details at the AUSF/UDM (resp. HSS in EPS) are negotiated with a group service application (GSA).

IoT-UEs individually run a group enrollment procedure to obtain the necessary cryptographic material and become authorized to use the group context to transmit IP/non-IP packets. Through this procedure, each AMF (resp. MME in EPS) builds and maintains a security context for the IoT-UEs associated with the AMF (resp. MME in EPS) for the group comprising a key derived from the group master key. The AMF also maintains a number of (R)AN contexts, one per each (R)AN node that manage IoT-UEs.

In certain embodiments, the designated group security mechanism uses the same symmetric key approach as in EPS. The generated key hierarchy links to existing EPS and 5GS key hierarchies obtained through AKA protocols. The AKA procedure may thus be performed before group enrollment.

The (R)AN context includes a cryptographic symmetric key, which is derived from the AMF's group key (resp. MME in EPS) and uniquely links to a group, and relevant security parameters.

When IoT-UE transitions from CONNECTED mode to IDLE/INACTIVE mode, the gNB (resp. eNB in EPS) does not discard group's context for the IoT-UE. When an IoT-UE device returns from IDLE/INACTIVE mode to CONNECTED mode for user plane packets transmission, the gNB (resp. eNB in EPS): uses the shared group security context to authenticate the IoT-UE; and uses the routing context to enforce the stored routing polices to forward the user plane packets.

No signaling messages are exchanged between the (R)AN node and CN. Thus, the scheme helps reduce signaling storm.

The disclosed embodiments provide one or more of the following advantages: the shared group context (routing and security) allows to avoid generating overwhelming signaling overheads at the CN, while maintaining the same security level of regular per IoT-UE context establishment; the designated group security mechanism adopts a symmetric key approach, which is compatible with current EPS and 5GS key hierarchy and is lightweight, thus suitable for low-end IoT devices; using a symmetric key approach avoids the drawbacks of asymmetric key approaches, which are heavy and typically rely on public key infrastructure (PKI); both the serving (R)AN nodes and the user plane gateways in the CN are not required to maintain individual IoT-UE context for storing routing group policies, which is beneficial, for example, in the case in which IoT-UEs need to receive mobile terminated acknowledgement message from the application server for the delivered IP packets; the embodiments are applicable to both EPS and 5GS designs; and/or the group construct provides a powerful framework to enable operators manage IoT related services in a more scalable fashion (i.e., the benefit of group can be beyond routing and security context management and can be used to manage QoS policy, billing, etc.).

B(1) Example System Architecture

Figure 11:
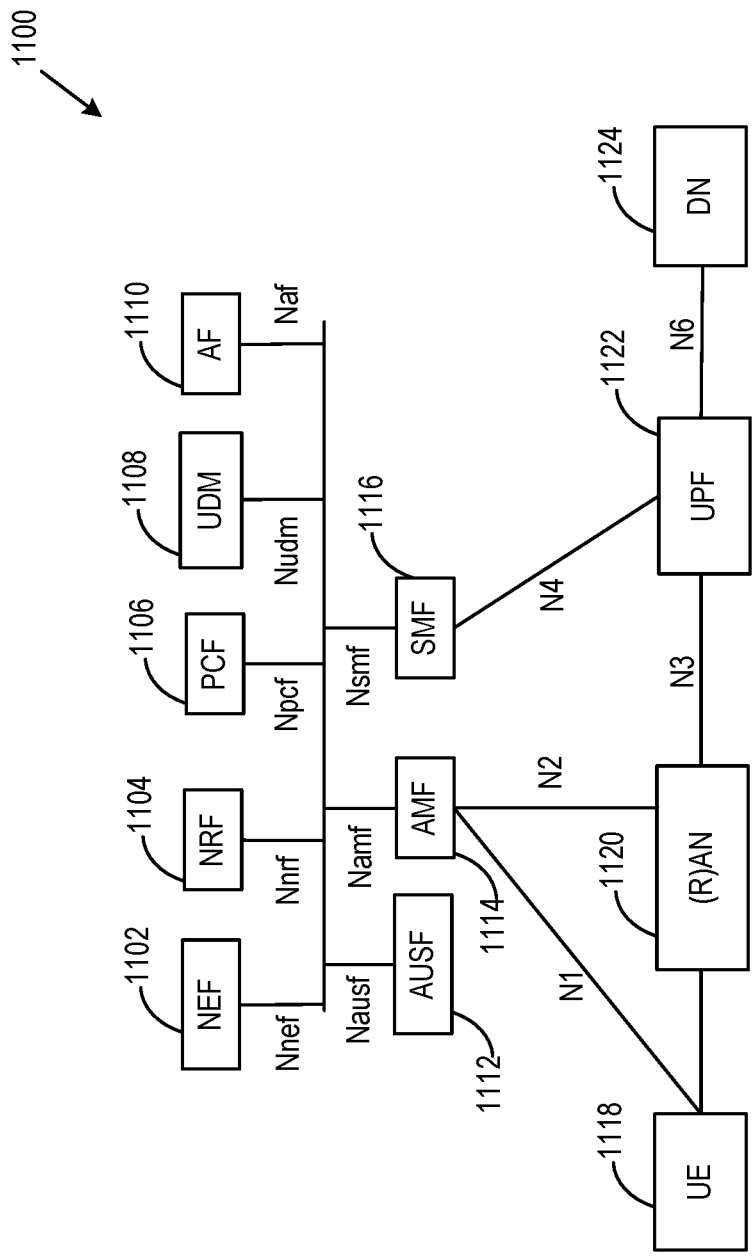
FIG. 11 is a block diagram of a non-roaming reference architecture of a communication system.

The embodiments described in this section, and other sections herein, can be applied to both of EPS and 5GS systems. In what follows, however, the 5GS architecture is used as an example. In 3GPP TS 23.501, for example, a 5G system architecture may be as shown in FIG. 11, which depicts the non-roaming reference architecture 1100 with service-based interfaces (e.g., Nnef, Nnrf, Npcf, Nudm, Naf, Nausf, Namf, Nsmf, N1, N2, N3, N4, N6) within the control plane. The 5G network architecture 1100 includes, for example, a network exposure function (NEF) 1102, a network repository function (NRF) 1104, a policy control function (PCF) 1106, a UDM 1108, an application function (AF) 1110, an AUSF 1112, an AMF 1114, and an SMF 1116. Also shown are a UE 1118, a (R)AN 1120, a UPF 1122, and a DN 1124. In certain embodiments, the AMF 1114 is the core network controller, the (R)AN 1120 provides 3GPP access, and non-3GPP access may be provided through, e.g., a WLAN access point (AP).

Embodiments described herein may provide for a solution for efficient and secure IoT-UEs service provisioning. An application server (APS) sends a service request towards control plane entity (the AMF 1114) either via the NEF 1102 or the PCF 1106. After APS authentication and authorization by AUSF/UDM, the AMF 1114 may create group context according to the service request. With the group context stored at the AMF 1114, the network can handle group enrollment and security control for the IoT-UEs. Next, the AMF 1114 and AUSF/UDM verify a request sent from an IoT-UE to enroll into the group requested by the APS. If the authorization verifications succeeds, the AMF 1114 notifies SMF 1116 to setup group UP context. The IoT-UE can then send data traffic in an efficient and secure manner wherein the NB/5G-CN can use the group context to authenticate the IoT-UE enrolled in the group, and then transmit data traffic via a group UP transmission path (through a selected UPF). At last, the group management is performed based on service policies for key refreshing.

Figure 12:
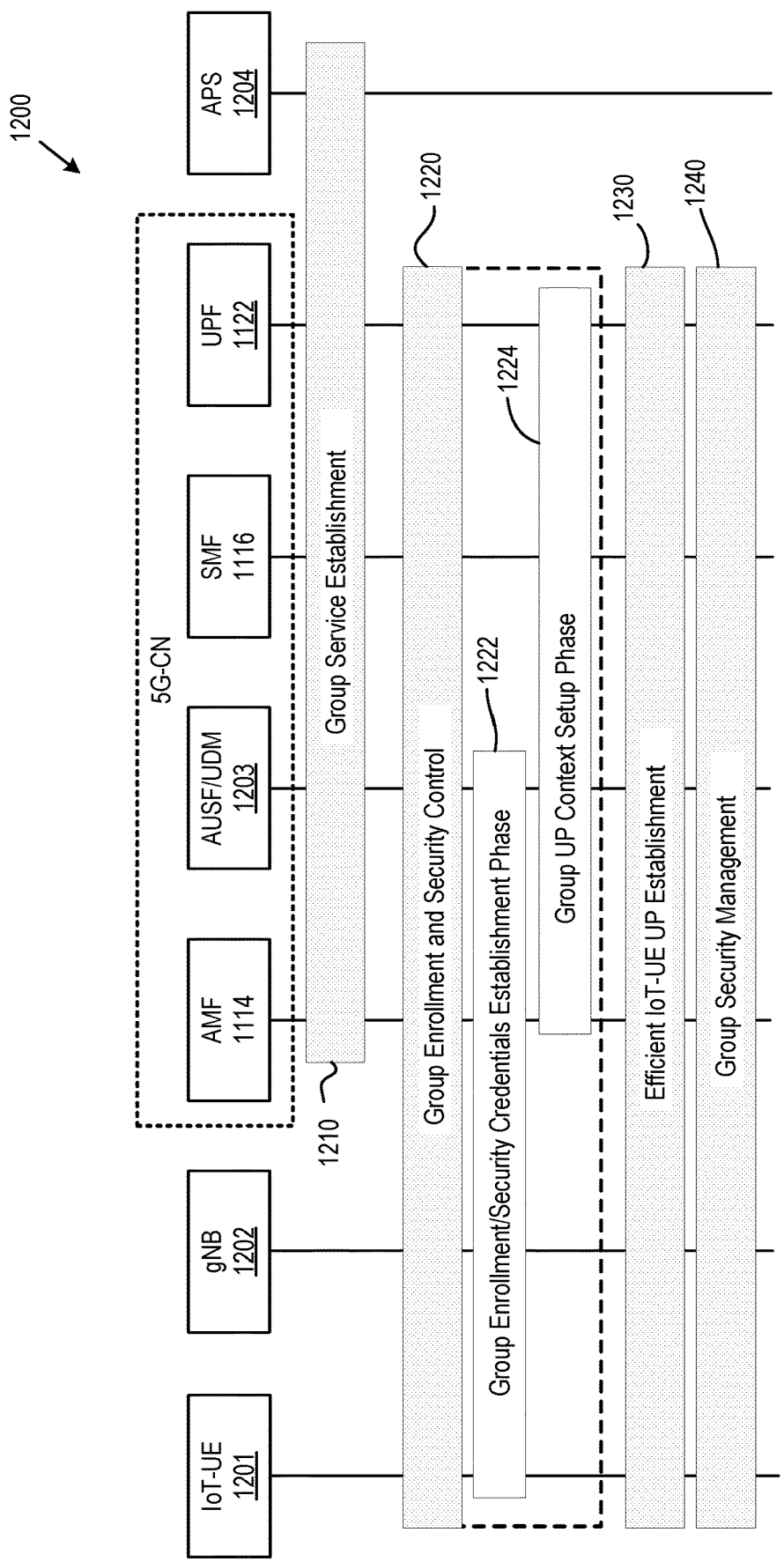
FIG. 12 is a signal flow diagram illustrating a group based context and security process according to one embodiment.

FIG. 12 is a signal flow diagram illustrating a group based context and security process 1200 according to one embodiment. FIG. 12 shows the interactions between an IoT-UE 1201 (e.g., the UE 1118 shown in FIG. 11), a gNB 1202 (e.g., the (R)AN 1120 shown in FIG. 11), an AMF 1114, an AUSF/UDM 1203 (e.g., the AUSF 1112 and/or the UDM 1108 shown in FIG. 11), an SMF 1116, a UPF 1122, and an APS 1204. The illustrated process 1200 includes four components, namely, a group service establishment procedure 1210 (component 1), a group enrollment and security control procedure 1220 (component 2), an efficient IoT-UE UP establishment procedure 1230 (component 3), and a group security management procedure 1240 (component 4). The group service establishment procedure 1210 includes a group enrollment/security credentials establishment phase 1222, and a group UP context setup phase 1224, as discussed in detail below.

The group service establishment procedure 1210 allows the negotiation of group-related parameters between the APS 1204 and a mobile network operator (MNO). The group service establishment procedure 1210 terminates with the creation of a (potentially long term) group key that serves as a root of the group key hierarchy in this example embodiment, and a potential pre-allocation of user plane context and resources for the whole group. In certain embodiments, additional key material for the group is optional and, as an alternative, it is sufficient for the eNB/gNB to maintain, other that the regular UE context (as defined by 4G/5G), the ID of the group(s) the UE belongs to. In this case, the decision from the eNB/gNB on whether treating the UE's state transition according to the regular 4G/5G pipeline, or the group-based IoT one, is made based on whether the UE as an associated group ID or not. Thus, no key material is derived from the procedure in this case, only the service is registered at the HSS/AUSF. In such embodiments, the credentials establishment phase is optional and the eNB/gNB only keeps, inside the regular UE's context, the ID(s) of the group(s) the UE belongs to.

The group enrollment and security control procedure 1220 allows the enrollment of the IoT-UE 1201 into a group. The group enrollment and security control procedure 1220 is configured to: (i) authorize the IoT-UE 1201 for group use; (ii) establish a group based user plane context for data transmission that is to be shared by the IoT-UEs enrolled in the group; and (iii) create group context and necessary key material at both IoT-UE and gNB. When not done during the execution of group service establishment procedure 1210, group enrollment and security control procedure 1220 creates group-based user plane context at the CN.

The connectionless user plane data transmission procedure 1230 allows for efficient transmission of data traffic using group-based UP data transmission session when IoT-UEs transition from an IDLE/INACTIVE state to a CONNECTED state, leveraging keys and security contexts established using the group enrollment and security control procedure 1220.

The group security management procedure 1240 allows for key refreshing, which is managed at different levels in the architecture.

B(2) Key Hierarchy and Notation

Figure 13:
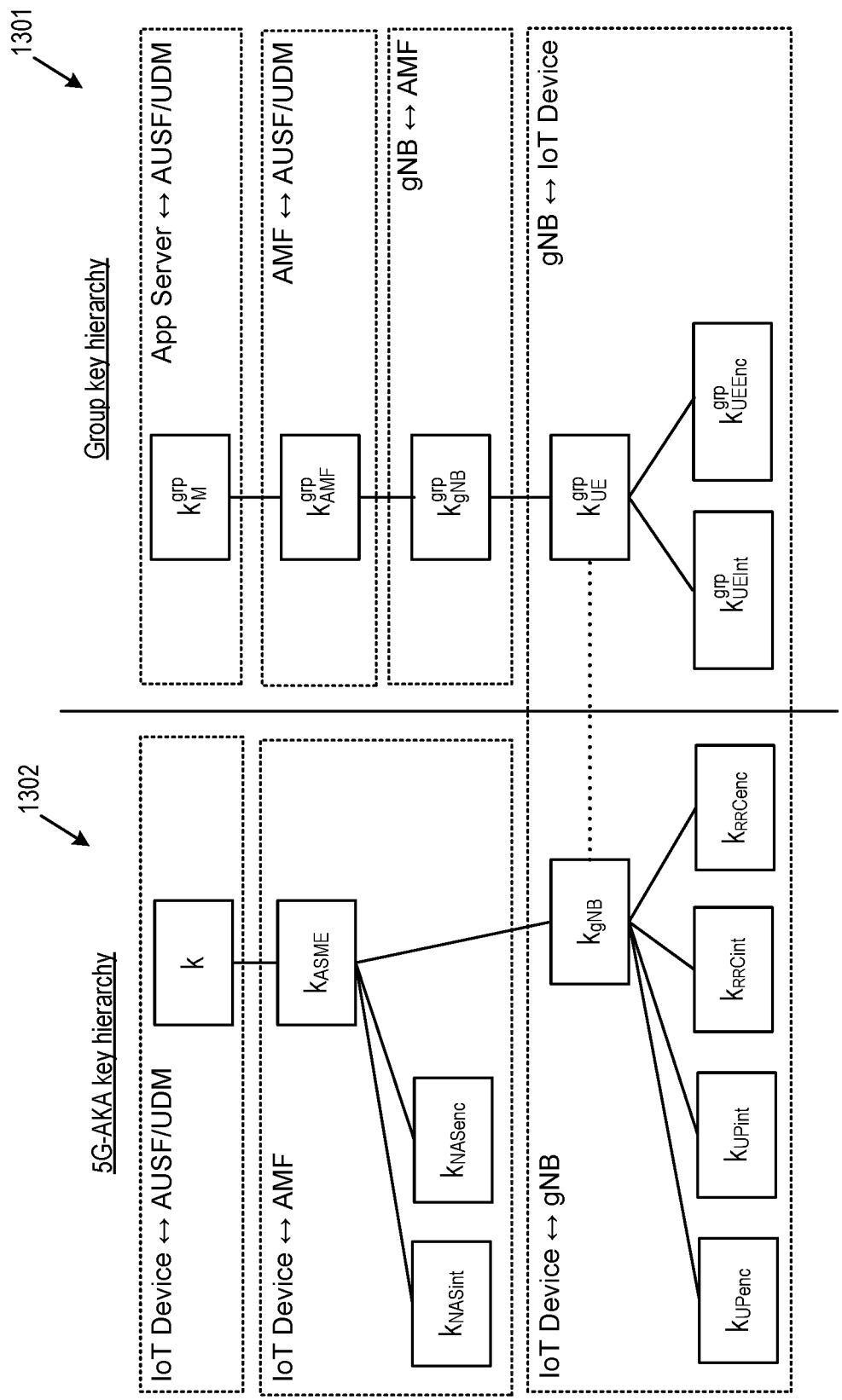
FIG. 13 is a block diagram illustrating a group key hierarchy generated by certain embodiments.

FIG. 13 is a block diagram illustrating a group key hierarchy 1301 generated by certain embodiments herein. The group key hierarchy 1301 is shown on the right hand side in FIG. 13 in parallel to keys generated during an extensible authentication protocol (EAP)-AKA procedure, which has been adapted to the new 5GS architecture from EPS-AKA and shown as a 5G-AKA key hierarchy 1302 on the right. The group key hierarchy 1301 is extended in support of group authentication for IoT-UEs in the group. Details on keys generation and usage are provided in the following sections.

Referring to the process 1200 shown in FIG. 12, key kV is established during the group service establishment procedure 1210 (component 1). Further, the key $k_{AMF}^{grp}$ can be generated when selecting the impacted AMFs in component 1 or component 2, based on different options. The key $k_{gNB}^{grp}$ is distributed to a target gNB by the AMF 1114. Different group security keys are distributed to one or more gNBs serving IoT-UE devices belonging to the same group, either proactively during component 1, or reactively (i.e., on the first enrollment attempt by a group member under a gNB) during component 2. The key $k_{UE}^{grp}$ is generated by a group-enabled gNB during component 2. Such key can be regarded as a membership key of the group for the IoT-UE.

Note that, as indicated at 1310 in FIG. 13, the generation of $k_{UE}^{grp}$ depends on $k_{gNB}$, which is established during primary authentication. This implicitly binds primary authentication to group enrollment.

Table 2 lists notations and corresponding descriptions used in embodiments described in FIGS. 12-17.

TABLE 2

| Notation | Description | Notation | Description |
| --- | --- | --- | --- |
| ||, | Byte strings concatenation and assignment | KDF | Key derivation function |
| SQN, RAND | Sequence number and random bit string | MAC | Message authentication code |
| $N_1, N_2, N_3$ | Nonce | $k_{NASInt}, k_{NASEnc}$ | Respectively, NAS integrity and encryption keys shared between a IoT-UE and AMF |
| $Id_{grp}, id_{UE}, id_{gNB}$ | Unique identifier for group, IoT-UE and eNB, respectively | $k_{RRCenc}, k_{RRCint}$ | Respectively, RRC integrity and encryption keys shared between a IoT-UE and gNB |
| $L_X$ | Security parameter indicating length in bits of a parameter X | | Master group key, AMF group key and gNB group key, respectively |
| $Alg_{ID}$ | Unique algorithm identifier | | IoT-UE local master group key, integrity key and encryption key, respectively |
| $C_{UE}, C_{gNB}$ | Counters (used for key versioning and refreshing) | $Alg_{Use}$ | Algorithm usage |

Figure 28:
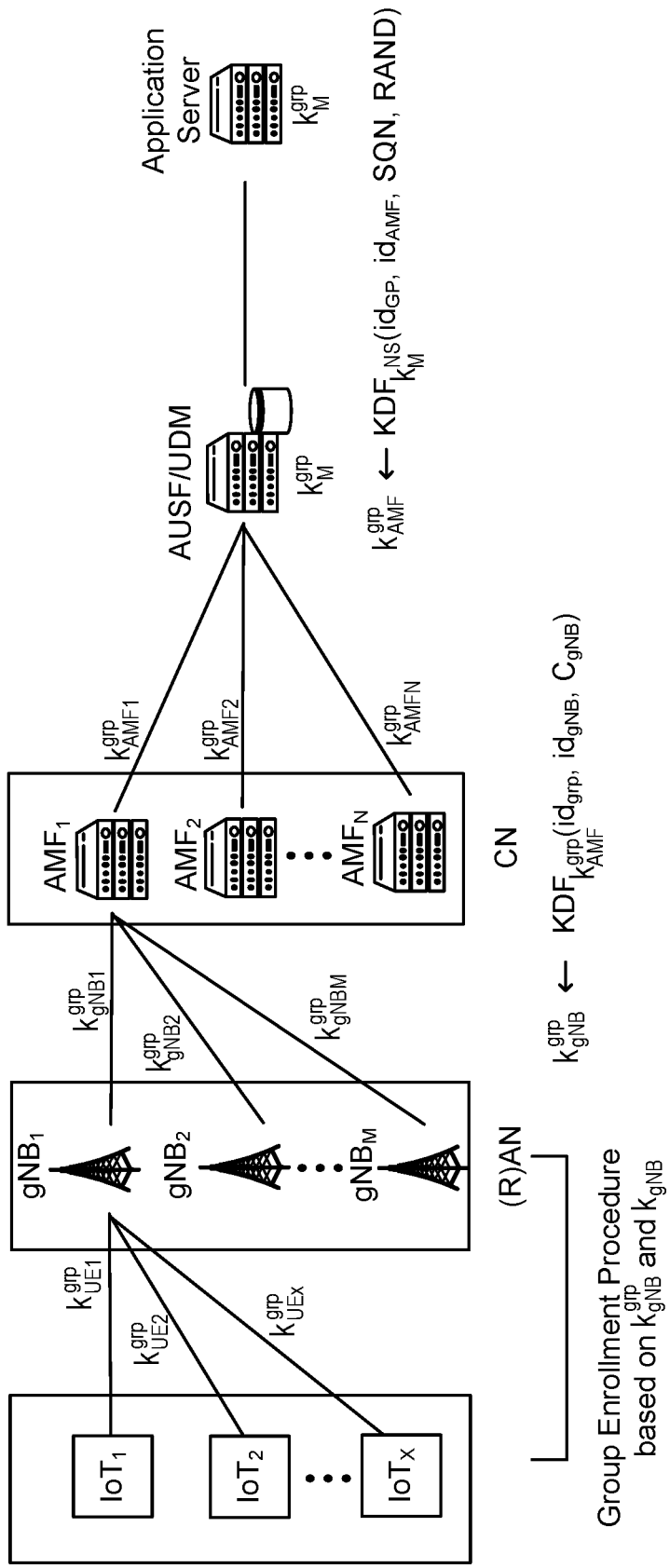
FIG. 28 is a block diagram illustrating an example group keys management process according to one embodiment.

By way of example, FIG. 28 is a block diagram illustrating a group keys management process according to one embodiment. In this example, a static group may be based on a subscription stored in an HSS/UDM, and a dynamic group may be based on a group service request from an application server. A group can be mapped to, for example, a service (e.g., smart meter monitoring), a customer, a unit for service management (e.g., billing), a certain geographical/service area, many IoT devices with similar traffic characteristics and common QoS, common security context (e.g., group key to derive individual keys), and/or common data plane routing policy (e.g., single PDU session).

B(3) Component 1: Group Service Establishment

In the group service establishment procedure 1210 shown in FIG. 12, the APS 1204 establishes a group service by authenticating with the AUSF/UDM 1203. For example, the UDM 1108 shown in FIG. 11 generates the related records with cryptographic material, and allocates group security context at the AUSF 1112 shown in FIG. 11. The AUSF/UDM 1203 confirms the service establishment to the APS 1204. In addition, based on the service request sent from the APS 1204, the network may create a group security context at one or more AMF as well as the group user plane context at the 1122 UPF via the SMF 1116.

Figure 14:
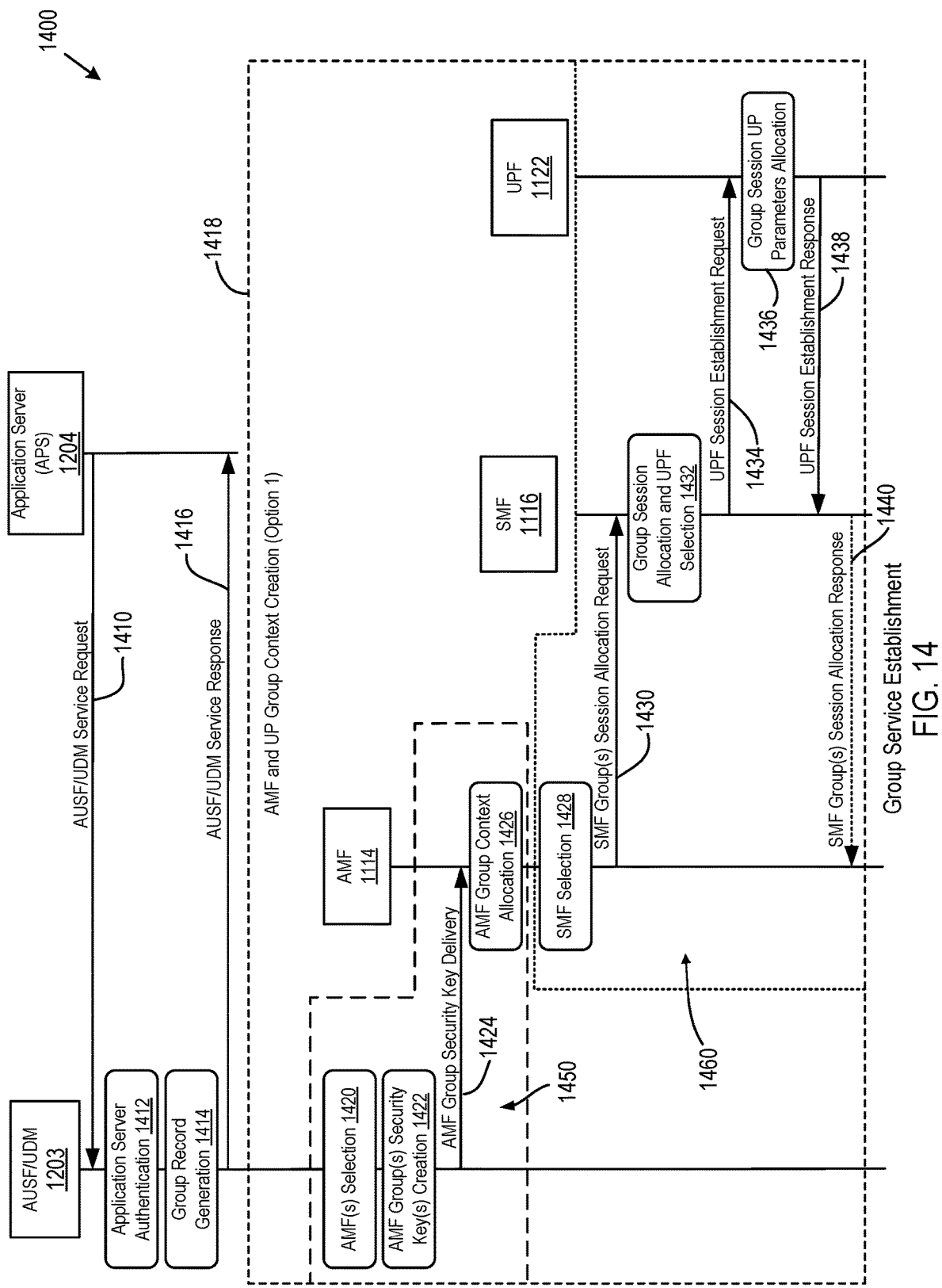
FIG. 14 is a signal flow diagram illustrating a process for group service establishment according to one embodiment.

FIG. 14 is a signal flow diagram illustrating a process 1400 for group service establishment according to one embodiment. With reference to FIG. 12, the AUSF/UDM 1203, the APS 1204, the AMF 1114, the SMF 1116, and the UPF 1122 participate in the process 1400. The process 1400 begins when the APS 1204 generates an AUSF/UDM service request message 1410 towards AUSF/UDM 1203. The AUSF/UDM service request message 1410 specifies at least a service ID, one or more group ID ( ) geographical contextual information for the group, and APS credentials. The service ID is the identifier subscribed by the APS 1204 for the requested service. The APS ID is the application server identifier. The group IDs correspond to the subscribed group associated to the service ID. The APS credentials depend on the type of authentication used between the APS 1204 and the AUSF/UDM 1203, and may be, for example, a digital certificate or a message authentication code (MAC) computed using a shared secret. The choice of the authentication mechanism to use is left to the MNO.

At least two alternatives for the $id_{grp}$ may be considered. In a first alternative, the $id_{grp}$ is a long term fixed ID for a group. As such, the $id_{grp}$ can be assumed to be known by IoT-UEs (e.g., pre-installed in IoT-UE's SIM card). In a second alternative, the $id_{grp}$ is a short term identifier, and thus not known in advance by IoT-UEs.

In certain embodiments, the geographical location information is provided to indicate the requested service area of the group.

In an application server authentication process 1412, the AUSF/UDM 1203 authenticates the APS 1204 using the APS's credentials, according to the authentication method agreed between the APS 1204 and the MNO.

In a group record generation process 1414, after successful authentication of the APS 1204, the AUSF/UDM 1203 creates and stores a new group record associated to the service ID and the APS ID. The new group record includes at least: group ID ( ) APS ID; group master key ( ) and allowed geographical location. The $k_M^{grp}$ is generated based on a key derivation algorithm, pre-agreed with APS 1204.

The AUSF/UDM 1203 acknowledges the creation of the given context for the groups and service specified by generating an AUSF/UDM service response message 1416.

Upon processing of the AUSF/UDM service response message 1416 by the APS 1204, the network has created the group key via negotiation between the APS 1204 and the AUSF/UDM 1203 for the first layer of the group key hierarchy 1301 shown in FIG. 13.

Figure 15:
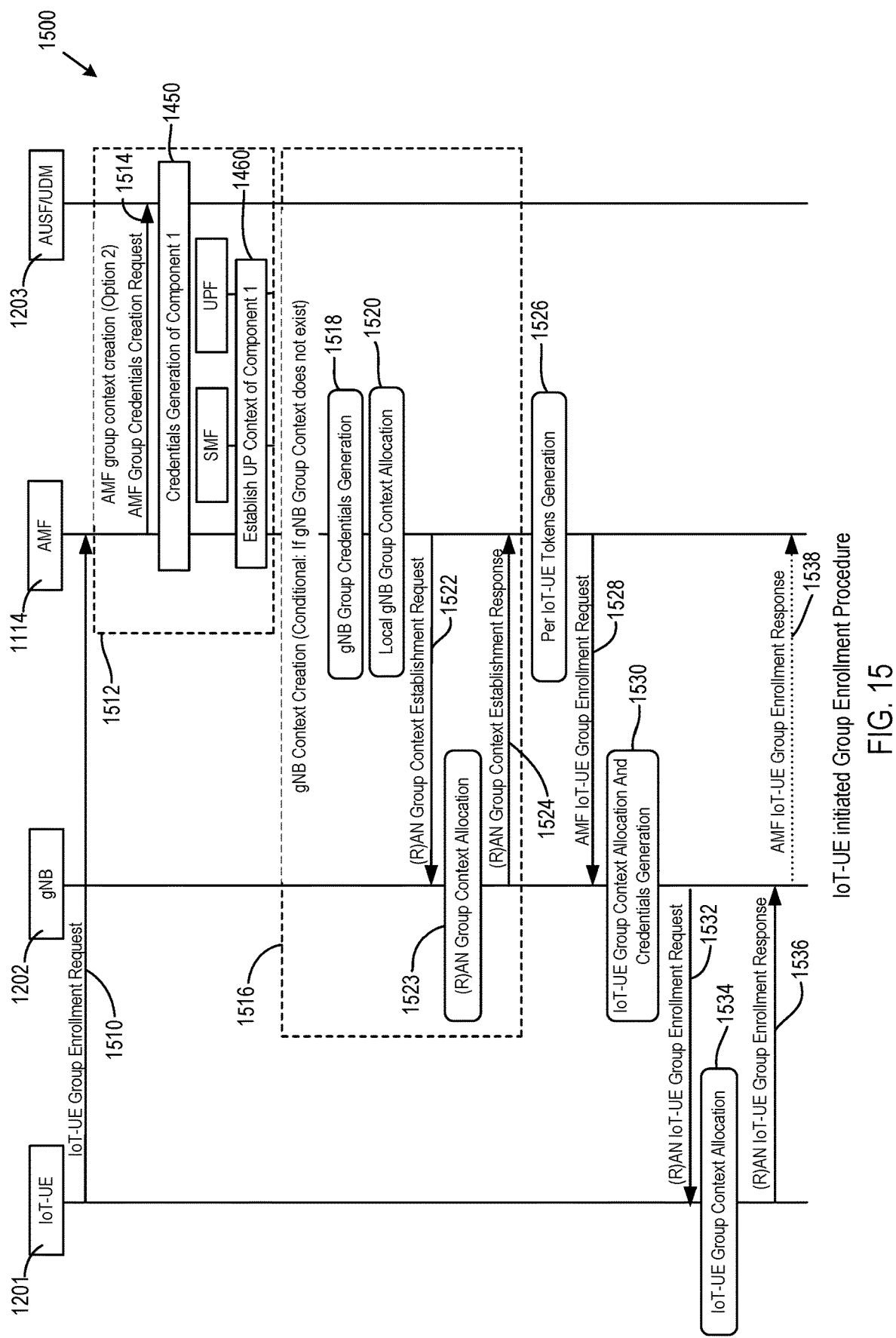
FIG. 15 is a signal flow diagram illustrating an IoT-UE initiated group enrollment process according to one embodiment.

To establish the second layer group key between AUSF/UDM 1203 and the AMF 1114, there are at least two options. In the first option (Option 1), the AUSF/UDM 1203 initiates an AMF and UP group context creation process 1418, as shown in FIG. 14. In the second option (Option 2), an AMF initiates an AMF group context creation process 1512 as part of component 2, as shown in FIG. 15. Under Option 2, the key is generated at an AMF when the network receives the group enrollment request from the first IoT-UE registered by the AMF. Option 2 is discussed below with respect to FIG. 15.

Returning to Option 1 of FIG. 14, in the AMF and UP group context creation process 1418, the AUSF/UDM 1203 may proactively create and deliver AMF group credentials for (e.g., all) the registered groups, for/to (e.g., all) applicable AMFs. To this end, the AMF and UP group context creation process 1418 includes the following operations. In an AMF(s) selection process 1420, the AUSF/UDM 1203 selects applicable AMFs. The selection criteria may be defined by the MNO and can be, for example, based on geographical location of the target group members. In an AMF group(s) security key creation process 1422, for each chosen AMF with identifier $id_{AMF}$, the AUSF/UDM 1203 computes $k_{AMF}^{grp} \leftarrow KDF_{K_M^{grp}}(id_{grp}, id_{AMF}, SQN, RAND)$, where SQN is a sequence number that is used for key versioning and fulfills similar requirements as the one used for EPS-AKA, and RAND is an optional random string of bit length $L_{RAND}$. Examples of when RAND may be used are provided in component 4.

The AUSF/UDM then sends an AMF group(s) security key(s) delivery message 1424 to one or more AMF(s) (e.g., including the AMF 1114 shown in FIG. 12) with the per-AMF generated group credentials. In certain embodiments, AMF group(s) security key(s) delivery message 1424 is encrypted and integrity protected.

In an AMF group context allocation process 1426, the AMF(s) creates a group context, which includes at least $id_{grp}$ and $k_{AMF}^{grp}$.

In an SMF selection process 1428, the AMF(s) can pre-allocate group UP session and context for one or more groups. For each selected group, an AMF selects an SMF 1116 that will manage the user plane session.

Then, the AMF send an SMF group(s) session allocation request message 1430 to the selected SMF.

In a group session allocation and UPF selection process 1432, after receiving the SMF group(s) session allocation request message 1430, the SMF allocates a session for the group. The SMF 1116 also sets the user plane routing profile group at the UPF 1122 by sending a UPF session establishment request message 1434 to the UPF 1122, which performs a group session UP parameters allocation process 1436 and returns a UPF session establishment response 1438 to the SMF 1116.

The SMF 1116 replies to the AMF 1114 with an SMF group(s) session allocation response 1440 to confirm the completion of the AMF and UP group context creation process 1418.

Similarly, in EPS the MME may select a suitable S-GW, and pre-allocate group UP context for the selected S-GW.

B(4) Component 2: Group Enrollment and Security Control

In the group enrollment and security control procedure 1220 shown in FIG. 12, the network authenticates an IoT device (IoT-UE 1201) as a group member, generates the cryptographic material for the IoT-UE 1201, updates/generates a group context at the core network (both at the AMF 1114 and UPF 1122), and performs group security maintenance. Group enrollment and security checks are centralized at the AMF 1114 and the AUSF/UDM 1203.

In the group enrollment/security credentials establishment phase 1222 shown in FIG. 12, the IoT-UE 1201 is enrolled into a group under an attached gNB 1202. This phase establishes a pair of shared keys between the IoT-UE 1201 and gNB 1202 for UP and CP integrity and confidentiality. In the group UP context setup phase 1224 shown in FIG. 12, the AMF 1114 creates group security context and UP context at the UPF 1122. These two phases are described separately below.

In certain embodiments, the group enrollment and security control procedure 1220 assumes that: the IoT-UE 1201 has successfully completed a registration procedure with the network (e.g., attach procedure in EPS/registration request procedure in 5GS) without establishing PDN connection in EPS/PDU session in 5GS for UP transmission session, and negotiating security parameters and capabilities with the AMF 1114, the IoT-UE 1201, and the gNB 1202; a trust association between any gNB and AMF (resp. eNB and MME in EPS) can be implemented, for example, via network domain security using IPSec, which allows secure (confidential and integrity protected) communication between the two; and there is a trust association (as a consequence of registration) between the IoT-UE 1201 and its registered AMF 1114 (resp. MME in EPS), e.g., in current EPS this may be carried out via mutual authentication using the EPS-AKA protocol. In addition, or in other embodiments, it is assumed that the trust relationship between the IoT-UE 1201 and its registered AMF 1114 is expressed by a shared symmetric key $k_{ASME}$, from which two keys are derived $k_{NASint}$ and $k_{NASenc}$, respectively for control plane messages integrity and confidentiality protection.

B(4)(a) Group Enrollment/Security Credentials Establishment Phase

In the group enrollment/security credentials establishment phase 1222 shown in FIG. 12, an IoT-UE 1201 is enrolled into a group. This phase bases on the outcome of component 1, where two levels of trust are leveraged to establish group-level trust among the entities and process shown in FIG. 15. FIG. 15 is a signal flow diagram illustrating an IoT-UE initiated group enrollment process 1500 according to one embodiment. With reference to FIG. 12, the IoT-UE 1201, the gNB 1202, the AMF 1114, and the AUSF/UDM 1203 participate in the process.

The process 1500 begins when the IoT-UE 1201 generates a random nonce $N_1$ of bit length $L_N$, and issues an IoT-UE group enrollment request 1510 to the AMF 1114 to which it is connected through the gNB 1202. The IoT-UE group enrollment request 1510 carries $N_1$ and the unique identifier $id_{grp}$ of the group to which the IoT-UE 1201 requests enrollment. In an alternate embodiment, if the group is unique per IoT-UE, or the CN stores the group information, e.g., group ID, in the subscription at HSS/UDM, the $id_{grp}$ may be omitted. An example is for short-lived group IDs described in the second alternative for the $id_{grp}$ described in component 1 (the $id_{grp}$ is a short term identifier, and thus not known in advance by IoT-UEs).

As discussed above, there are two options to establish the second layer group key between AUSF/UDM 1203 and the AMF 1114. The first option (Option 1) is shown in the AMF and UP group context creation process 1418 in FIG. 1. Under the second option (Option 2), the AMF 1114 initiates the AMF group context creation process 1512 shown in FIG. 15. The AMF group context creation process 1512 of Option 2 allows the AMF 1114 to create the group context including group security context and group UP context for the IoT-UE 1201. Under the AMF group context creation process 1512, once the IoT-UE group enrollment request 1510 from IoT-UE 1201 is received, the AMF 1114 checks whether it already stored a security context for group $id_{grp}$. If not, then the AMF 1114 requests the creation of group credentials through an AMF group credentials creation request 1514 to the AUSF/UDM 1203.

Then, the AUSF/UDM 1203 performs a credentials generation sub-process 1450 of component 1 shown in FIG. 14, which includes the AMF(s) selection process 1420, the AMF group(s) security key creation process 1422, the AMF group(s) security key(s) delivery message 1424, and the AMF group context allocation process 1426. At the end of the credentials generation sub-process 1450, the AMF 1114 has a symmetric key $k_{AMF}^{grp}$ derived from the group master key $k_M^{grp}$ held by the AUSF/UDM 1203.

Then, the AMF 1114 performs an establish UP context sub-process 1460 shown in FIG. 14, which includes the SMF selection process 1428, the SMF group(s) session allocation request message 1430, the group session allocation and UPF selection process 1432, the UPF session establishment request message 1434, the group session UP parameters allocation process 1436, the UPF session establishment response 1438, and the SMF group(s) session allocation response 1440. The result is to establish a UP context for the group.

As a conditional process, the AMF 1114 checks whether a group context for the gNB 1202 already exists. If not, the AMF 1114 proceeds with an eNB group context creation process 1516, which includes a gNB group credentials generation process 1518 and a local gNB group context allocation process 1520. A gNB group context includes at least, $k_{gNhu\ grp}$, $id_{gNB}$, and $C_{gNB}$, where $C_{gNB}$ is a counter used for key refreshing and versioning, $id_{gNB}$ is the unique identity of the gNB, and $k_{gNB}^{grp} \leftarrow KDF_{k_{AMF}^{grp}}(id_{grp}, id_{gNB}, c_{gNB})$ is the group key for the gNB 1202. The $C_{gNB}$ ensures freshness for this key, ensuring that no subsequent keys will be equal to previous ones. The AMF 1202 delivers the $k_{gNB}^{grp}$ to the gNB 1202 over a (R)AN group context establishment request message 1522, which is integrity and confidentiality protected using $k_{N2enc}$ and $k_{N2int}$, respectively. In a (R)AN group context allocation process 1523, the gNB 1202 creates a local group context by storing $k_{gNB}^{grp}$. The gNB 1202 then responds to the AMF 1114 with a group context establishment response message 1524.

In a per IoT-UE tokens generation process 1526, the AMF 1114 generates a random nonce $N_2$ of bit length $L_N$, and sends $N_1$, $N_2$, $id_{grp}$, and $id_{UE}$ to the gNB 1202 in an AMF IoT-UE group enrollment request 1528, which is exchanged over the secure channel between the gNB 1202 and the AMF 1114. In certain embodiments, if the eNB group context creation process 1516 is performed, $k_{gNB}^{grp}$ may be transmitted to the gNB 1202 in the AMF IoT-UE group enrollment request 1528. This allows skipping the (R)AN group context establishment request message 1522, and group context establishment response message 1524 is later piggybacked into the AMF IoT-UE group enrollment response message 1538. In this case, the R)AN group context allocation process 1523 is executed after the AMF IoT-UE group enrollment request 1528.

In an IoT-UE group context allocation and credentials generation process 1530, the gNB 1202 establishes a group context for the IoT-UE 1201, which includes at least $id_{UE}$, $Alg_{id}$, $Alg_{U_{se}}$, and $k_{UE}^{grp}$, where: $id_{UE}$ is the IoT-UE's unique identifier; $C_{UE}$ is a counter that is used for key refreshing and versioning; $Alg_{ID}$ and $Alg_{U_{se}}$ identify the algorithms that will be used for integrity and confidentiality protection for control plane and user plane messages exchanged between the IoT-UE 1201 and the gNB 1202, wherein these parameters are assumed to be negotiated during device's initial device registration phase (recall that this phase is assumed to be carried out before group enrollment); and $k_{UE}^{grp} \leftarrow KDF_{k_{gNB}^{grp}}(N_1, N_2, id_{UE}, c_{UE}, Alg_{U_{se}}, k_{gNB})$.

Note that, derived during IoT-UE regular registration and AKA, is included in the key derivation. This effectively: (1) prevents potential Man-in-the-Middle attacks; (2) implicitly "forces" group establishment to be executed only after individual authentication of IoT-UE 1201 has been successfully completed; and (3) introduces the binding between the primary authentication and the group enrollment.

Then, the gNB 1202 sends a (R)AN IoT-UE group enrollment request message 1532 to the IoT-UE 1201, which is encrypted and integrity protected using RRC keys ($k_{RRCenc}$, $k_{RRCint}$). The (R)AN IoT-UE group enrollment request message 1532 carries $N_1$, $N_2$, $id_{UE}$, $Alg_{id}$, and $Alg_{U_{se}}$.

In an IoT-UE group context process 1534, the IoT-UE 1201 builds a local context storing $id_{grp}$, $Alg_{id}$, $Alg_{U_{se}}$, and $k_{UE}^{grp}$. In certain embodiments, both $Alg_{Idint}$, $Alg_{idEnc}$ match the parameters negotiated during registration. From $k_{UE}^{grp}$, the IoT-UE 1201 derives two keys, $k_{UEInt}^{grp}$ and $k_{UEEnc}^{grp}$, used for, respectively, integrity protection and encryption of control and data plane.

The IoT-UE 1201 confirms the group enrollment to the gNB 1202 using a (R)AN IoT-UE group enrollment response message 1536, which is integrity protected using the newly generated key $k_{UEInt}^{grp}$ (which is used to compute a MAC on the response message).

After receiving the (R)AN IoT-UE group enrollment response message 1536 from the IoT-UE 1201, the gNB 1202 confirms the success of the group enrollment for the IoT-UE 1201 by sending an AMF IoT-UE group enrollment response message 1538, which includes $id_{UE}$, and $C_{UE}$. The AMF IoT-UE group enrollment response message 1538 is sent over an integrity and confidentiality protected channel.

B(4)(b) Group UP Context Setup Phase

When the context has not been allocated yet, the group UP context setup phase 1224 shown in FIG. 12 is similar to the establish UP context sub-process 1460 shown in FIG. 14. The AMF 1114 selects an SMF 1116 that will manage the user plane session for the group, and sends an SMF group(s) session allocation request message. After receiving the message, the SMF 1116 allocates a session for the group, and configures the user plane routing profile for the group at the UPF 1122 (see, the group session allocation and UPF selection process 1432, the UPF session establishment request message 1434, and the group session UP parameters allocation process 1436). Then, the SMF 1116 replies to the AMF 1114 with an SMF group(s) session allocation response to confirm the completion of the procedure (see, the SMF group(s) session allocation response 1440). Similarly, in EPS the MME may already select a suitable S-GW, and pre-allocate group UP context for it.

B(4)(c) Embedding Component 2 into the Network Registration Procedure

Certain embodiments described herein are sufficiently generic to be adopted in mobile cellular network architectures. In support of a 3GPP based network, the well-established attach procedure in EPS architecture is used as an example. In terms of communication overhead, adoption is achievable by embedding data to be exchanged among functions and entities into the existing device-network registration procedure.

Figure 16:
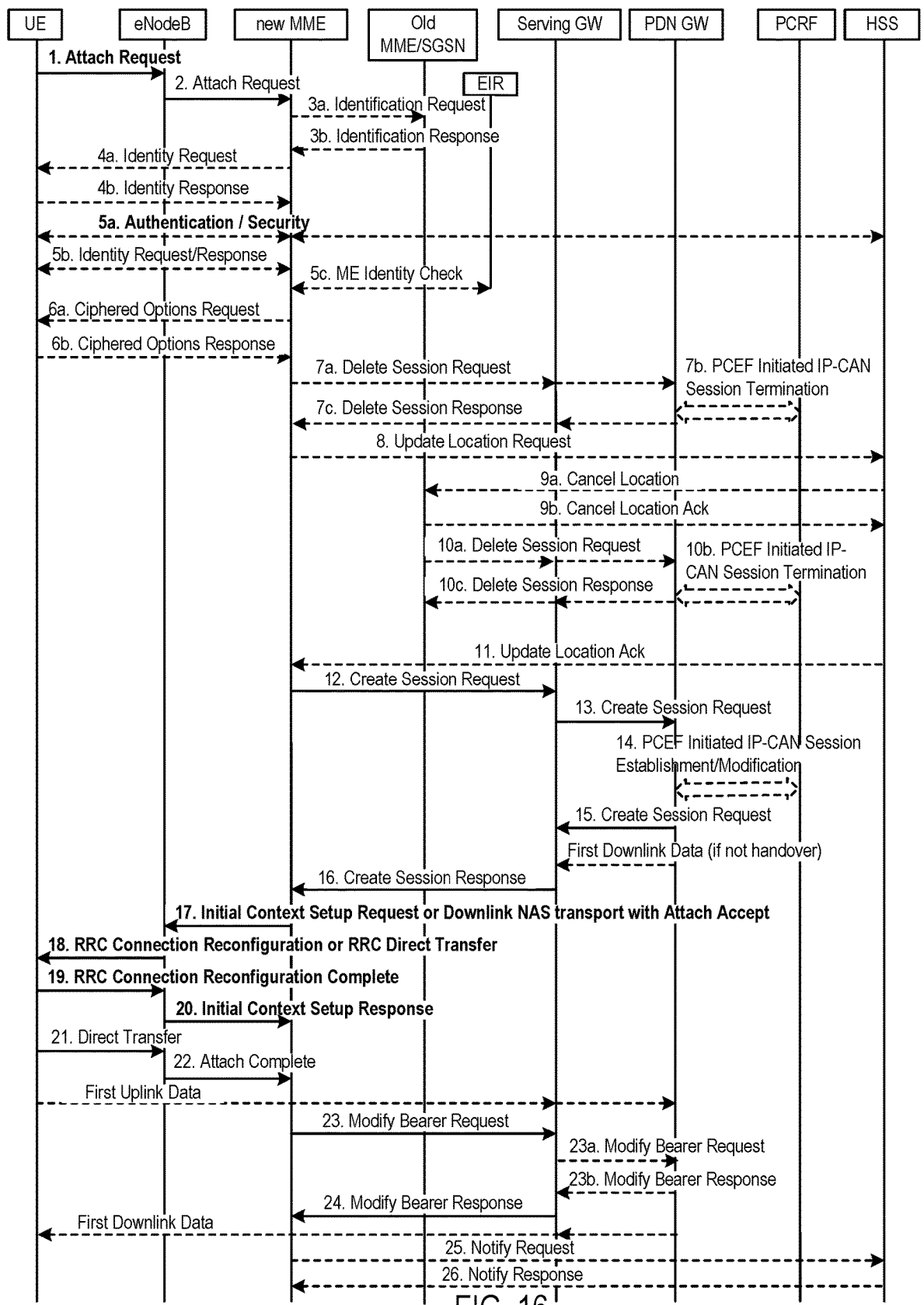
FIG. 16 is a signal flow diagram illustrating an attach and authentication procedure.

FIG. 16 is a signal flow diagram illustrating an attach and authentication procedure in EPS. Note that in 4G-LTE, the MME assumes the role of both AMF and SMF, HSS assumes the role of AUSF/UDM, the eNB is the logically equivalent entity of gNB, the S-GW executes a UPF, serving as UP data gateway for IoT-UE, the PDN-GW serves as the UPF that connects the user to the data network.

In certain embodiments, message "1. Attach Request," message "5a. Authentication/Security," message "17. Initial Context Setup Request or Downlink NAS transport with Attach Accept," message "18. RRC Connection Reconfiguration or RRC Direct Transfer," message "19. RRC Connection Reconfiguration Complete," and message "20. Initial Context Setup Response" are the messages on which messages and steps of component 2 can be mapped, adding into existing messages exchanged, as follows.

The IoT-UE group enrollment request 1510 in FIG. 15 can be piggybacked into the message "1. Attach Request" in FIG. 16. The AMF group context creation process 1512 shown in FIG. 15 (if executed) can mapped into the message "5a. Authentication/Security" of FIG. 16.

If eNB group context creation process 1516 shown in FIG. 15 is executed: the gNB group credentials generation process 1518, the local gNB group context allocation process 1520, and the per IoT-UE tokens generation process 1526 of FIG. 15 can be executed between the message "16. Create Session Response" and the message "17. Initial Context Setup Request or Downlink NAS transport with Attach Accept" shown in FIG. 16; the (R)AN group context establishment request message 1522 and the AMF IoT-UE group enrollment request 1528 shown in FIG. 15 can be piggybacked into the message "17. Initial Context Setup Request or Downlink NAS transport with Attach Accept" shown in FIG. 16; the (R)AN group context allocation process 1523 and the IoT-UE group context allocation and credentials generation process 1530 in FIG. 15 can be executed between the message "17. Initial Context Setup Request or Downlink NAS transport with Attach Accept" and the message "18. RRC Connection Reconfiguration or RRC Direct Transfer" in FIG. 16; and the group context establishment response message 1524 and the AMF IoT-UE group enrollment response message 1538 in FIG. 15 can be piggybacked to the message "20. Initial Context Setup Response" in FIG. 16.

The (R)AN IoT-UE group enrollment request message 1532 in FIG. 15 can be piggybacked into the message "18. RRC Connection Reconfiguration or RRC Direct Transfer" in FIG. 16. The IoT-UE group context process 1534 in FIG. 15 can be executed between message "18. RRC Connection Reconfiguration or RRC Direct Transfer," and the message "19. RRC Connection Reconfiguration Complete" in FIG. 16. The (R)AN IoT-UE group enrollment response message 1536 in FIG. 15 can be piggybacked into the message "19. RRC Connection Reconfiguration Complete" in FIG. 16.

B(5) Component 3: Efficient and Secure IoT-UE UP Data Transmission

The efficient IoT-UE UP establishment procedure 1230 shown in FIG. 12 (component 3) applies when both components 1 and 2 have been executed, i.e., after: (i) group information has established at the AUSF/UDM 1203; and (ii) the IoT-UE 1201 has enrolled into a group, and thus per IoT-UE keys in FIG. 13 have been derived and distributed.

To meet the infrequent data transmission characteristics of IoT-UEs, component 3 provides a mechanism for IoT-UE, (R)AN and 5G-CN to efficiently establish a UP connection without the need to contact the 5G-CN (causing inefficiency and potential signaling storms). Recall that, a problem addressed in this disclosure is reducing the overhead generated by multiple IoT-UEs requiring a UP connection to perform data transmission.

Figure 17:
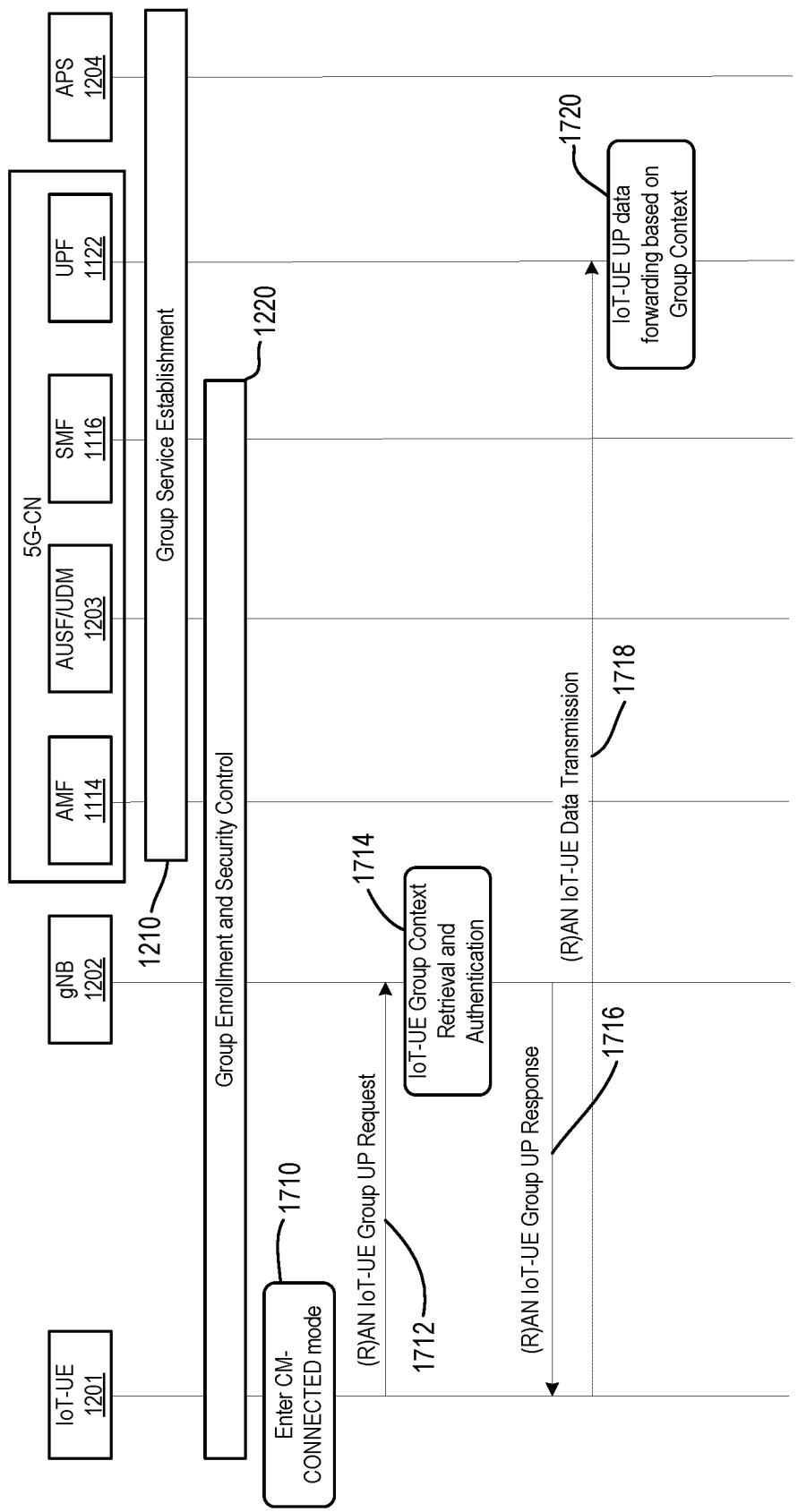
FIG. 17 is a signal flow diagram illustrating an example of UP data transmission with low signaling overhead for an IoT-UE entering CONNECTED mode from IDLE/INACTIVE mode according to one embodiment.

FIG. 17 is a signal flow diagram illustrating an example of UP data transmission with low signaling overhead for an IoT-UE 1201 entering CONNECTED mode from IDLE/INACTIVE mode according to one embodiment. FIG. 17 shows the interactions between the IoT-UE 1201, the gNB 1202, the AMF 1114, the AUSF/UDM 1203, the SMF 1116, the UPF 1122, and the APS 1204 shown in FIG. 12. FIG. 17 also shows the group service establishment procedure 1210 (component 1) and the group enrollment and security control procedure 1220 (component 2) shown in FIG. 12

When the IoT-UE 1201 has data to be transmitted, the IoT-UE 1201 enters 1710 connection management (CM) CONNECTED mode from IDLE/INACTIVE mode, and fetches its local group context from its stored UE context comprising $id_{grp}$, $Alg_{id}$, $Alg_{U_{se}}$, and $k_{UE}^{grp}$. In alternative embodiments wherein there is no group credential establishment, $k_{UE}^{grp}$ is not contained in the gNB's UE context.

Then, the IoT-UE 1201 sends an RRC request message 1712 for (R)AN IoT-UE group UP transmission or a service request NAS message to the gNB 1202. The message 1712 is optionally encrypted using RRC level security, and carries $id_{grp}$, $id_{UE}$, N3, and $tag_1$, where $N_3$ is a random nonce of length $L_N$, and $tag_1 \leftarrow MAC_{k_{UEInt}^{grp}}(id_{grp} \Vert id_{UE} \Vert N_3)$. If a service request NAS message is sent for the IoT-UE 1201 returning from IDLE/INACTIVE, the IoT-UE 1201 indicates (R)AN IoT-UE group UP transmission in the RRC message 1710. In the alternative embodiments wherein there is no group credential establishment, the UE uses $k_{gNB}$ to produce the tag, or sends a NAS service request as already indicated.

Once the message 1712 is received, based on $id_{grp}$ and $id_{UE}$, the gNB 1202 performs an IoT-UE group context and retrieval authentication process 1714 by retrieving the IoT-UE's group context comprising $id_{UE}$, $C_{UE}$, $id_{AlgInt}$, $id_{AlgEnc}$, as well as the group's routing context information. Furthermore, the gNB 1202 authenticates the IoT-UE 1202 by verifying $tag_1$, using $k_{UEInt}^{grp}$ derived from $k_{UE}^{grp}$. If receiving a service request NAS message with indication for (R)AN IoT-UE Group UP transmission, the gNB 1202 does not forward the NAS message to the AMF 1114. In the alternative embodiments wherein there is no group credential establishment, the gNB uses $k_{gNB}$ to verify the UE's tag on the sent message.

The gNB 1202 confirms the successful authentication for the IoT-UE 1201 by sending an RRC response message 1716 (e.g., a (R)AN IoT-UE group UP response).

In IoT-UE UP data transmission 1718, the IoT-UE 1201 sends UP data through the gNB 1202 towards the (group's) UPF 1122 according to the stored UP context for the group.

The UPF 1122 performs an IoT-UE UP data forwarding based on group context process 1720 by routing IoT-UE generated traffic according to group context's routing policies, either during the execution of component 1 or component 2, as described above with respect to FIGS. 14 and 15.

In certain embodiments, the service request in the request message 1712 can be piggybacked with the UP data packets. If there is no other UP data packets to transmit at the IoT-UE 1201, e.g. the piggybacked data packets or the service request message indicates the end of transmission, the response message 1716 indicates the success of the piggybacked UP data packets transmission and the IoT-UE UP data transmission 1718 can be skipped. The gNB 1202 may send the IoT-UE 1201 back to IDLE mode.

B(6) Component 4: Group Security Management for Security Keys Refreshing

In certain embodiments, Component 4: group security management for security keys refreshing is optional (e.g., it is performed only in case no group credentials are used). In the group security management procedure 1240 shown in FIG. 12, security context is managed at different levels in the architecture, e.g., from the IoT-UE 1201 up to the AMF 1114. Key refreshing policy may be left to the MNO. One embodiment include refreshing $k_{UE}^{grp}$ wherein the IoT-UE key refreshing is triggered by: key update of $k_{gNB}^{grp}$ or $k_{AMF}^{grp}$; and key refreshing policies that are local to the gNB 1202. That is, each gNB may maintain a counter $C_{UE}$ for each IoT-UE's key. Each gNB keeps track of the number of times $k_{UE}^{grp}$ is used, and over a certain threshold number (defined by the MNO or application policies), $k_{UE}^{grp}$ is re-generated, with an increased counter.

One embodiment includes refreshing $k_{gNB}^{grp}$ wherein the key of a gNB is refreshed by a key update of $k_{AMF}^{grp}$. Based on IoT-UE group service characteristics, different group security update policy may apply. For example, the group security update policy may be a validity/update timer, a valid number of IoT-UEs enrolled under the same gNB, a valid number of IP packets, etc. When the criteria of the update policy are met, the gNB should refresh its key $k_{gNB}^{grp}$.

In certain embodiments, there are at least two options for $k_{UE}^{grp}$ refreshing. In a first option, the gNB may refresh the key $k_{UE}^{grp}$ of a member IoT-UE at the first time such member IoT-UE contacts the gNB (e.g., for user plane data transmission). Therefore, the gNB may maintain several past group keys before all the group members get the new refreshed group key. In a second option, the gNB may broadcast security policies information for group management in a SIB (system information block). In this case, the IoT-UE may be able to use its key with the gNB, within a period of time, otherwise it may have to perform group enrollment procedure again, e.g., send a service request indicating for group enrollment of the IoT service.

In certain embodiments, if a group member IoT-UE leaves the group or is detected to be compromised, the gNB may immediately revoke the UE's membership and its corresponding keys.

One embodiment includes refreshing $k_{AMF}^{grp}$ wherein the AMF periodically refreshes its group key based on a validity period, based on statistics on traffic or number of IoT-UEs, or as a consequence of a key leak. The refreshing of $k_{AMF}^{grp}$ imposes, in certain embodiments, the refresh of all $k_{gNB}^{grp}$ which, similar to $k_{UE}^{grp}$ refreshing, can be carried out by broadcasting the key refreshing event to every gNB that has an active context at AMF side, or notified at the first subsequent communication of every gNB with AMF. Key refreshing may also by necessary in case $k_M^{grp}$ is refreshed by the AUSF/UDM.

One embodiment includes refreshing $k_M^{grp}$ wherein the group's master key may be optionally a long term key (similar to key k in EPS-AKA, which is stored inside UE's SIM card), or regularly refreshed. In the first case, AUSF/UDM uses the RAND field to create $k_{AMF}^{grp}$, by introducing enough entropy in the key hierarchy. In the second case, e.g., in the case that $k_M^{grp}$ was created using a key derivation algorithm, RAND may be omitted. In certain embodiments, it is up to the MNO to configure how often to update $k_M^{grp}$, and thus the whole key hierarchy.

B(7) Additional Examples

Example 1B may include the method contains an Application Server (APS) generating an AUSF/UDM Service Request message towards AUSF/UDM via NEF for group service establishment, wherein the message specifies at least one of the following information: Service ID, one or more Group ID ($id_{grp}$), geographical contextual information for the group, and APS Credentials, in which the Service ID is the identifier subscribed by the APS for the requested service; the APS ID is the Application Server identifier; Group IDs are the subscribed group associated to the Service ID; the APS Credentials depends on the type of authentication used between APS and AUSF/UDM.

Example 2B may include the method of example 1B, or some other example herein, wherein the APS credentials can be a digital certificate or a Message Authentication Code (MAC) computed using a shared secret.

Example 3B may include the method of example 2B, or some other example herein, wherein the Group ID, ($id_{grp}$) is a long term fixed ID for a group and is configured at IoT-UEs.

Example 4B may include the method of example 2B, or some other example herein, wherein the Group ID, ($id_{grp}$) is a short term identifier, and is not known in advance by IoT-UEs.

Example 5B may include the method of example 3B or example 4B, or some other example herein, where after receiving the request message the AUSF/UDM authenticates APS using APS's credentials, according to the authentication method agreed between APS and MNO.

Example 6B may include the method of example 4B, or some other example herein, wherein AUSF/UDM creates and stores a new Group Record associated to the Service ID and the APS ID after successful authentication of APS, wherein the record contains at least one of the following information: Group ID ($id_{grp}$), APS ID, Group Master Key ($k_M^{grp}$), and allowed geographical location; $k_M^{grp}$ is generated based on a key derivation algorithm, pre-agreed with APS.

Example 7B may include the method of example 6B, or some other example herein, wherein the AUSF/UDM sends a Service Response message to acknowledge the APS the successful creation of the given context for the groups and service specified.

Example 8B may include the method of example 1B, or some other example herein, wherein method for an AUSF/UDM to compute per-AMF generated Group Credential, $k_{AMF}^{grp} \leftarrow KDF_{k_M^{grp}}(id_{grp}, id_{AMF}, SQN, RAND)$, where SQN is a sequence number that is used for key versioning, and RAND is an optional random string of bit length $L_{RAND}$.

Example 9B may include the method of example 8B, or some other example herein, wherein the AUSF/UDM stored a Group Record.

Example 10B may include the method of example 9B, or some other example herein, wherein, where the AUSF/UDM proactively creates and delivers AMF Group Credentials for all the registered groups towards all applicable AMFs by selecting applicable AMFs based on the MNO configuration, geographical location of the target group members, and sends an AMF Group(s) Security Key(s) Delivery message, wherein the message includes the per-AMF generated Group Credentials, and the message shall be encrypted and integrity protected.

Example 11B may include the method of example 9B, or some other example herein, wherein the AUSF/UDM generates per-AMF generated Group Credentials when receiving request from an AMF while the network receives the group enrollment request from the first IoT-UE registered the AMF.

Example 12B may include the method of example 11B and 12B, or some other example herein, wherein the AMF creates a group context consisting of at least $id_{grp}$ and $k_{AMF}^{grp}$.

Example 13B may include the method of example 10B and 11B, or some other example herein, wherein the AMF selects a proper SMF and send a SMF Group(s) Session Allocation Request message to the selected SMF, wherein the SMF pre-establishes Group UP sessions at UPF by configuring user plane routing profile for the group and stores the Group UP context, for one or more groups and manages the user plane session.

Example 14B may include the method of example 13B, or some other example herein, wherein the SMF replies to the AMF with a SMF Group(s) Session Allocation Response to confirm the completion of the procedure.

Example 15B may include the method of example 1B, or some other example herein, wherein an IoT-UE generates a random nonce $N_1$ of bit length $L_N$, and sends an IoT-UE Group Enrollment Request to the AMF via a gNB, wherein the message includes $N_1$, and the unique identifier $id_{grp}$ of the group to which it requests enrollment.

Example 16B may include the method of example 15B, or some other example herein, wherein once received the request from IoT-UE, the AMF checks whether it already stored a security context for group $id_{grp}$ and requests the creation of group credentials through an AMF Group Credentials Creation Request message if no context is stored for the group.

Example 17B may include the method of example 16B, or some other example herein, wherein context stored at the AMF includes a symmetric key $k_{AMF}^{grp}$ derived from the group master key $k_{AMF}^{grp}$. held by AUSF/UDM.

Example 18B may include the method of example 17B, or some other example herein, wherein the AMF proceeds with eNB group context creation wherein the gNB group context contains at least $k_{gNB}^{grp}$, $id_{gNB}$, and $C_{gNB}$, wherein $C_{gNB}$ is a counter (used for key refreshing and versioning, $id_{gNB}$ is the unique identity of the gNB, and $k_{gNB}^{grp} \leftarrow KDF_{k_M^{grp}}(id_{grp}, id_{gNB}, C_{gNB})$ is the group key for gNB; $C_{gNB}$ ensures freshness for this key.

Example 19B may include the method of example 18B, or some other example herein, wherein the AMF delivers $k_{gNB}^{grp}$ to the gNB over a (R)AN Group Context Establishment Request message, which is integrity and confidentiality protected using $k_{N2enc}$ and $k_{N2int}$, respectively.

Example 20B may include the method of example 19B, or some other example herein, wherein the gNB creates a local group context storing $k_{gNB}^{grp}$, and responds to AMF with a Group Context Establishment Response message.

Example 21B may include the method of example 20B, or some other example herein, wherein the AMF generates a random nonce $N_2$ of bit length $L_N$, and sends $N_1, N_2, id_{grp}$ and $id_{UE}$ to the gNB in an AMF IoT-UE Group Enrollment Request.

Example 22B contains a method of example 21B, where the gNB establishes a group context for the IoT-UE, which contains at least $id_{UE}$, $c_{UE}$, $Alg_{Id}$, $Alg_{U_{se}}$, and $k_{UE}^{grp}$, wherein $id_{UE}$ is IoT-UE's unique identifier; $c_{UE}$ is a counter that is used for key refreshing and versioning; $Alg_{Id}$ and $Alg_{U_{se}}$ identify the algorithms that will be used for integrity and confidentiality protection for all control plane and user plane messages exchanged between IoT-UE and gNB; $k_{UE}^{grp} \leftarrow KDF_{k_{gNB}^{grp}}(N_1, N_2, id_{UE}, c_{UE}, Alg_{Id}, Alg_{U_{se}}, k_{gNB})$.

Example 23B contains a method of example 22B, where the gNB sends a (R)AN IoT-UE Group Enrollment Request message to the IoT-UE, encrypted and integrity protected using RCC keys ($k_{RCCenc}, k_{RCCint}$), wherein the message carries: $N_1, N_2, id_{UE}, k_{UE}^{grp}, Alg_{Id}$, and $Alg_{U_{se}}$.

Example 24B contains a method of example 23B, where the IoT-UE builds a local context storing $id_{grp}, Alg_{Id}, Alg_{U_{se}}$, and $k_{UE}^{grp}$, wherein both $Alg_{IdInt}$ and $Alg_{IdEnc}$ shall match the parameters negotiated during Registration.

Example 25B contains a method of example 24B, based on $k_{UE}^{grp}$, where IoT-UE derives two keys, $k_{UEInt}^{grp}$ and $k_{UEEnc}^{grp}$, used for, respectively, integrity protection and encryption of control and data plane.

Example 26B contains a method of example 25B, where the IoT-UE confirms the group enrollment to the gNB using a (R)AN IoT-UE Group Enrollment Response message, which is integrity protected using the newly generated key $k_{UEInt}^{grp}$ which is to be used to compute a MAC on the response message.

Example 27B contains a method of example 26B, where the gNB confirms the success of the group enrollment for the IoT-UE by sending an AMF IoT-UE Group Enrollment Response message containing: $id_{UE}$, and $c_{UE}$, wherein the message is integrity and confidentiality protected.

Example 28B may include an apparatus comprising means to perform one or more elements of a method described in or related to any of examples 1B-27B, or any other method or process described herein.

Example 29B may include one or more non-transitory computer-readable media comprising instructions to cause an electronic device, upon execution of the instructions by one or more processors of the electronic device, to perform one or more elements of a method described in or related to any of examples 1B-27B, or any other method or process described herein.

Example 30B may include an apparatus comprising logic, modules, or circuitry to perform one or more elements of a method described in or related to any of examples 1B-27B, or any other method or process described herein.

Example 31B may include a method, technique, or process as described in or related to any of examples 1B-27B, or portions or parts thereof.

Example 32B may include an apparatus comprising: one or more processors and one or more computer readable media comprising instructions that, when executed by the one or more processors, cause the one or more processors to perform the method, techniques, or process as described in or related to any of examples 1B-27B, or portions thereof.

Example 33B may include a signal as described in or related to any of examples 1B-27B, or portions or parts thereof.

Example 34B may include a signal in a wireless network as shown and described herein.

Example 35B may include a method of communicating in a wireless network as shown and described herein.

Example 36B may include a system for providing wireless communication as shown and described herein.

Example 37B may include a device for providing wireless communication as shown and described herein.

C. Mobility Support for Group Based Security for M-IoT

The embodiments of the above sections provide solutions for efficient group-based handling of M-IoT devices that are compatible with both current EPS cellular networks and next generation 5GS. The disclosed embodiments reduce overhead between the (R)AN and the core network that originates from the unnecessary signaling traffic for IoT devices transitioning from IDLE to CONNECTED mode, especially when sending small data packets.

For some IoT services, e.g., asset tracking, the system may support mobility. Thus, in this section, disclosed embodiments provide for handling group reenrollment for the IoT devices during a handover procedure. In particular, the embodiments provide solutions to handle the group context and security context in different handover scenarios for M-IoT devices in 5GS. Certain embodiments, for example, allow group enrollment/re-establishment for IoT-UEs that execute Xn or N2 based handover procedures.

The following procedures may used to hand over an IoT-UE from a source NG-RAN node (e.g., gNB) to a target NG-RAN node using the Xn or N2 reference points. This can be triggered, for example, due to new radio conditions, load balancing or due to specific service. In view of group context handling, there five handover cases: Intra NG-RAN node; Inter NG-RAN node with Xn interface; Intra AMF, Intra SMF, Inter NG-RAN node without Xn interface; Intra AMF, Inter SMF, Inter NG-RAN node without Xn interface; and Inter AMF, Inter and Intra SMF, Inter NG-RAN node without Xn interface.

These five handover cases can be classified into three solutions depending on the existence of the Xn interface between NG-RAN nodes, the change of AMF as well as the change of the SMF. When an IoT-device handovers to a target gNB, the handover procedure may choose corresponding group context handling solutions for group UL UP context and the group security context, as follows.

For Intra AMF and Intra/Inter NG-RAN handover with Xn interface: a IoT-UE moves from the source gNB to the target gNB within the same AMF domain and there exists Xn interface between source gNB and target gNB.

For Intra/inter NG-RAN handover without Xn interface (N2 handover): a IoT-UE moves from the source gNB to the target gNB with or without the change of the AMF.

For handover involving SMF and UPF changes: depending on the IoT-UE's location, the source AMF (in case1) or the target AMF (in case2) may select a different SMF, resulting different UL UP group context for forwarding data packets at UPF.

Certain embodiments provide solutions to conduct group enrollment procedure along with the handover procedures. This is based on the assumption that the IoT-UE has already enrolled into a group, and needs to perform handover.

In a first handover embodiment (Solution 1), an Xn based handover procedure performs group re-enrollment between the source gNB and target gNB when an Xn interface exists. In addition, Solution 1 allows the AMF to create/update group credentials for the target gNB, if needed.

In a second handover embodiment (Solution 2), a unified N2 handover procedure is used for any handover scenarios for handling IoT-UE handover as well as group enrollment at target gNB.

These two solutions are discussed in detail below.

C(1) Solution 1: Xn based handover between two gNBs within the same AMF

Figure 18:
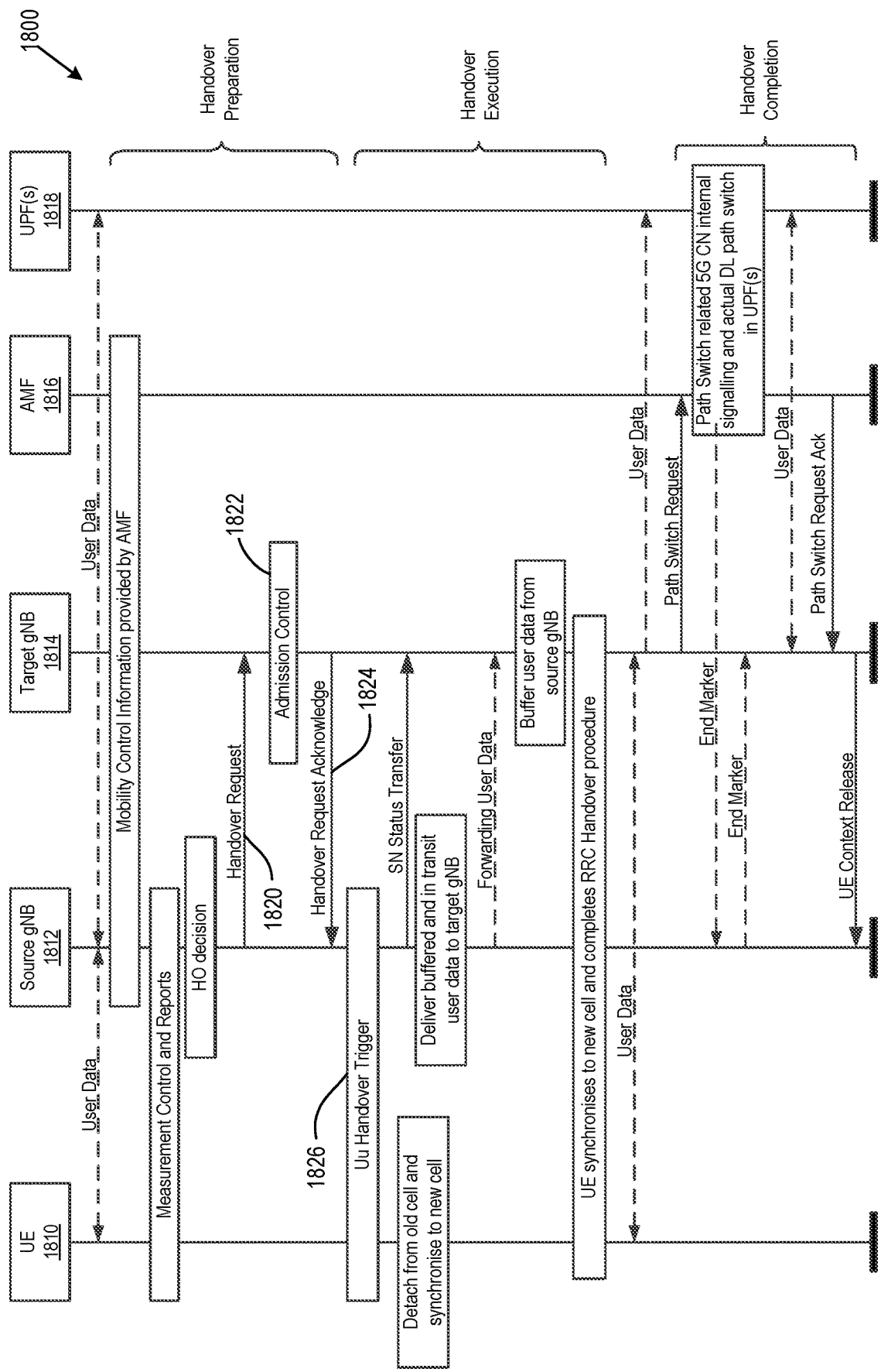
FIG. 18 is a signal flow diagram illustrating an intra-AMF/UPF handover procedure that is modified to handle group context and security context according to certain embodiments.

FIG. 18 is a signal flow diagram illustrating an intra-AMF/UPF handover procedure 1800 that is modified to handle group context and security context according to certain embodiments. In this example, a UE 1810 undergoes handover from a source gNB 1812 to a target gNB 1814 without a change in a corresponding AMF 1816 or UPF(s) 1818. Additional details of the handover procedure 1800 (without handling of group context or security context) may be found, for example, in TS 38.300.

In certain embodiments, during the handover procedure 1800, the UE 1810 (e.g., an IoT-UE), the target gNB 1814 and the core network perform component 2 (group enrollment and security control) as shown in FIG. 12 and FIG. 15 to enroll the UE 1810 into the local group managed by the target gNB 1814. As shown in the eNB group context creation process 1516 in FIG. 15, the enrollment procedure establishes the group context if the target gNB does not have an existing one.

For inter-gNB handover (i.e., from the source gNB 1812 to the target gNB 1814) in FIG. 18, the signaling procedures include at least the following elemental illustrated components. The source gNB 1812 initiates handover and sends a handover request message 1820 to the target gNB 1814 over the Xn interface. If the UE 1810 is enrolled as a group member at the source gNB 1812, the handover request message 1820 includes a group ID and group member security context of the UE 1810.

In an admission control process 1822, the target gNB 1814 checks the corresponding group context identified by group ID and performs admission control for the group. If there is no required information in the group member security context received from source gNB 1812, the target gNB 1814 initiates an N2 request message to the AMF 1816, wherein the N2 request message indicates the group ID of the UE 1810. The AMF 1816 triggers the group enrollment procedure for the UE 1810 (as in the eNB group context creation process 1516 and the per IoT-UE tokens generation process 1526 in FIG. 15). The AMF 1816 modifies the control plane and user plane context for the UE 1810. In some embodiments, the AMF 1816 also checks if the SMF needs to be changed. If yes, the AMF 1816 performs the establish UP context sub-process 1460 shown in FIG. 14 of component 1. The AMF 1816 sends the N2 response message to the target gNB 1814 (as in the AMF IoT-UE group enrollment request 1528 shown in FIG. 15).

As in the IoT-UE group context allocation and credentials generation process 1530 in FIG. 15, the target gNB 1814 generates group member credentials for the UE 1810 and adds the group member context of the UE 1810 into the group context. The target gNB 1814 sends a handover request acknowledge message 1824 to the source gNB 1812, wherein the message includes security parameters using the RRC encryption key. When receiving the handover request acknowledge message 1824, the source gNB 1812 removes group member information of the moved UE 1810 from the group context.

A Uu handover trigger process 1826 shown in FIG. 18 is modified to include the following processes from FIG. 15.

In addition to sending the (R)AN IoT-UE group enrollment request message 1532, the source gNB 1812 sends a handover command to the UE 1810. The handover command includes the RRC configuration and encrypted security parameters, e.g., group membership key of the UE 1810. As in IoT-UE group context process 1534, the UE 1810 generates the group security keys. As in the (R)AN IoT-UE group enrollment response message 1536, the UE moves the RRC connection to the target gNB 1814 and replies the handover complete message.

C(2) Solution 2: N2 based handover between two gNBs with/without AMF

Figure 19:
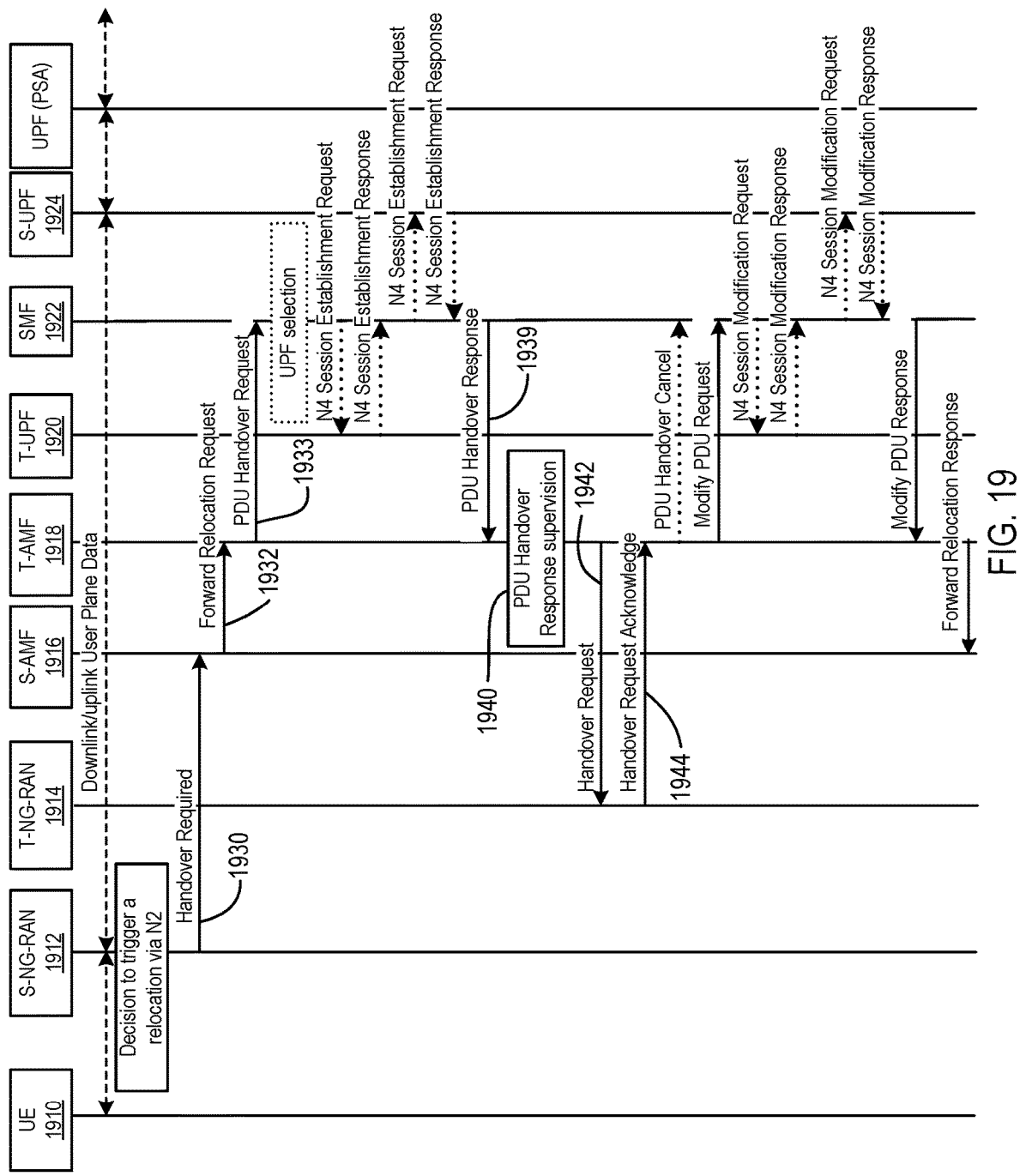
FIG. 19 is a signal flow diagram illustrating a preparation phase of an Inter-NG-RAN node N2 based handover with or without AMF/UPF changes that is modified to handle group context and security context according to certain embodiments.
Figure 20:
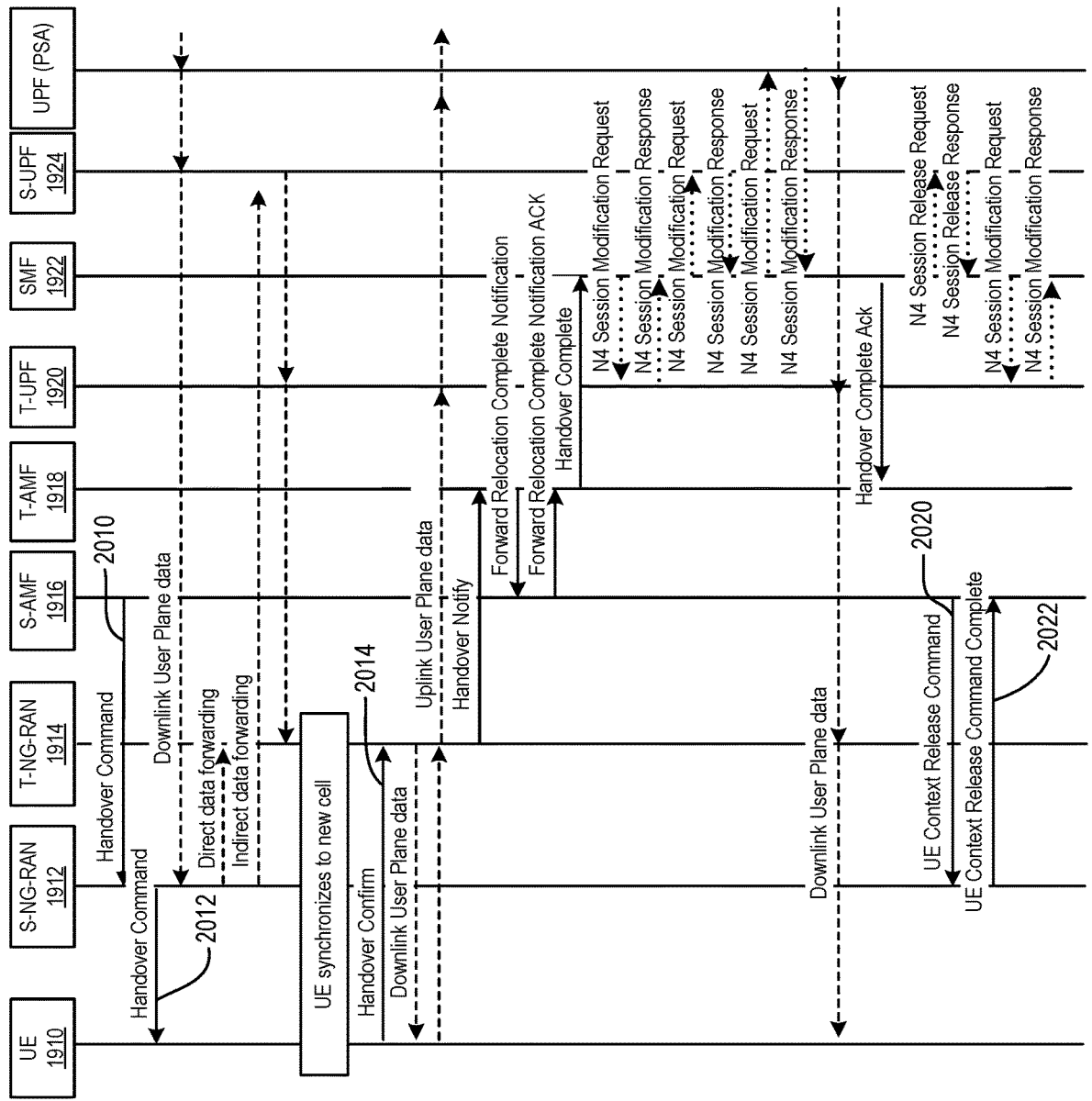
FIG. 20 is a signal flow diagram illustrating an execution phase of the Inter-NG-RAN node N2 based handover with or without AMF/UPF changes that is modified to handle group context and security context according to certain embodiments.

FIG. 19 is a signal flow diagram illustrating a preparation phase of an Inter-NG-RAN node N2 based handover with or without AMF/UPF changes that is modified to handle group context and security context according to certain embodiments. Similarly, FIG. 20 is a signal flow diagram illustrating an execution phase of the Inter-NG-RAN node N2 based handover with or without AMF/UPF changes that is modified to handle group context and security context according to certain embodiments. In the example of both FIGS. 19 and 20, a UE 1910 (e.g., an IoT-UE) undergoes a handover between a source gNB (shown as S-NG-RAN 1912) and a target gNB (shown as T-NG-RAN 1914) under the following two scenarios: (1) there exists an Xn interface between the source gNB and the target gNB and the AMF (shown as S-AMF 1916) remains the same; and (2) there is no Xn interface between the source gNB and the target gNB and/or a new AMF (shown as T-AMF 1918) is selected for serving the UE 1910.

In either cases, i.e., Xn or N2 based handover, the source gNB initiates Inter NG-RAN node N2 based handover between two gNBs under the same or different AMFs or with/without Xn interface. That is, if the source gNB determines to initiate handover for the UE 1910 enrolled in a group identified by a group ID, it activates N2 based handover whether or not there is Xn interface between the source gNB and the target gNB and the AMF is the same or changed.

The source gNB initiates group enrollment for the UE 1910 in the handover procedure with the following additions.

C(2)(a) Preparation Phase

Referring to FIG. 19 for the handover preparation phase, the source gNB sends a handover required message 1930 to the AMF. The handover required message 1930 includes the group ID of the UE 1910, a target gNB ID, and a location of the UE 1910. If there is no AMF change, the source AMF skips sending a forward relocation request 1932 to a target AMF. Based on the information in the handover required message 1930, the source AMF (S-AMF 1916) may select a new SMF (shown as SMF 1922) and corresponding change of UPF (from S-UPF 1924 to T-UPF 1920). This is shown in the processes from a PDU handover request 1933 to a PDU handover response 1939.

In a PDU handover response supervision process 1940, a handover request message 1942, and a handover request acknowledge message 1944, the AMF performs group enrollment for the UE 1910 by performing the following processes of FIG. 15: the per IoT-UE tokens generation process 1526; for the handover request message towards target gNB, the (R)AN group context establishment request message 1522 combined with the AMF IoT-UE group enrollment request 1528; and for the target gNB to create RAN group context if it does not exist, and to create IoT-UE group context and credential generation, the R)AN group context allocation process 1523 combined with the IoT-UE group context allocation and credentials generation process 1530. Additionally, for the handover response message, the target gNB may send IoT-UE token information which is protected by the RRC encryption key of the target gNB.

C(2)(b) Execution Phase

Referring to FIG. 20 for the handover execution phase, the AMF sends a handover command 2010 to source gNB, wherein the source gNB may provide IoT-UE token information which is protected by the RRC encryption key of the target gNB. The source gNB sends a handover command message 2012 to the UE 1910 and the UE 1910 acknowledges with handover confirmation message 2014, which can be mapped to the following steps in FIG. 15: the source gNB forwards the IoT-UE token information to the UE 1910 in the handover command 2010 using the(R)AN IoT-UE group enrollment request message 1532; the UE 1910 generates IoT-UE group context using the IoT-UE group context process 1534; the UE 1910 returns the handover confirmation message 2012 to the target gNB in the (R)AN IoT-UE group enrollment response message 1536.

As shown in FIG. 20, the source AMF sends a UE context release command 2020 to the source gNB. The source gNB deletes the UE context of the UE 1910 and removes the group member context of the UE 1910 from the group context identified by the group-ID. The source gNB then sends a UE context release command complete message 2022 to the source AMF.

C(3) Additional Examples

Example 1C may include a first radio access network (RAN) node (e.g., a gNB) to handover a connection of an IoT-UE to a second RAN node, the first RAN node having circuitry to: generate a handover request message to include a group-ID and a group member security context of an IoT-UE if the IoT-UE has enrolled as a group member of a group identified by the group-ID; and send the handover request message to the second RAN node over an Xn interface between the first RAN node and the second RAN node.

Example 2C may include the first RAN node of example 1C or some other example herein, wherein the circuitry is further to: send a Handover Command to the IoT-UE, wherein the handover command includes: an indication for initiation of IoT-UE Group Enrollment; an RRC configuration; or encrypted security parameters, including group membership key of the IoT-UE.

Example 3C may include the first RAN node of example 2C or some other example herein, wherein the circuitry is further to: remove group member information of a moved UE from the group context upon receipt of a Handover Request Ack message.

Example 4C may include a second RAN node to handle a handover of a connection of a IoT-UE from a first RAN node, the second RAN node having circuitry to: check a stored group context identified by a group-ID included in a handover request message that also includes a group member security context of an IoT-UE if the IoT-UE has enrolled as a group member of a group identified by the group-ID; perform admission control for the group; and initiate N2 request message to a first core network control plane function, AMF, if there is no required information in the group member security context received from the first RAN node, wherein the N2 request message indicates the group-ID of the IoT-UE.

Example 5C may include the second RAN node of example 4C or some other example herein, wherein the circuitry is further to: generate group member credentials for the IoT UE; add the group member context of the IoT-UE into group context; and send a Handover Request Ack message to the first RAN node, wherein the message contains security parameters using RRC encryption key.

Example 6C may include a first core network control plane function to facilitate a handover from a first RAN node to a second RAN node, the first core network control plane function having circuitry to: trigger group enrollment procedure for an IoT-UE including RAN node context generation/updates and IoT-UE token generation; modify control plane and user plane context for the IoT-UE; and check if a second core network control plane function, e.g., SMF, needs to be changed.

Example 7C may include the first core network control plane function of example 6C or some other example herein, wherein the circuitry is further to: send SMF Group(s) Session Allocation Request to a second core network control plane function for UPF Session establishment; and send an N2 response message to the second RAN node, wherein the N2 response message includes information elements for AMF IoT group enrollment.

Example 8C may include an IoT-UE to perform a handover operation from a first RAN node to a second RAN node, the IoT-UE having circuitry to: generate group security keys; establish an RRC connection to the second RAN node; and reply, to the second RAN node, with a handover complete message.

Example 9C may include a first RAN node to handle an IoT-UE handover procedure including a Preparation Phase and Execution phase, the first radio access network (RAN) node having circuitry to: determine to initiate handover procedure for an IoT-UE enrolled in a group identified by a group-ID regardless if there is Xn interface between the first RAN node and a second RAN node, and if AMF is the same or changed; activate handover over N2 interface between the first RAN node and a first core network function, AMF; send a handover required message to the AMF, wherein the message includes: a group-ID of the IoT-UE; a target gNB-ID; or a location of IoT-UE.

Example 10C may include the first RAN node of example 9C or some other example herein, wherein to perform a preparation phase the circuitry is to: initiate group enrollment for the IoT-UE in the handover procedure; and send a handover required message to the AMF which contains group-ID of the IoT-UE, target gNB-ID, location of IoT-UE.

Example 11C may include the first RAN node of example 9C or some other example herein, wherein the circuitry is further to send a handover command to the IoT-UE; wherein the Handover Command includes IoT-UE token information that is protected by an RRC encryption key of the second RAN node.

Example 12C may include the first RAN node of example 9C or some other example herein, wherein the circuitry is further to delete a UE context of the IoT device and remove the group member context of the IoT-UE from the group context identified by the group-ID.

Example 13C may include an AMF to facilitate an IoT-UE handover procedure between a first RAN node and a second RAN node, the AMF having circuitry to: select a second core network function, SMF, and a third core network function, UPF, wherein the SMF and UPF are changed.

Example 14C may include the AMF of example 13C or some other example herein, wherein to perform group enrollment for the IoT-UE the circuitry is to: generate an IoT-UE token; and send a Handover request message towards the second RAN node, wherein the message contains information elements in RAN group context establishment message and AMF IoT-UE group enrollment request message.

Example 15C may include the AMF of example 13C or some other example herein, wherein the circuitry is further to send Handover Command to the first RAN node, the Handover Command to include IoT-UE token information which is protected by the RRC encryption key of the second RAN node.

Example 16C may include a second RAN node to handle a handover of a connection of an IoT-UE from a first RAN node, the second RAN node having circuitry to: create a RAN group context if it does not exist; create an IoT-UE group context and credential generation; and send Handover response message to the AMF, wherein the message contains IoT-UE token information protected by the RRC encryption key of the second RAN node.

Example 17C may include the second RAN node of example 16C or some other example herein, wherein the circuitry is further to send an N2 message to the second AMF, and the second AMF sends UE context release command to the first RAN node.

Example 18C may include an IoT-UE having circuitry to: generate an IoT-UE group context; and acknowledge with handover confirmation message to the second RAN node.

Example 19C may include a method of operating a first radio access network (RAN) node to handover a connection of an IoT-UE to a second RAN node, the method comprising: generating a handover request message to include a group-ID and a group member security context of an IoT-UE if the IoT-UE has enrolled as a group member of a group identified by the group-ID; and sending the handover request message to the second RAN node over an Xn interface between the first RAN node and the second RAN node.

Example 20C may include the method of example 19C or some other example herein, wherein the method further comprises: sending a Handover Command to the IoT-UE, wherein the handover command includes: an indication for initiation of IoT-UE Group Enrollment; an RRC configuration; or encrypted security parameters, including group membership key of the IoT-UE.

Example 21C may include the method of example 19C or some other example herein, wherein the method further comprises: removing group member information of a moved UE from the group context upon receipt of a Handover Request Ack message.

Example 22C may include a method of operating a second RAN node to handle a handover of a connection of a IoT-UE from a first RAN node, the method comprising: checking a stored group context identified by a group-ID included in a handover request message that also includes a group member security context of an IoT-UE if the IoT-UE has enrolled as a group member of a group identified by the group-ID; performing admission control for the group; and initiating N2 request message to a first core network control plane function, AMF, if there is no required information in the group member security context received from the first RAN node, wherein the N2 request message indicates the group-ID of the IoT-UE.

Example 23C may include the method of example 22C or some other example herein, wherein the method further comprises: generating group member credentials for the IoT UE; adding the group member context of the IoT-UE into group context; and sending a Handover Request Ack message to the first RAN node, wherein the message contains security parameters using RRC encryption key.

Example 24C may include a method of operating a first core network control plane function to facilitate a handover from a first RAN node to a second RAN node, the method comprising: triggering group enrollment procedure for an IoT-UE including RAN node context generation/updates and IoT-UE token generation; modifying control plane and user plane context for the IoT-UE; and checking if a second core network control plane function, e.g., SMF, needs to be changed.

Example 25C may include the method of example 24C or some other example herein, wherein the method further comprises: sending an SMF Group(s) Session Allocation Request to a second core network control plane function for UPF Session establishment; and sending an N2 response message to the second RAN node, wherein the N2 response message includes information elements for AMF IoT group enrollment.

Example 26C may include a method of operating an IoT-UE to perform a handover operation from a first RAN node to a second RAN node, the method comprising: generating group security keys; establishing an RRC connection to the second RAN node; and replying, to the second RAN node, with a handover complete message.

Example 27C may include a method of operating a first RAN node to handle an IoT-UE handover procedure including a Preparation Phase and Execution phase, the method comprising: determining to initiate handover procedure for an IoT-UE enrolled in a group identified by a group-ID regardless if there is Xn interface between the first RAN node and a second RAN node, and if AMF is the same or changed; activating handover over N2 interface between the first RAN node and a first core network function, AMF; sending a handover required message to the AMF, wherein the message includes: a group-ID of the IoT-UE; a target gNB-ID; or a location of IoT-UE.

Example 28C may include the method of example 27C or some other example herein, wherein to perform a preparation phase the method comprises: initiating group enrollment for the IoT-UE in the handover procedure; and sending a handover required message to the AMF which contains group-ID of the IoT-UE, target gNB-ID, location of IoT-UE.

Example 29C may include the method of example 27C or some other example herein, further comprising sending a handover command to the IoT-UE; wherein the Handover Command includes IoT-UE token information that is protected by an RRC encryption key of the second RAN node.

Example 30C may include the method of example 27C or some other example herein, wherein the method further comprises deleting a UE context of the IoT device and removing the group member context of the IoT-UE from the group context identified by the group-ID.

Example 31C may include the method of operating an AMF to facilitate an IoT-UE handover procedure between a first RAN node and a second RAN node, the method comprising: selecting a second core network function, SMF, and a third core network function, UPF, wherein the SMF and UPF are changed.

Example 32C may include the method of example 31C or some other example herein, wherein to perform group enrollment for the IoT-UE the circuitry the method comprises: generating an IoT-UE token; and sending a Handover request message towards the second RAN node, wherein the message contains information elements in RAN group context establishment message and AMF IoT-UE group enrollment request message.

Example 33C may include the method of example 1C, 31C, 3C or some other example herein, wherein the method further comprises sending Handover Command to the first RAN node, the Handover Command to include IoT-UE token information which is protected by the RRC encryption key of the second RAN node.

Example 34C may include a method of operating a second RAN node to handle a handover of a connection of an IoT-UE from a first RAN node, the method comprising: creating a RAN group context if it does not exist; creating an IoT-UE group context and credential generation; and sending Handover response message to the AMF, wherein the message contains IoT-UE token information protected by the RRC encryption key of the second RAN node.

Example 35C may include the method of example 34C or some other example herein, wherein the method further comprises sending an N2 message to the second AMF, and the second AMF sends UE context release command to the first RAN node.

Example 36C may include a method of operating an IoT-UE, the method comprising: generating an IoT-UE group context; and acknowledging with handover confirmation message to the second RAN node.

Example 37C may include an apparatus comprising means to perform one or more elements of a method described in or related to any of examples 19C-36C, or any other method or process described herein.

Example 38C may include one or more non-transitory computer-readable media comprising instructions to cause an electronic device, upon execution of the instructions by one or more processors of the electronic device, to perform one or more elements of a method described in or related to any of examples 19C-36C, or any other method or process described herein.

Example 39C may include an apparatus comprising logic, modules, or circuitry to perform one or more elements of a method described in or related to any of examples 19C-36C, or any other method or process described herein.

Example 40C may include a method, technique, or process as described in or related to any of examples 19C-36C, or portions or parts thereof.

Example 41C may include an apparatus comprising: one or more processors and one or more computer readable media comprising instructions that, when executed by the one or more processors, cause the one or more processors to perform the method, techniques, or process as described in or related to any of examples 19C-36C, or portions thereof.

Example 42C may include a signal as described in or related to any of examples 19C-36C, or portions or parts thereof.

Example 43C may include a signal in a wireless network as shown and described herein.

Example 44C may include a method of communicating in a wireless network as shown and described herein.

Example 45C may include a system for providing wireless communication as shown and described herein.

Example 46C may include a device for providing wireless communication as shown and described herein.

D. Example Apparatus, Devices and Systems

Figure 21:
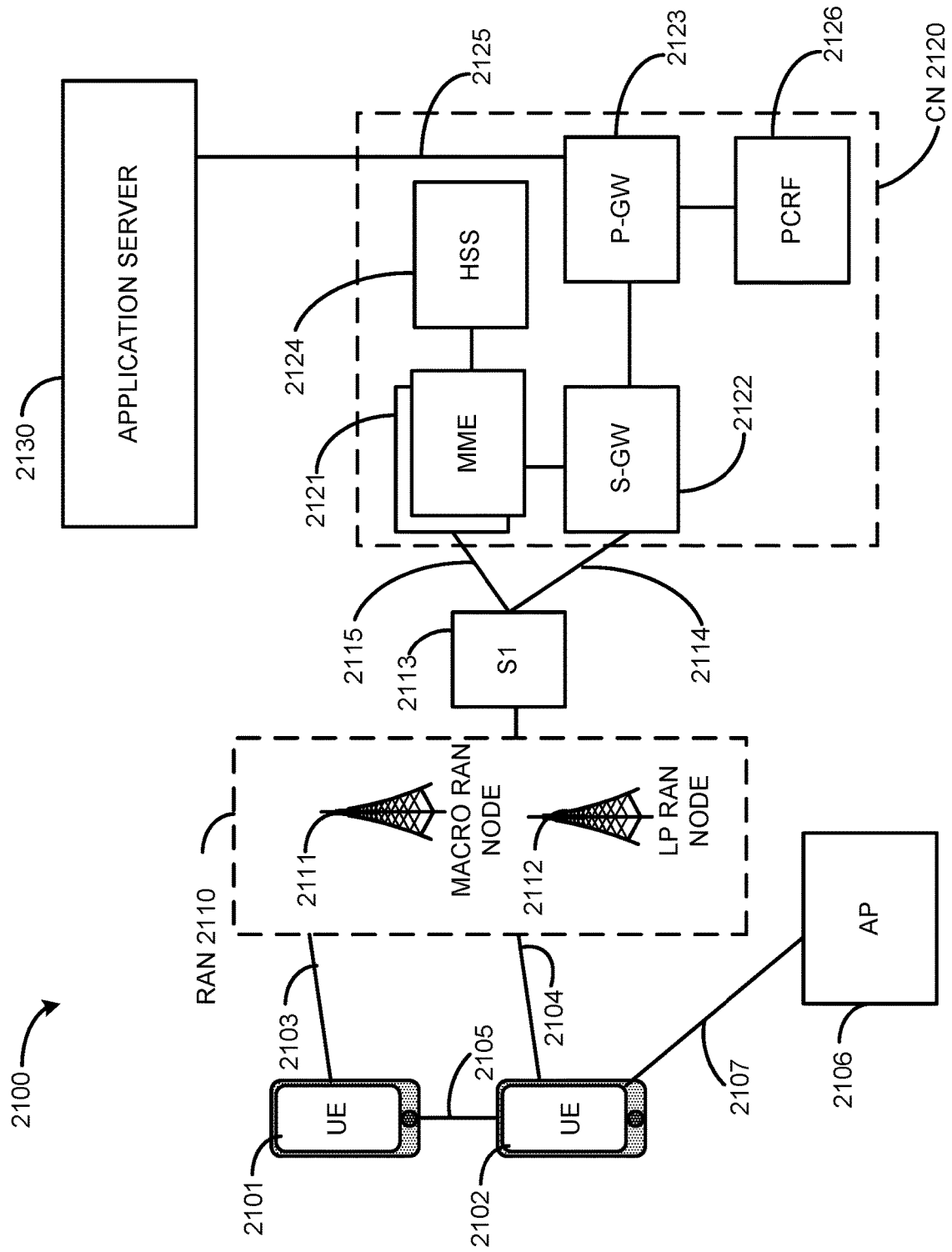
FIG. 21 illustrates an architecture of a system of a network in accordance with some embodiments.

FIG. 21 illustrates an architecture of a system 2100 of a network in accordance with some embodiments. The system 2100 is shown to include a user equipment (UE) 2101 and a UE 2102. The UEs 2101 and 2102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 2101 and 2102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 2101 and 2102 may be configured to connect, e.g., communicatively couple, with a radio access network (RAN) 2110. The RAN 2110 may be, for example, an Evolved Universal Mobile Telecommunications System (UMTS) Terrestrial Radio Access Network (E-UTRAN), a NextGen RAN (NG RAN), or some other type of RAN. The UEs 2101 and 2102 utilize connections 2103 and 2104, respectively, each of which comprises a physical communications interface or layer (discussed in further detail below); in this example, the connections 2103 and 2104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 2101 and 2102 may further directly exchange communication data via a ProSe interface 2105. The ProSe interface 2105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 2102 is shown to be configured to access an access point (AP) 2106 via connection 2107. The connection 2107 can comprise a local wireless connection, such as a connection consistent with any IEEE 802.11 protocol, wherein the AP 2106 would comprise a wireless fidelity (WiFi®) router. In this example, the AP 2106 may be connected to the Internet without connecting to the core network of the wireless system (described in further detail below).

The RAN 2110 can include one or more access nodes that enable the connections 2103 and 2104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 2110 may include one or more RAN nodes for providing macrocells, e.g., macro RAN node 2111, and one or more RAN nodes for providing femtocells or picocells (e.g., cells having smaller coverage areas, smaller user capacity, or higher bandwidth compared to macrocells), e.g., low power (LP) RAN node 2112.

Any of the RAN nodes 2111 and 2112 can terminate the air interface protocol and can be the first point of contact for the UEs 2101 and 2102. In some embodiments, any of the RAN nodes 2111 and 2112 can fulfill various logical functions for the RAN 2110 including, but not limited to, radio network controller (RNC) functions such as radio bearer management, uplink and downlink dynamic radio resource management and data packet scheduling, and mobility management.

In accordance with some embodiments, the UEs 2101 and 2102 can be configured to communicate using Orthogonal Frequency-Division Multiplexing (OFDM) communication signals with each other or with any of the RAN nodes 2111 and 2112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 2111 and 2112 to the UEs 2101 and 2102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 2101 and 2102. The physical downlink control channel (PDCCH) may carry information about the transport format and resource allocations related to the PDSCH channel, among other things. It may also inform the UEs 2101 and 2102 about the transport format, resource allocation, and H-ARQ (Hybrid Automatic Repeat Request) information related to the uplink shared channel. Typically, downlink scheduling (assigning control and shared channel resource blocks to the UE 2102 within a cell) may be performed at any of the RAN nodes 2111 and 2112 based on channel quality information fed back from any of the UEs 2101 and 2102. The downlink resource assignment information may be sent on the PDCCH used for (e.g., assigned to) each of the UEs 2101 and 2102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 2110 is shown to be communicatively coupled to a core network (CN) 2120—via an S1 interface 2113. In embodiments, the CN 2120 may be an evolved packet core (EPC) network, a NextGen Packet Core (NPC) network, or some other type of CN. In this embodiment the S1 interface 2113 is split into two parts: the S1-U interface 2114, which carries traffic data between the RAN nodes 2111 and 2112 and a serving gateway (S-GW) 2122, and an S1-mobility management entity (MME) interface 2115, which is a signaling interface between the RAN nodes 2111 and 2112 and MMEs 2121.

In this embodiment, the CN 2120 comprises the MMEs 2121, the S-GW 2122, a Packet Data Network (PDN) Gateway (P-GW) 2123, and a home subscriber server (HSS) 2124. The MMEs 2121 may be similar in function to the control plane of legacy Serving General Packet Radio Service (GPRS) Support Nodes (SGSN). The MMEs 2121 may manage mobility aspects in access such as gateway selection and tracking area list management. The HSS 2124 may comprise a database for network users, including subscription-related information to support the network entities' handling of communication sessions. The CN 2120 may comprise one or several HSSs 2124, depending on the number of mobile subscribers, on the capacity of the equipment, on the organization of the network, etc. For example, the HSS 2124 can provide support for routing/roaming, authentication, authorization, naming/addressing resolution, location dependencies, etc.

The S-GW 2122 may terminate the S1 interface 2113 towards the RAN 2110, and routes data packets between the RAN 2110 and the CN 2120. In addition, the S-GW 2122 may be a local mobility anchor point for inter-RAN node handovers and also may provide an anchor for inter-3GPP mobility. Other responsibilities may include lawful intercept, charging, and some policy enforcement.

The P-GW 2123 may terminate an SGi interface toward a PDN. The P-GW 2123 may route data packets between the CN 2120 (e.g., an EPC network) and external networks such as a network including the application server 2130 (alternatively referred to as application function (AF)) via an Internet Protocol (IP) interface 2125. Generally, an application server 2130 may be an element offering applications that use IP bearer resources with the core network (e.g., UMTS Packet Services (PS) domain, LTE PS data services, etc.). In this embodiment, the P-GW 2123 is shown to be communicatively coupled to an application server 2130 via an IP communications interface 2125. The application server 2130 can also be configured to support one or more communication services (e.g., Voice-over-Internet Protocol (VoIP) sessions, PTT sessions, group communication sessions, social networking services, etc.) for the UEs 2101 and 2102 via the CN 2120.

The P-GW 2123 may further be a node for policy enforcement and charging data collection. A Policy and Charging Enforcement Function (PCRF) 2126 is the policy and charging control element of the CN 2120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 2126 may be communicatively coupled to the application server 2130 via the P-GW 2123. The application server 2130 may signal the PCRF 2126 to indicate a new service flow and select the appropriate Quality of Service (QoS) and charging parameters. The PCRF 2126 may provision this rule into a Policy and Charging Enforcement Function (PCEF) (not shown) with the appropriate traffic flow template (TFT) and QoS class of identifier (QCI), which commences the QoS and charging as specified by the application server 2130.

Figure 22:
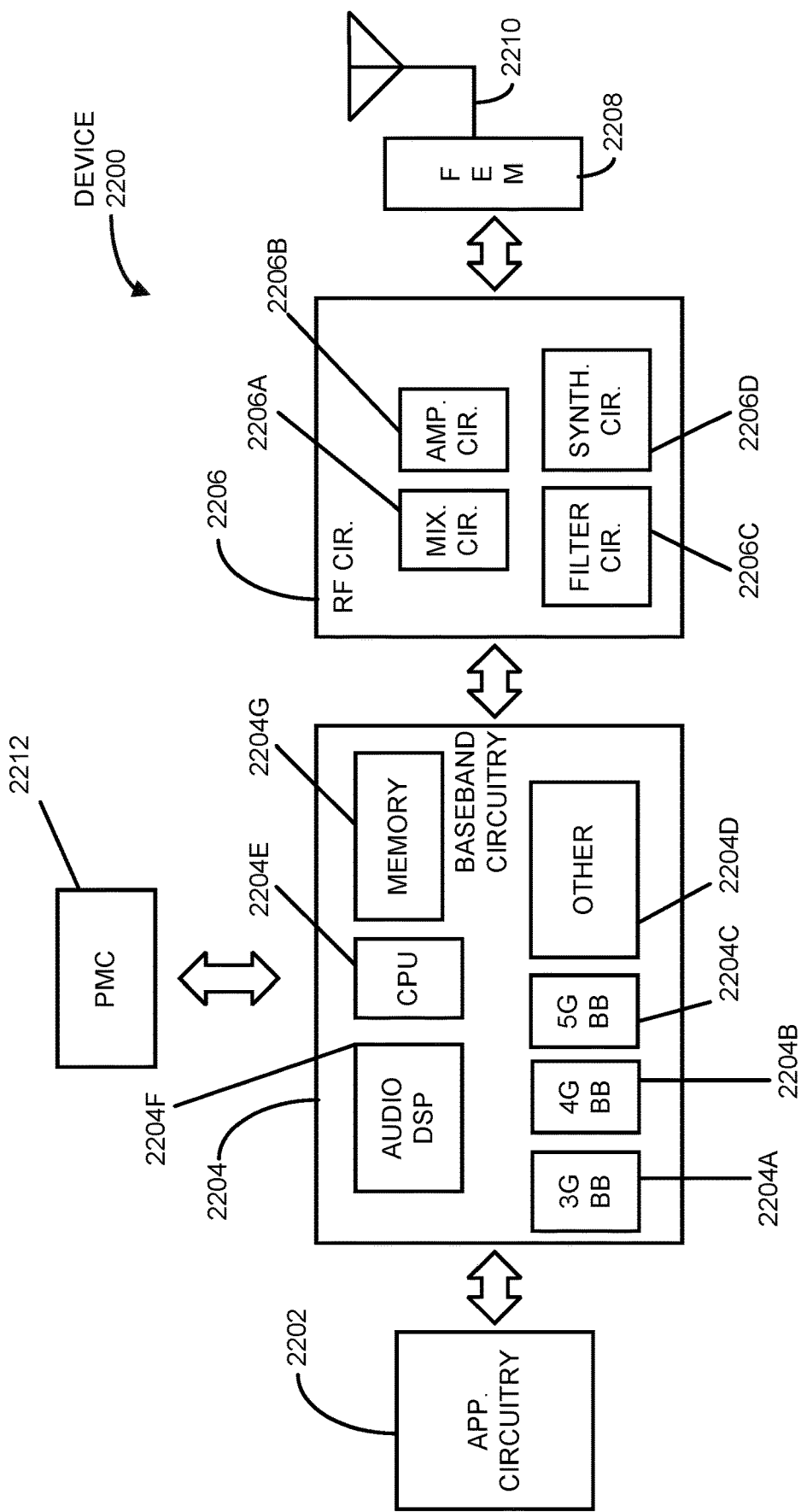
FIG. 22 illustrates example components of a device in accordance with some embodiments.

FIG. 22 illustrates example components of a device 2200 in accordance with some embodiments. In some embodiments, the device 2200 may include application circuitry 2202, baseband circuitry 2204, Radio Frequency (RF) circuitry 2206, front-end module (FEM) circuitry 2208, one or more antennas 2210, and power management circuitry (PMC) 2212 coupled together at least as shown. The components of the illustrated device 2200 may be included in a UE or a RAN node. In some embodiments, the device 2200 may include fewer elements (e.g., a RAN node may not utilize application circuitry 2202, and instead include a processor/controller to process IP data received from an EPC). In some embodiments, the device 2200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 2202 may include one or more application processors. For example, the application circuitry 2202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 2200. In some embodiments, processors of application circuitry 2202 may process IP data packets received from an EPC.

The baseband circuitry 2204 may include circuitry such as, but not limited to, one or more single-core or multi-core processors. The baseband circuitry 2204 may include one or more baseband processors or control logic to process baseband signals received from a receive signal path of the RF circuitry 2206 and to generate baseband signals for a transmit signal path of the RF circuitry 2206. Baseband processing circuitry 2204 may interface with the application circuitry 2202 for generation and processing of the baseband signals and for controlling operations of the RF circuitry 2206. For example, in some embodiments, the baseband circuitry 2204 may include a third generation (3G) baseband processor 2204A, a fourth generation (4G) baseband processor 2204B, a fifth generation (5G) baseband processor 2204C, or other baseband processor(s) 2204D for other existing generations, generations in development or to be developed in the future (e.g., second generation (2G), sixth generation (6G), etc.). The baseband circuitry 2204 (e.g., one or more of baseband processors 2204A-D) may handle various radio control functions that enable communication with one or more radio networks via the RF circuitry 2206. In other embodiments, some or all of the functionality of baseband processors 2204A-D may be included in modules stored in the memory 2204G and executed via a Central Processing Unit (CPU) 2204E. The radio control functions may include, but are not limited to, signal modulation/demodulation, encoding/decoding, radio frequency shifting, etc. In some embodiments, modulation/demodulation circuitry of the baseband circuitry 2204 may include Fast-Fourier Transform (FFT), precoding, or constellation mapping/demapping functionality. In some embodiments, encoding/decoding circuitry of the baseband circuitry 2204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2204 may include one or more audio digital signal processor(s) (DSP) 2204F. The audio DSP(s) 2204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2204 and the application circuitry 2202 may be implemented together such as, for example, on a system on a chip (SOC).

In some embodiments, the baseband circuitry 2204 may provide for communication compatible with one or more radio technologies. For example, in some embodiments, the baseband circuitry 2204 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 2204 is configured to support radio communications of more than one wireless protocol may be referred to as multi-mode baseband circuitry.

RF circuitry 2206 may enable communication with wireless networks using modulated electromagnetic radiation through a non-solid medium. In various embodiments, the RF circuitry 2206 may include switches, filters, amplifiers, etc. to facilitate the communication with the wireless network. The RF circuitry 2206 may include a receive signal path which may include circuitry to down-convert RF signals received from the FEM circuitry 2208 and provide baseband signals to the baseband circuitry 2204. RF circuitry 2206 may also include a transmit signal path which may include circuitry to up-convert baseband signals provided by the baseband circuitry 2204 and provide RF output signals to the FEM circuitry 2208 for transmission.

In some embodiments, the receive signal path of the RF circuitry 2206 may include mixer circuitry 2206A, amplifier circuitry 2206B and filter circuitry 2206C. In some embodiments, the transmit signal path of the RF circuitry 2206 may include filter circuitry 2206C and mixer circuitry 2206A. RF circuitry 2206 may also include synthesizer circuitry 2206D for synthesizing a frequency for use by the mixer circuitry 2206A of the receive signal path and the transmit signal path. In some embodiments, the mixer circuitry 2206A of the receive signal path may be configured to down-convert RF signals received from the FEM circuitry 2208 based on the synthesized frequency provided by synthesizer circuitry 2206D. The amplifier circuitry 2206B may be configured to amplify the down-converted signals and the filter circuitry 2206C may be a low-pass filter (LPF) or band-pass filter (BPF) configured to remove unwanted signals from the down-converted signals to generate output baseband signals. Output baseband signals may be provided to the baseband circuitry 2204 for further processing. In some embodiments, the output baseband signals may be zero-frequency baseband signals, although this is not a requirement. In some embodiments, the mixer circuitry 2206A of the receive signal path may comprise passive mixers, although the scope of the embodiments is not limited in this respect.

In some embodiments, the mixer circuitry 2206A of the transmit signal path may be configured to up-convert input baseband signals based on the synthesized frequency provided by the synthesizer circuitry 2206D to generate RF output signals for the FEM circuitry 2208. The baseband signals may be provided by the baseband circuitry 2204 and may be filtered by the filter circuitry 2206C.

In some embodiments, the mixer circuitry 2206A of the receive signal path and the mixer circuitry 2206A of the transmit signal path may include two or more mixers and may be arranged for quadrature downconversion and upconversion, respectively. In some embodiments, the mixer circuitry 2206A of the receive signal path and the mixer circuitry 2206A of the transmit signal path may include two or more mixers and may be arranged for image rejection (e.g., Hartley image rejection). In some embodiments, the mixer circuitry 2206A of the receive signal path and the mixer circuitry 2206A may be arranged for direct downconversion and direct upconversion, respectively. In some embodiments, the mixer circuitry 2206A of the receive signal path and the mixer circuitry 2206A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2206 may include analog-to-digital converter (ADC) and digital-to-analog converter (DAC) circuitry and the baseband circuitry 2204 may include a digital baseband interface to communicate with the RF circuitry 2206.

In some dual-mode embodiments, a separate radio IC circuitry may be provided for processing signals for each spectrum, although the scope of the embodiments is not limited in this respect.

In some embodiments, the synthesizer circuitry 2206D may be a fractional-N synthesizer or a fractional N/N+1 synthesizer, although the scope of the embodiments is not limited in this respect as other types of frequency synthesizers may be suitable. For example, synthesizer circuitry 2206D may be a delta-sigma synthesizer, a frequency multiplier, or a synthesizer comprising a phase-locked loop with a frequency divider.

The synthesizer circuitry 2206D may be configured to synthesize an output frequency for use by the mixer circuitry 2206A of the RF circuitry 2206 based on a frequency input and a divider control input. In some embodiments, the synthesizer circuitry 2206D may be a fractional N/N+1 synthesizer.

In some embodiments, frequency input may be provided by a voltage controlled oscillator (VCO), although that is not a requirement. Divider control input may be provided by either the baseband circuitry 2204 or the application circuitry 2202 (such as an applications processor) depending on the desired output frequency. In some embodiments, a divider control input (e.g., N) may be determined from a look-up table based on a channel indicated by the application circuitry 2202.

Synthesizer circuitry 2206D of the RF circuitry 2206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 2206D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2206 may include an IQ/polar converter.

FEM circuitry 2208 may include a receive signal path which may include circuitry configured to operate on RF signals received from one or more antennas 2210, amplify the received signals and provide the amplified versions of the received signals to the RF circuitry 2206 for further processing. The FEM circuitry 2208 may also include a transmit signal path which may include circuitry configured to amplify signals for transmission provided by the RF circuitry 2206 for transmission by one or more of the one or more antennas 2210. In various embodiments, the amplification through the transmit or receive signal paths may be done solely in the RF circuitry 2206, solely in the FEM circuitry 2208, or in both the RF circuitry 2206 and the FEM circuitry 2208.

In some embodiments, the FEM circuitry 2208 may include a TX/RX switch to switch between transmit mode and receive mode operation. The FEM circuitry 2208 may include a receive signal path and a transmit signal path. The receive signal path of the FEM circuitry 2208 may include an LNA to amplify received RF signals and provide the amplified received RF signals as an output (e.g., to the RF circuitry 2206). The transmit signal path of the FEM circuitry 2208 may include a power amplifier (PA) to amplify input RF signals (e.g., provided by the RF circuitry 2206), and one or more filters to generate RF signals for subsequent transmission (e.g., by one or more of the one or more antennas 2210).

In some embodiments, the PMC 2212 may manage power provided to the baseband circuitry 2204. In particular, the PMC 2212 may control power-source selection, voltage scaling, battery charging, or DC-to-DC conversion. The PMC 2212 may often be included when the device 2200 is capable of being powered by a battery, for example, when the device 2200 is included in a UE. The PMC 2212 may increase the power conversion efficiency while providing desirable implementation size and heat dissipation characteristics.

FIG. 22 shows the PMC 2212 coupled only with the baseband circuitry 2204. However, in other embodiments, the PMC 2212 may be additionally or alternatively coupled with, and perform similar power management operations for, other components such as, but not limited to, the application circuitry 2202, the RF circuitry 2206, or the FEM circuitry 2208.

In some embodiments, the PMC 2212 may control, or otherwise be part of, various power saving mechanisms of the device 2200. For example, if the device 2200 is in an RRC_Connected state, where it is still connected to the RAN node as it expects to receive traffic shortly, then it may enter a state known as Discontinuous Reception Mode (DRX) after a period of inactivity. During this state, the device 2200 may power down for brief intervals of time and thus save power.

If there is no data traffic activity for an extended period of time, then the device 2200 may transition off to an RRC_Idle state, where it disconnects from the network and does not perform operations such as channel quality feedback, handover, etc. The device 2200 goes into a very low power state and it performs paging where again it periodically wakes up to listen to the network and then powers down again. The device 2200 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 2202 and processors of the baseband circuitry 2204 may be used to execute elements of one or more instances of a protocol stack. For example, processors of the baseband circuitry 2204, alone or in combination, may be used to execute Layer 3, Layer 2, or Layer 1 functionality, while processors of the application circuitry 2202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 23:
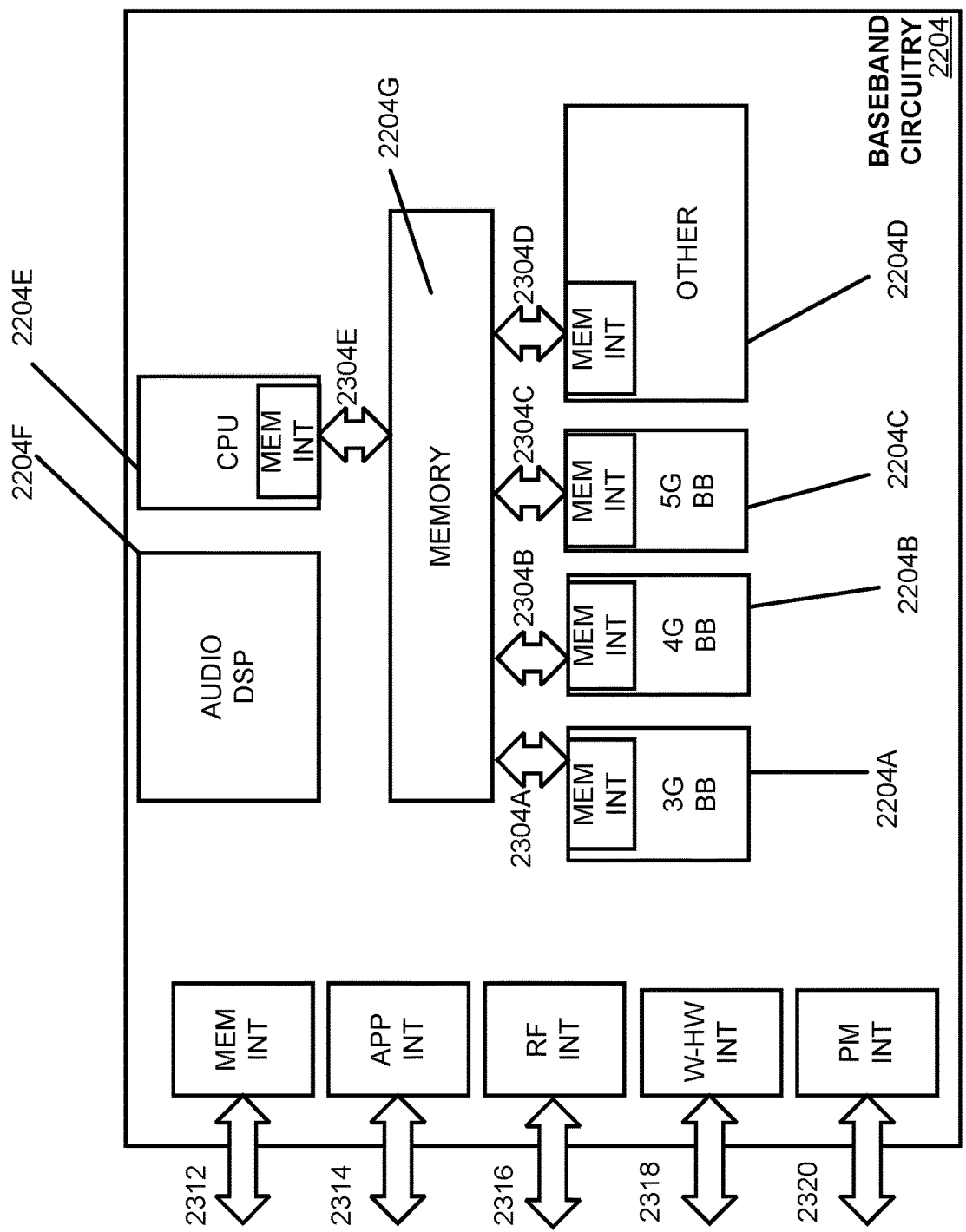
FIG. 23 illustrates example interfaces of baseband circuitry in accordance with some embodiments.

FIG. 23 illustrates example interfaces of baseband circuitry in accordance with some embodiments. As discussed above, the baseband circuitry 2204 of FIG. 22 may comprise processors 2204A-2204E and a memory 2204G utilized by said processors. Each of the processors 2204A-2204E may include a memory interface, 2304A-2304E, respectively, to send/receive data to/from the memory 2204G.

The baseband circuitry 2204 may further include one or more interfaces to communicatively couple to other circuitries/devices, such as a memory interface 2312 (e.g., an interface to send/receive data to/from memory external to the baseband circuitry 2204), an application circuitry interface 2314 (e.g., an interface to send/receive data to/from the application circuitry 2202 of FIG. 22), an RF circuitry interface 2316 (e.g., an interface to send/receive data to/from RF circuitry 2206 of FIG. 22), a wireless hardware connectivity interface 2318 (e.g., an interface to send/receive data to/from Near Field Communication (NFC) components, Bluetooth® components (e.g., Bluetooth® Low Energy), Wi-Fi® components, and other communication components), and a power management interface 2320 (e.g., an interface to send/receive power or control signals to/from the PMC 2212.

Figure 24:
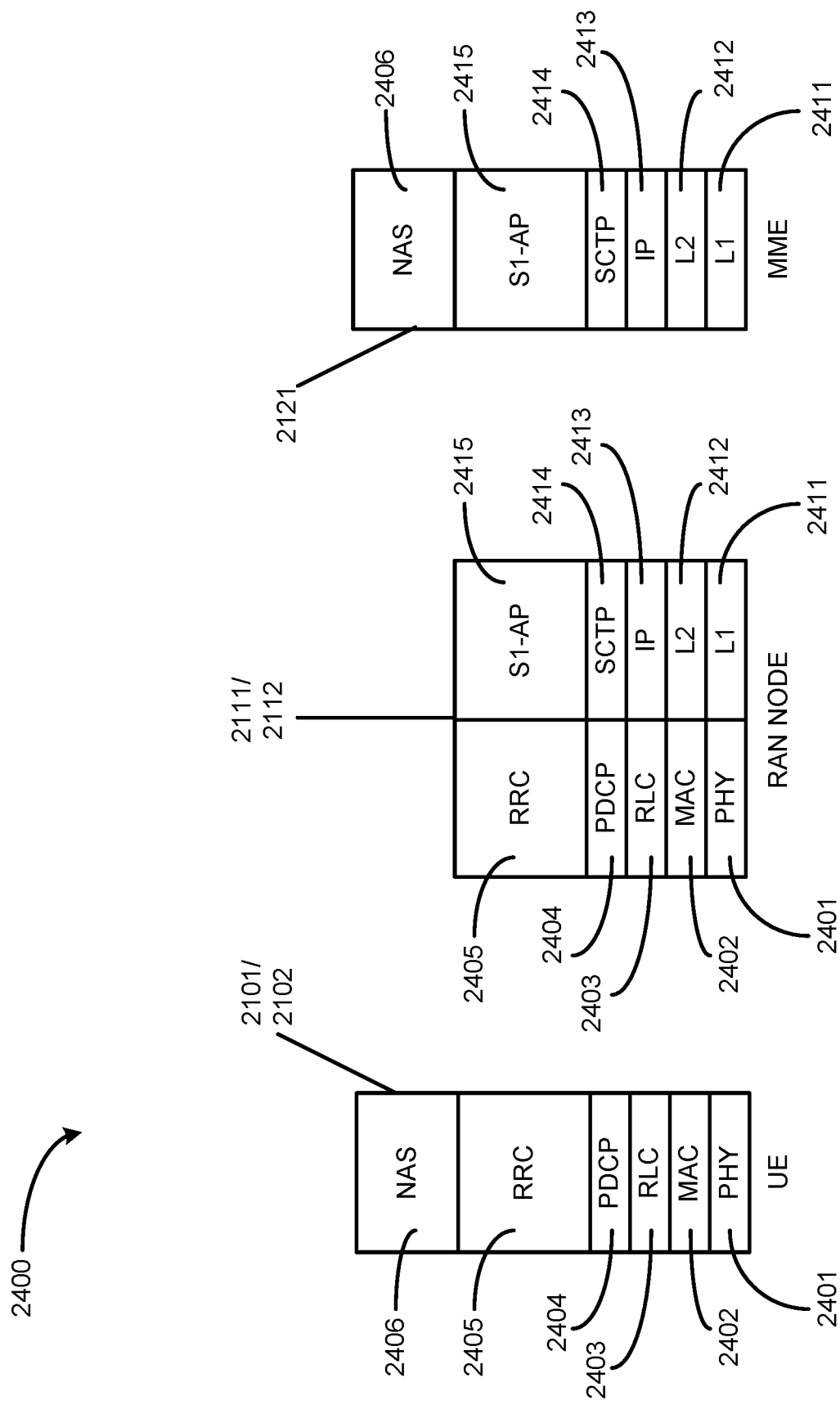
FIG. 24 is an illustration of a control plane protocol stack in accordance with some embodiments.

FIG. 24 is an illustration of a control plane protocol stack in accordance with some embodiments. In this embodiment, a control plane 2400 is shown as a communications protocol stack between the UE 2101 (or alternatively, the UE 2102), the RAN node 2111 (or alternatively, the RAN node 2112), and the MME 2121.

A PHY layer 2401 may transmit or receive information used by the MAC layer 2402 over one or more air interfaces. The PHY layer 2401 may further perform link adaptation or adaptive modulation and coding (AMC), power control, cell search (e.g., for initial synchronization and handover purposes), and other measurements used by higher layers, such as an RRC layer 2405. The PHY layer 2401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 2402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

An RLC layer 2403 may operate in a plurality of modes of operation, including: Transparent Mode (TM), Unacknowledged Mode (UM), and Acknowledged Mode (AM). The RLC layer 2403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 2403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 2404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 2405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 2101 and the RAN node 2111 may utilize a Uu interface (e.g., an LTE-Uu interface) to exchange control plane data via a protocol stack comprising the PHY layer 2401, the MAC layer 2402, the RLC layer 2403, the PDCP layer 2404, and the RRC layer 2405.

In the embodiment shown, the non-access stratum (NAS) protocols 2406 form the highest stratum of the control plane between the UE 2101 and the MME 2121. The NAS protocols 2406 support the mobility of the UE 2101 and the session management procedures to establish and maintain IP connectivity between the UE 2101 and the P-GW 2123.

The S1 Application Protocol (S1-AP) layer 2415 may support the functions of the S1 interface and comprise Elementary Procedures (EPs). An EP is a unit of interaction between the RAN node 2111 and the CN 2120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) 2414 may ensure reliable delivery of signaling messages between the RAN node 2111 and the MME 2121 based, in part, on the IP protocol, supported by an IP layer 2413. An L2 layer 2412 and an L1 layer 2411 may refer to communication links (e.g., wired or wireless) used by the RAN node and the MME to exchange information.

The RAN node 2111 and the MME 2121 may utilize an S1-MME interface to exchange control plane data via a protocol stack comprising the L1 layer 2411, the L2 layer 2412, the IP layer 2413, the SCTP layer 2414, and the S1-AP layer 2415.

Figure 25:
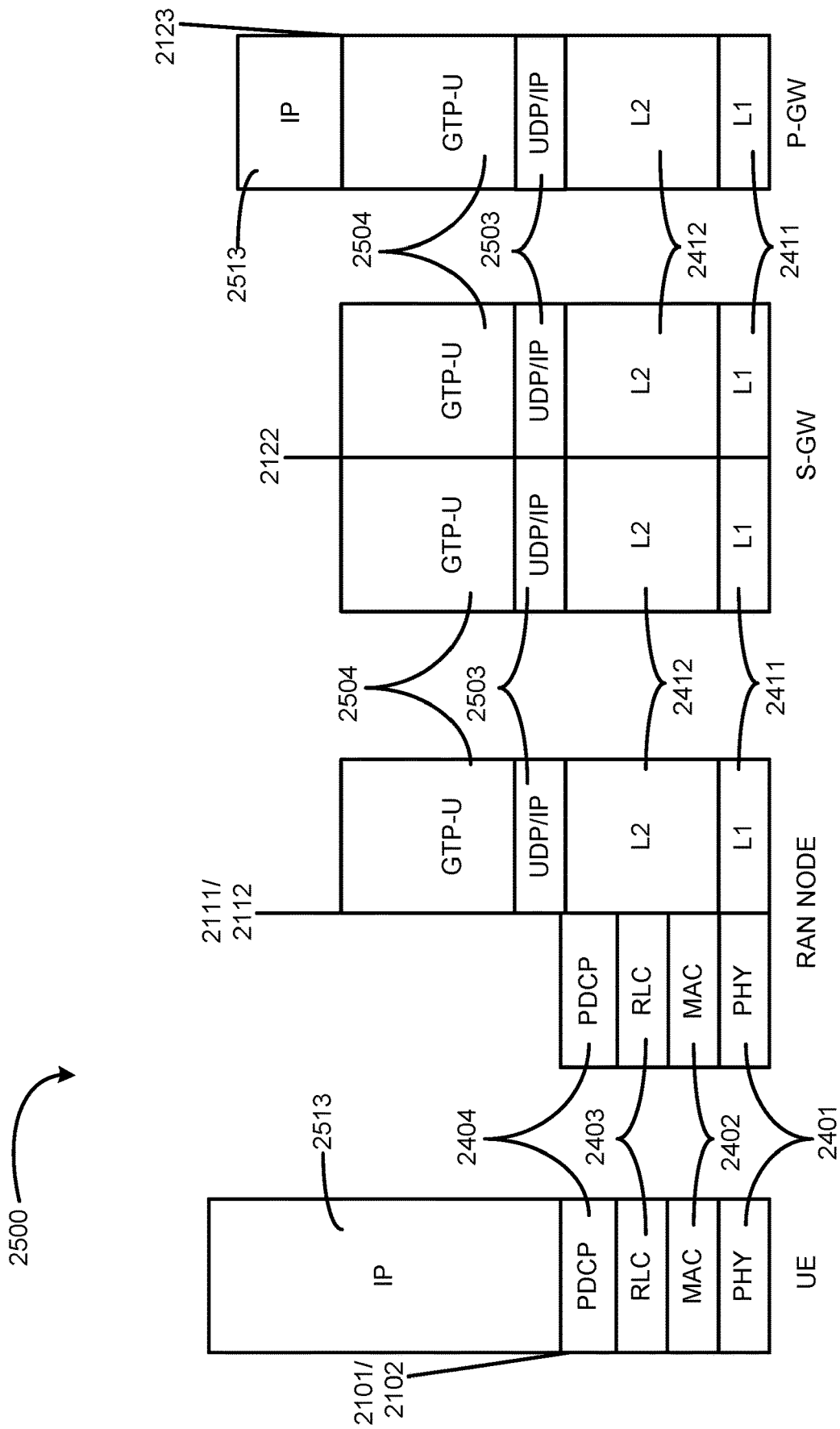
FIG. 25 is an illustration of a user plane protocol stack in accordance with some embodiments.

FIG. 25 is an illustration of a user plane protocol stack in accordance with some embodiments. In this embodiment, a user plane 2500 is shown as a communications protocol stack between the UE 2101 (or alternatively, the UE 2102), the RAN node 2111 (or alternatively, the RAN node 2112), the S-GW 2122, and the P-GW 2123. The user plane 2500 may utilize at least some of the same protocol layers as the control plane 2400. For example, the UE 2101 and the RAN node 2111 may utilize a Uu interface (e.g., an LTE-Uu interface) to exchange user plane data via a protocol stack comprising the PHY layer 2401, the MAC layer 2402, the RLC layer 2403, the PDCP layer 2404.

The General Packet Radio Service (GPRS) Tunneling Protocol for the user plane (GTP-U) layer 2504 may be used for carrying user data within the GPRS core network and between the radio access network and the core network. The user data transported can be packets in any of IPv4, IPv6, or PPP formats, for example. The UDP and IP security (UDP/IP) layer 2503 may provide checksums for data integrity, port numbers for addressing different functions at the source and destination, and encryption and authentication on the selected data flows. The RAN node 2111 and the S-GW 2122 may utilize an S1-U interface to exchange user plane data via a protocol stack comprising the L1 layer 2411, the L2 layer 2412, the UDP/IP layer 2503, and the GTP-U layer 2504. The S-GW 2122 and the P-GW 2123 may utilize an S5/S8a interface to exchange user plane data via a protocol stack comprising the L1 layer 2411, the L2 layer 2412, the UDP/IP layer 2503, and the GTP-U layer 2504. As discussed above with respect to FIG. 24, NAS protocols support the mobility of the UE 2101 and the session management procedures to establish and maintain IP connectivity between the UE 2101 and the P-GW 2123.

Figure 26:
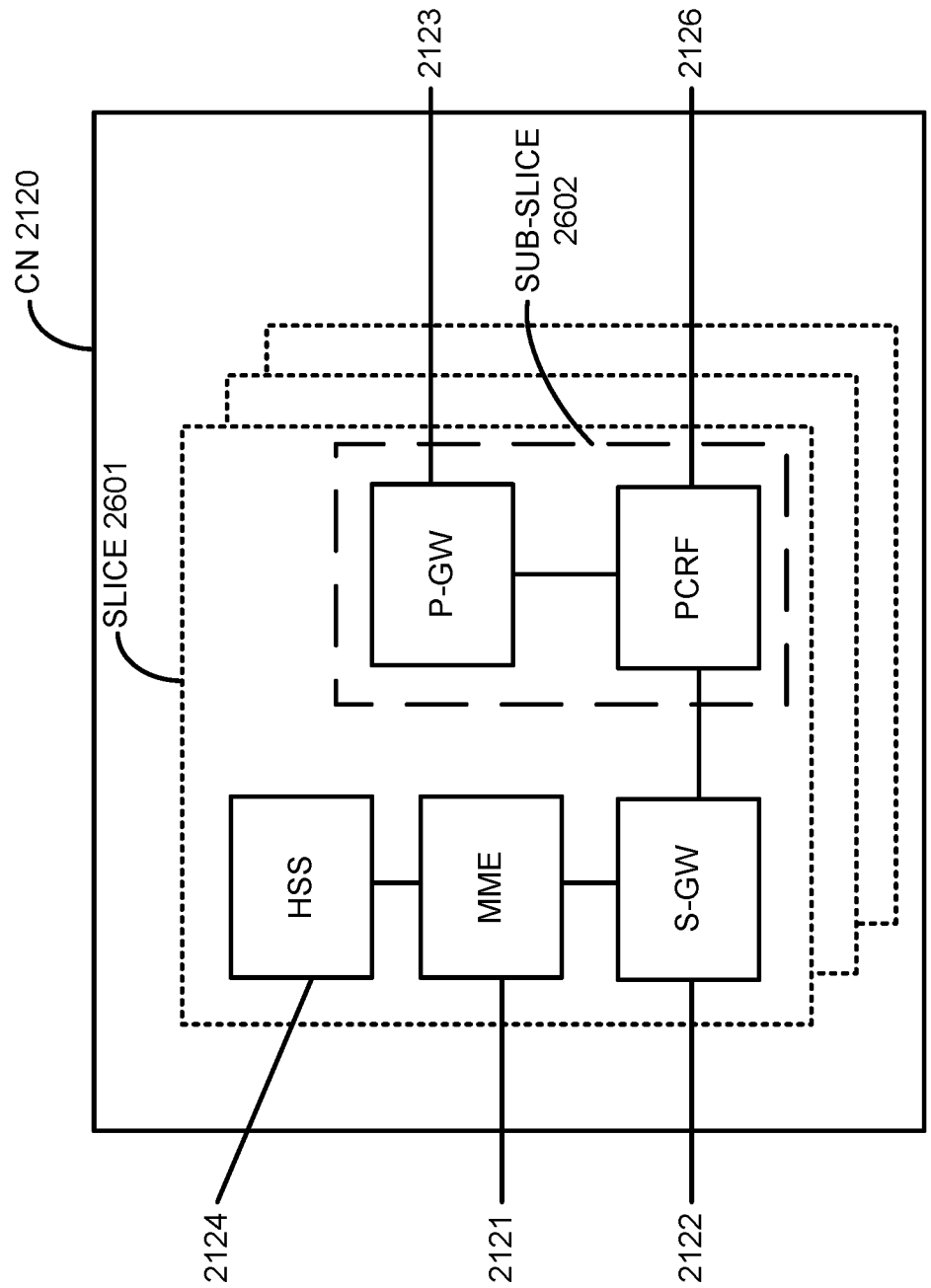
FIG. 26 illustrates components of a core network in accordance with some embodiments.

FIG. 26 illustrates components of a core network in accordance with some embodiments. The components of the CN 2120 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 2120 may be referred to as a network slice 2601. A logical instantiation of a portion of the CN 2120 may be referred to as a network sub-slice 2602 (e.g., the network sub-slice 2602 is shown to include the PGW 2123 and the PCRF 2126).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 27:
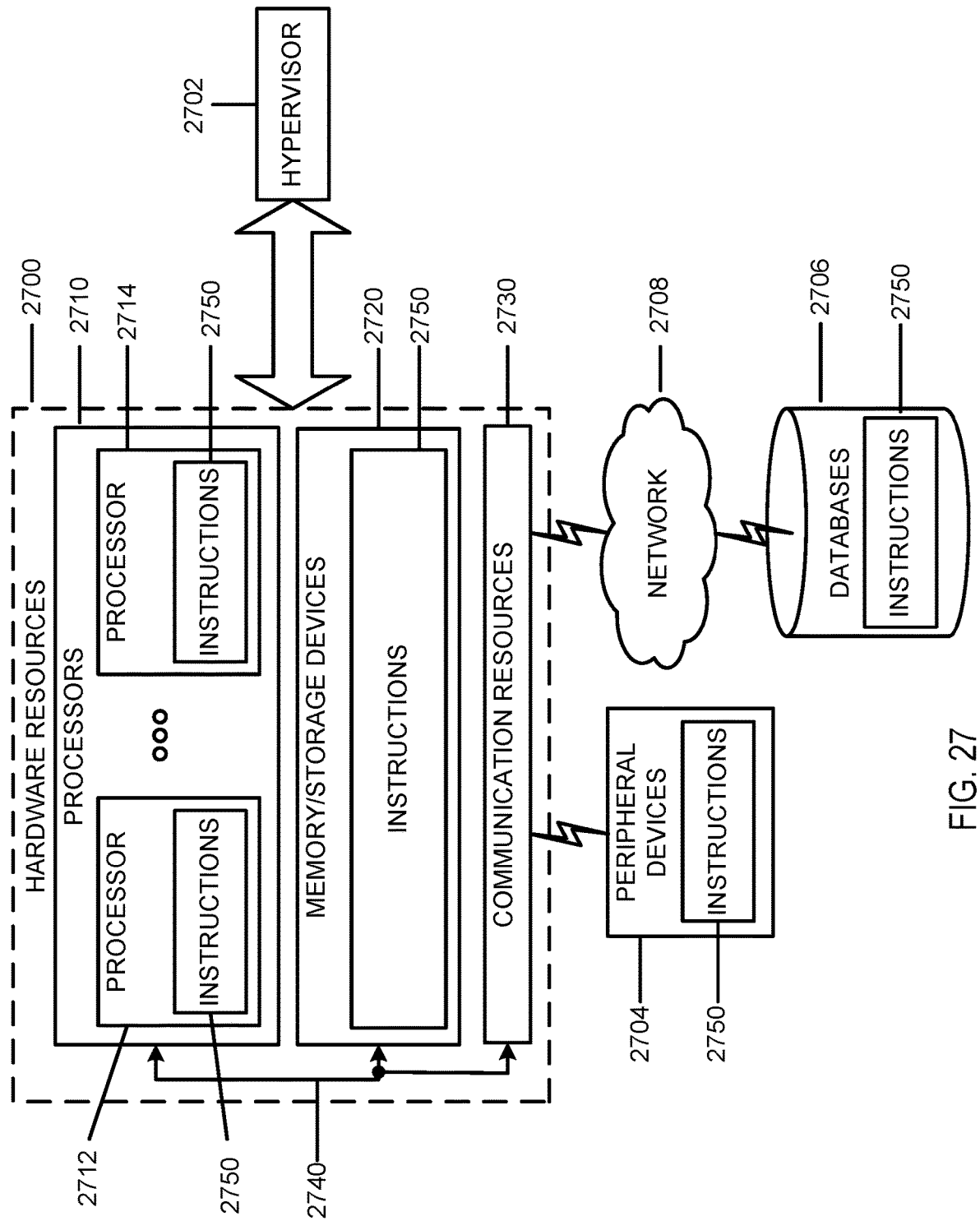
FIG. 27 is a block diagram illustrating components, according to some example embodiments, able to read instructions from a machine-readable or computer-readable medium and perform any one or more of the methodologies discussed herein.

FIG. 27 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 27 shows a diagrammatic representation of hardware resources 2700 including one or more processors (or processor cores) 2710, one or more memory/storage devices 2720, and one or more communication resources 2730, each of which may be communicatively coupled via a bus 2740. For embodiments where node virtualization (e.g., NFV) is utilized, a hypervisor 2702 may be executed to provide an execution environment for one or more network slices/sub-slices to utilize the hardware resources 2700.

The processors 2710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2712 and a processor 2714.

The memory/storage devices 2720 may include main memory, disk storage, or any suitable combination thereof. The memory/storage devices 2720 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 2730 may include interconnection or network interface components or other suitable devices to communicate with one or more peripheral devices 2704 or one or more databases 2706 via a network 2708. For example, the communication resources 2730 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2750 may comprise software, a program, an application, an applet, an app, or other executable code for causing at least any of the processors 2710 to perform any one or more of the methodologies discussed herein. The instructions 2750 may reside, completely or partially, within at least one of the processors 2710 (e.g., within the processor's cache memory), the memory/storage devices 2720, or any suitable combination thereof. Furthermore, any portion of the instructions 2750 may be transferred to the hardware resources 2700 from any combination of the peripheral devices 2704 or the databases 2706. Accordingly, the memory of processors 2710, the memory/storage devices 2720, the peripheral devices 2704, and the databases 2706 are examples of computer-readable and machine-readable media.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may include other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

E. Additional Examples

Example 1 is an apparatus for a first network entity to handle group based context and security of a group of communication devices in a communication network. The apparatus includes: a memory interface and a processor. The memory interface to send or receive, to or from a memory device, information corresponding to a user plane routing profile and a group security context. The processor to: create a group context corresponding to the group of communication devices for a service, wherein the group context comprising the user plane routing profile and the group security context; based on a service subscription of the group of communication devices, determine a network slice for the group of communication devices to use for the service; and generate a message to communicate the group context to a second network entity for storing and using for authentication of one or more of the communication devices returning from an idle or inactive mode to a connected mode for packet transmission through the communication network.

Example 2 is the apparatus of Example 1, wherein the first network entity comprises an access and mobility management function, the second network entity comprises a radio access network (RAN) node, and the group of communication devices comprise Internet of Things (IoT) user equipments (UEs), wherein the user plane routing profile comprises at least one of the following information: a packet forwarding and receiving path between the RAN node and a data gateway (DGW) in a user plane function (UPF) of a core network.

Example 3 is the apparatus of Example 2, wherein an internet protocol (IP) address/port of the DGW in the UPF, or a serving gateway (SGW) address and tunnel end-point identifier (TEID), are determined by a session management function (SMF) and configured at one or more DGWs in the UPF.

Example 4 is the apparatus of Example 3, wherein the processor identifies the network slice by a network slice identifier (ID), an IPv6 prefix, or an ID associated with an IPv4 address pool, and wherein the first network entity allocates an IPv4 address within an IPv4 address pool, an IPv6 prefix, or a network slice ID to an IoT UE of the group based on the IoT UE's capability.

Example 5 is the apparatus of Example 4, wherein if the processor allocates an IPv4 address to the IoT UE, the IoT UE uses the allocated IPv4 address as the source IP address in the IP packets to be transmitted, and wherein if the processor allocates an IPv6-prefix address to the IoT UE, the IoT UE auto-configures its IPv6 address accordingly and uses the IPv6 address as the source IP address in the IP packets to be transmitted.

Example 6 is the apparatus of Example 4, wherein when the IoT UE capable of non-IP packets transmission over a user plane, the IoT UE marks the Non-IP packets with the network slice ID or group identifier, which is used to identify the corresponding stored group context, when transmitting the user plane packets.

Example 7 is the apparatus of Example 5 or Example 6, wherein the IoT UE sends IP packets or non-IP packets towards the second network entity, and the second network entity identifies the IP packets based on the source IP address or non-IP packets based on marked network slice ID or group identifier, and forwards the IP packets or Non-IP packets based on the stored routing profile in the group context accordingly.

Example 8 is the apparatus of Example 1, wherein the group security context comprises pair-wised symmetric keys and relevant security parameters.

Example 9 is the apparatus of any of Examples 1-6, wherein the first network entity generates the group context for the service in response to a first device registering to the network when there is no group context stored at the first network entity.

Example 10 is the apparatus of any of Examples 1-6, wherein the first network entity generates the group context for the service in response to an application server sending a group service request to the network and the network has authorized and authenticated the application server for the group service.

Example 11 is the apparatus of Example 3, wherein the processor of the first network entity is further configured to: process a group enrollment request from an IoT UE, wherein the group enrollment request comprises a first random nonce (N1) of a bit length N and a unique group identifier corresponding to a group to which the IoT UE requests enrollment; determine whether the first network entity already includes a stored security context for the unique group identifier; and in response to a determination that the first network entity does not include the stored security context, generate an access and mobility management function (AMF) group credentials creation request message to request creation of group credentials.

Example 12 is the apparatus of Example 11, wherein the memory interface is further to send or receive, to or from the memory device, AMF context information comprising an AMF symmetric key derived from a group master key held by an authentication server function (AUSF) and/or unified data management (UDM).

Example 13 is the apparatus of Example 12, wherein the processor of the first network entity performs a next generation NodeB (gNB) group context creation wherein a gNB group context includes at least a gNB group key, a gNB identifier, and a counter used for key refreshing and versioning of the gNB group key.

Example 14 is the apparatus of Example 13, wherein the processer is further configured to: generate a radio access network or access network ((R)AN) group context establishment request message to deliver the gNB group key to the gNB, wherein the (R)AN group context establishment request message is integrity and confidentiality protected using an integrity key and a confidentiality key; and process a group context establishment response message from the gNB.

Example 15 is the apparatus of Example 14, wherein the processor of the first network entity is further configured to:

generate a second random nonce N2 of the bit length N; and generate an AMF IoT-UE group enrollment request to the gNB comprising the first random nonce N1, the second random nonce N2, the unique group identifier, and a UE identifier.

Example 16 is the apparatus of any of Examples 1-6, wherein the processor of the first network entity is further configured to: process an N2 request message from a third network entity, the N2 request message including the unique group identifier corresponding to an internet of things (IoT) user equipment (UE) for handover from the second network entity to the third network entity; in response to the N2 request message, trigger a group enrollment procedure for the IoT UE including context generation and/or updates and IoT-UE token generation; modify a control plane context and a user plane context for the IoT UE; and determine whether a session management function (SMF) is to change with for the handover.

Example 17 is the apparatus of Example 16, wherein the processor of the first network entity is further configured to: generate an SMF group(s) session allocation request to the SMF for user plane function (UPF) session establishment; and generate an N2 response message to the third network entity, wherein the N2 response message include information elements for AMF IoT group enrollment.

Example 18 is the apparatus of any of Examples 1-6, wherein the processor of the first network entity is further configured to: process a handover message from the second network entity, wherein the handover message includes at least one of the following: the unique group identifier corresponding to an internet of things (IoT) user equipment (UE) for handover from the second network entity to a target network entity, an identifier of the target network entity, and a location of IoT UE; select a session management function (SMF) and a user plane function (UPF) for the handover; perform a group enrollment for the IoT UE, the group enrollment comprising: generate an IoT UE token; and generate a handover request message towards the target network entity, wherein the handover request message includes information elements in RAN group context establishment message and AMF IoT-UE group enrollment request message; and in response to a handover response message from the target network entity, generate a handover command to the second network entity, wherein the handover command include IoT UE token information that is protected by a radio resource control (RRC) encryption key of the target network entity.

Example 19 is a computer-readable storage medium having computer-readable instructions stored thereon, the computer-readable instructions to, when executed, instruct a processor of an authentication server function (AUSF) to provide group security control in a mobile network, the computer-readable instructions to: validate an internet of things (IoT) device with a first security key for integrity (KNASint) and a second security key for confidentiality (KNASenc); send a first message to a group authority (GA) for managing group enrollment for the IoT device in respond to a second message received from the IoT device, wherein the first message includes a first token (TK1) for the IoT device to deliver a third secret key (k) together with session information including nonce, user equipment (UE) security capabilities, and identifiers, and wherein the GA uses a second token (TK2) to deliver the third secret key (k) and a seed number together with the session information.

Example 20 is the computer-readable storage medium of Example 19, wherein for the first token (TK1), the third security key (k) is encrypted by the second security key for confidentiality (KNASenc) to protect confidentiality and the integrity of the session information is protected by the first security key for integrity (KNASint).

Example 21 is the computer-readable storage medium of Example 19, wherein for the second token, the third security key (k) and the seed number are encrypted by a fourth security key (KGAenc) to protect confidentiality and the integrity of the session information is protected by a fifth security key (KGAint), wherein the fourth security key and the fifth security key are generated by the AUSF as a trust anchor between the IoT device and the GA.

Example 22 is the computer-readable storage medium of Example 19, wherein when the second message is received by the AUSF, the computer-readable instructions are further to: validate the second message with the first security key for integrity (KNASint) upon determination that the validation is passed, generate a second fresh nonce (N2), the random seed number, and a random ephemeral key as the first security key that enables mutual trust between the IoT device and the GA.

Example 23 is the computer-readable storage medium of Example 19, wherein the first message is in response to the second message sent by the IoT device if the AUSF validates the IoT device successfully, wherein the second message may include the following information: a first tag value (TAG1) for the second message authentication, a first fresh random nonce (N1) to prevent replay attack and uniquely identify a new protocol session, security capabilities of the IoT device used for facilitating a crypto algorithm negotiation for message exchanges, a group identifier, and an identity for preventing misbinding attacks.

Example 24 is the computer-readable storage medium of Example 23, wherein to guarantee the integrity of the second message and prevent message modification, the first tag value is calculated with the first security key (KNASint), which is a symmetric integrity key shared between the devices and the AUSF, and wherein the GA evaluates the group membership of the first device and sends a third message for accepting the group enrollment of the first device if the first device's membership is confirmed, the third message includes the first token (TK1) and a third token (TK3), the third token (TK3) encrypted by the first security key (k).

It will be understood by those having skill in the art that many changes may be made to the details of the above-described embodiments without departing from the underlying principles of the invention. The scope of the present invention should, therefore, be determined only by the following claims.

The invention claimed is:

1. An apparatus for a first network entity to handle group based context and security of a group of communication devices in a communication network, the apparatus comprising:
a memory interface to send or receive, to or from a memory device, information corresponding to a user plane routing profile and a group security context; and
a processor to:
create a group context corresponding to the group of communication devices for a service, wherein the group context comprising the user plane routing profile and the group security context;
based on a service subscription of the group of communication devices, determine a network slice for the group of communication devices to use for the service; and generate a message to communicate the group context to a second network entity for storing and using for authentication of one or more of the communication devices returning from an idle or inactive mode to a connected mode for packet transmission through the communication network.

2. The apparatus of claim 1, wherein the first network entity comprises an access and mobility management function, the second network entity comprises a radio access network (RAN) node, and the group of communication devices comprise Internet of Things (IoT) user equipments (UEs), wherein the user plane routing profile comprises at least one of the following information: a packet forwarding and receiving path between the RAN node and a data gateway (DGW) in a user plane function (UPF) of a core network.

3. The apparatus of claim 2, wherein an internet protocol (IP) address/port of the DGW in the UPF, or a serving gateway (SGW) address and tunnel end-point identifier (TEID), are determined by a session management function (S1VIF) and configured at one or more DGWs in the UPF.

4. The apparatus of claim 3, wherein the processor identifies the network slice by a network slice identifier (ID), an IPv6 prefix, or an ID associated with an IPv4 address pool, and wherein the first network entity allocates an IPv4 address within an IPv4 address pool, an IPv6 prefix, or a network slice ID to an IoT UE of the group based on the IoT UE's capability.

5. The apparatus of claim 4, wherein if the processor allocates an IPv4 address to the IoT UE, the IoT UE uses the allocated IPv4 address as the source IP address in the IP packets to be transmitted, and wherein if the processor allocates an IPv6-prefix address to the IoT UE, the IoT UE auto-configures its IPv6 address accordingly and uses the IPv6 address as the source IP address in the IP packets to be transmitted.

6. The apparatus of claim 4, wherein when the IoT UE capable of non-IP packets transmission over a user plane, the IoT UE marks the Non-IP packets with the network slice ID or group identifier, which is used to identify the corresponding stored group context, when transmitting the user plane packets.

7. The apparatus of claim 5, wherein the IoT UE sends IP packets or non-IP packets towards the second network entity, and the second network entity identifies the IP packets based on the source IP address or non-IP packets based on marked network slice ID or group identifier, and forwards the IP packets or Non-IP packets based on the stored routing profile in the group context accordingly.

8. The apparatus of claim 1, wherein the group security context comprises pair-wised symmetric keys and relevant security parameters.

9. The apparatus of claim 1, wherein the first network entity generates the group context for the service in response to a first device registering to the network when there is no group context stored at the first network entity.

10. The apparatus of claim 1, wherein the first network entity generates the group context for the service in response to an application server sending a group service request to the network and the network has authorized and authenticated the application server for the group service.

11. The apparatus of claim 3, wherein the processor of the first network entity is further configured to:

process a group enrollment request from an IoT UE, wherein the group enrollment request comprises a first random nonce (N1) of a bit length N and a unique group identifier corresponding to a group to which the IoT UE requests enrollment;

determine whether the first network entity already includes a stored security context for the unique group identifier; and in response to a determination that the first network entity does not include the stored security context, generate an access and mobility management function (AMF) group credentials creation request message to request creation of group credentials.

12. The apparatus of claim 11, wherein the memory interface is further to send or receive, to or from the memory device, AMF context information comprising an AMF symmetric key derived from a group master key held by an authentication server function (AUSF) and/or unified data management (UDM).

13. The apparatus of claim 12, wherein the processor of the first network entity performs a next generation NodeB (gNB) group context creation wherein a gNB group context includes at least a gNB group key, a gNB identifier, and a counter used for key refreshing and versioning of the gNB group key.

14. The apparatus of claim 13, wherein the processer is further configured to:

generate a radio access network or access network ((R)AN) group context establishment request message to deliver the gNB group key to the gNB, wherein the (R)AN group context establishment request message is integrity and confidentiality protected using an integrity key and a confidentiality key; and process a group context establishment response message from the gNB.

15. The apparatus of claim 14, wherein the processor of the first network entity is further configured to:

generate a second random nonce N2 of the $N_2$ bit length N; and generate an AMF IoT-UE group enrollment request to the gNB comprising the first random nonce N1, the second random nonce N2, the unique group identifier, and a UE identifier.

16. The apparatus of claim 1, wherein the processor of the first network entity is further configured to:

process an N2 request message from a third network entity, the N2 request message including the unique group identifier corresponding to an internet of things (IoT) user equipment (UE) for handover from the second network entity to the third network entity;

in response to the N2 request message, trigger a group enrollment procedure for the IoT UE including context generation and/or updates and IoT-UE token generation;

modify a control plane context and a user plane context for the IoT UE; and determine whether a session management function (SMF) is to change with for the handover.

17. The apparatus of claim 16, wherein the processor of the first network entity is further configured to:

generate an SMF group(s) session allocation request to the SMF for user plane function (UPF) session establishment; and generate an N2 response message to the third network entity, wherein the N2 response message include information elements for AMF IoT group enrollment.

18. The apparatus of claim 1, wherein the processor of the first network entity is further configured to:

process a handover message from the second network entity, wherein the handover message includes at least one of the following: the unique group identifier corresponding to an internet of things (IoT) user equipment (UE) for handover from the second network entity to a target network entity, an identifier of the target network entity, and a location of IoT UE;
select a session management function (SMF) and a user plane function (UPF) for the handover;
perform a group enrollment for the IoT UE, the group enrollment comprising:
generate an IoT UE token; and
generate a handover request message towards the target network entity, wherein the handover request message includes information elements in RAN group context establishment message and AMF IoT-UE group enrollment request message; and
in response to a handover response message from the target network entity, generate a handover command to the second network entity, wherein the handover command include IoT UE token information that is protected by a radio resource control (RRC) encryption key of the target network entity.

19. A non-transitory computer-readable storage medium having computer-readable instructions stored thereon, the computer-readable instructions to, when executed, instruct a processor of an authentication server function (AUSF) to provide group security control in a mobile network, the computer-readable instructions to:
validate an internet of things (IoT) device with a first security key for integrity (KNASint) and a second security key for confidentiality (KNASenc);
send a first message to a group authority (GA) for managing group enrollment for the IoT device in respond to a second message received from the IoT device,
wherein the first message includes a first token (TK1) for the IoT device to deliver a third secret key (k) together with session information including nonce, user equipment (UE) security capabilities, and identifiers, and
wherein the GA uses a second token (TK2) to deliver the third secret key (k) and a seed number together with the session information.

20. The non-transitory computer-readable storage medium of claim 19, wherein for the first token (TK1), the third security key (k) is encrypted by the second security key for confidentiality (KNASenc) to protect confidentiality and the integrity of the session information is protected by the first security key for integrity (KNASint).

21. The non-transitory computer-readable storage medium of claim 19, wherein for the second token, the third security key (k) and the seed number are encrypted by a fourth security key (KGAenc) to protect confidentiality and the integrity of the session information is protected by a fifth security key (KGAint), wherein the fourth security key and the fifth security key are generated by the AUSF as a trust anchor between the IoT device and the GA.

22. The non-transitory computer-readable storage medium of claim 19, wherein when the second message is received by the AUSF, the computer-readable instructions are further to:
validate the second message with the first security key for integrity (KNASint)
upon determination that the validation is passed, generate a second fresh nonce (N2), the random seed number, and a random ephemeral key as the first security key that enables mutual trust between the IoT device and the GA.

23. The non-transitory computer-readable storage medium of claim 19, wherein the first message is in response to the second message sent by the IoT device if the AUSF validates the IoT device successfully, wherein the second message may include the following information: a first tag value (TAG1) for the second message authentication, a first fresh random nonce (N1) to prevent replay attack and uniquely identify a new protocol session, security capabilities of the IoT device used for facilitating a crypto algorithm negotiation for message exchanges, a group identifier, and an identity for preventing misbinding attacks.

24. The non-transitory computer-readable storage medium of claim 23, wherein to guarantee the integrity of the second message and prevent message modification, the first tag value is calculated with the first security key (KNASint), which is a symmetric integrity key shared between the devices and the AUSF, and
wherein the GA evaluates the group membership of the first device and sends a third message for accepting the group enrollment of the first device if the first device's membership is confirmed, the third message includes the first token (TK1) and a third token (TK3), the third token (TK3) encrypted by the first security key (k).

* * * * *